US012782695B2

(12) United States Patent
Saiga

(10) Patent No.: US 12,782,695 B2
(45) Date of Patent: Nov. 3, 2026

(54) FREEFORM FOLDED OPTICAL SYSTEM COMPRISING FIRST AND SECOND FREEFORM PRISMS

(71) Applicant: Apple Inc., Cupertino, CA (US)

(72) Inventor: Takeyoshi Saiga, Yokohama (JP)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 18/441,906

(22) Filed: Feb. 14, 2024

(65) Prior Publication Data

US 2024/0264415 A1 Aug. 8, 2024

Related U.S. Application Data

(63) Continuation of application No. 17/008,524, filed on Aug. 31, 2020, now Pat. No. 11,933,949.

(60) Provisional application No. 62/907,456, filed on Sep. 27, 2019.

(51) Int. Cl.

| | |
|---|---|
| ***G02B 13/02*** | (2006.01) |
| ***G02B 5/04*** | (2006.01) |
| ***G02B 7/04*** | (2021.01) |
| ***G02B 7/18*** | (2021.01) |

(52) U.S. Cl.

CPC ............... *G02B 13/02* (2013.01); *G02B 5/04* (2013.01); *G02B 7/1805* (2013.01); *G02B 7/04* (2013.01)

(58) Field of Classification Search

CPC .............. G02B 7/1805; G02B 17/0816; G02B 17/0848; G02B 13/007; G02B 17/0832; G02B 17/0856; G02B 17/023

See application file for complete search history.

(56) References Cited

U.S. PATENT DOCUMENTS

| | | | | |
|---|---|---|---|---|
| 6,084,715 | A | 7/2000 | Aoki et al. | |
| 6,094,315 | A | 7/2000 | Aoki | |
| 6,147,808 | A | 11/2000 | Togino | |
| 6,166,858 | A * | 12/2000 | Togino | G02B 17/0848 359/633 |
| 6,178,048 | B1 | 1/2001 | Togino et al. | |

(Continued)

FOREIGN PATENT DOCUMENTS

| | | |
|---|---|---|
| CN | 1419149 | 5/2003 |
| CN | 108333767 | 7/2018 |

(Continued)

OTHER PUBLICATIONS

U.S. Appl. No. 17/008,524, filed Aug. 31, 2020, Takeyoshi Saiga.

(Continued)

*Primary Examiner* — Paul C Lee

(74) *Attorney, Agent, or Firm* — Robert C. Kowert; Kowert, Hood, Munyon, Rankin & Goetzel, P.C.

(57) ABSTRACT

A freeform folded optical system that include two freeform prisms with optical power. At least one of the freeform prisms is configured to fold the optical axis twice. Thus, embodiments of the freeform folded optical system fold the optical axis three or four times. Folding the optical axis three or four times in the freeform prisms allows for long focal lengths required for telephoto lens applications without requiring additional lens elements between the prisms. In addition, the configuration of the freeform folded optical system provides reduced Z-axis height when compared to conventional folded lens systems with similar optical characteristics.

20 Claims, 33 Drawing Sheets

| | |
|---|---|
| φ(image plane) | 5.04 mm |
| f | 10 mm |
| Half FOV | 14.1 degrees |
| 35mm equivalent | 86 mm |
| F-number | 2.0 |

(56) References Cited

U.S. PATENT DOCUMENTS

| | | | |
|---|---|---|---|
| 6,201,646 B1 | 3/2001 | Togino et al. | |
| 6,259,564 B1 * | 7/2001 | Kamo | G02B 17/086 359/627 |
| 6,327,094 B1 * | 12/2001 | Aoki | G02B 13/22 359/633 |
| 6,437,925 B1 | 8/2002 | Nishioka | |
| 6,760,164 B2 | 7/2004 | Togino | |
| 6,876,390 B1 * | 4/2005 | Nagata | H04N 23/63 359/834 |
| 7,385,767 B2 | 6/2008 | Minakata | |
| 7,515,194 B2 | 4/2009 | Nagata et al. | |
| 7,616,393 B2 | 11/2009 | Border et al. | |
| 9,547,174 B2 | 1/2017 | Gao et al. | |
| 10,467,469 B2 | 11/2019 | Goncharov | |
| 11,933,949 B2 | 3/2024 | Saiga | |
| 2005/0046952 A1 | 3/2005 | Nagata et al. | |
| 2005/0248861 A1 | 11/2005 | Minakata | |
| 2006/0077578 A1 | 4/2006 | Shimo et al. | |
| 2008/0291531 A1 | 11/2008 | Heimer | |
| 2009/0161235 A1 | 6/2009 | Border | |
| 2015/0309315 A1 | 10/2015 | Schowengerdt | |
| 2016/0025355 A1 | 1/2016 | Armstrong | |
| 2018/0045964 A1 * | 2/2018 | Jones | G02B 27/0172 |
| 2018/0364455 A1 | 12/2018 | Chen | |
| 2021/0349295 A1 | 11/2021 | Yao | |

FOREIGN PATENT DOCUMENTS

| | | |
|---|---|---|
| EP | 1312968 | 5/2003 |
| JP | 2001166209 | 6/2001 |
| JP | 2005-300588 | 10/2005 |
| JP | 2007017708 | 1/2007 |

OTHER PUBLICATIONS

International Search Report and Written Opinion from PCT/US2020/052581, dated Dec. 9, 2020, pp. 1-15.

Thorben Badur et al., "High Refractive Index Polymers by Design", 2018, pp. 1-10.

Chunyu Gao, et al., "Occlusion Capable Optical See-through Head-Mounted Display Using Freeform Optics", IEEE International Symposium on Mixed and Augmented Reality 2012 Science and Technology Proceedings, Nov. 5-8, 2012, pp. 281-282.

Korean Notice of Preliminary Rejection from Patent Application No. 10-2021-7007991, dated Apr. 12, 2023, pp. 1-10, English Translation Included.

Chinese Office Action from Application No. 202080064581.9, dated Jul. 4, 2023, pp. 1-9.

* cited by examiner

| | |
|---|---|
| φ(image plane) | 5.04 mm |
| *f* | 10 mm |
| Half FOV | 14.1 degrees |
| 35mm equivalent | 86 mm |
| F-number | 2.0 |

| | |
|---|---|
| φ(image plane) | 5.04 mm |
| *f* | 12.24 mm |
| Half FOV | 11.6 degrees |
| 35mm equivalent | 105 mm |
| F-number | 2.0 |

| | |
|---|---|
| φ(image plane) | 5.04 mm |
| *f* | 15.3 mm |
| Half FOV | 9.4 degrees |
| 35mm equivalent | 131 mm |
| F-number | 2.2 |

| | |
|---|---|
| φ(image plane) | 5.04 mm |
| *f* | 18.36 mm |
| Half FOV | 7.8 degrees |
| 35mm equivalent | 158 mm |
| F-number | 2.3 |

| | |
|---|---|
| φ(image plane) | 5.04 mm |
| *f* | 24.48 mm |
| Half FOV | 5.9 degrees |
| 35mm equivalent | 210 mm |
| F-number | 3.2 |

| | |
|---|---|
| φ(image plane) | 5.04 mm |
| *f* | 30.6 mm |
| Half FOV | 4.7 degrees |
| 35mm equivalent | 263 mm |
| F-number | 4 |

| | |
|---|---|
| φ(image plane) | 5.644 mm |
| *f* | 17 mm |
| Half FOV | 9.4 degrees |
| 35mm equivalent | 130 mm |
| F-number | 2.8 |

FREEFORM FOLDED OPTICAL SYSTEM COMPRISING FIRST AND SECOND FREEFORM PRISMS

PRIORITY INFORMATION

This application is a continuation of U.S. patent application Ser. No. 17/008,524, filed Aug. 31, 2020, which claims benefit of priority of U.S. Provisional Application Ser. No. 62/907,456 entitled "FREEFORM FOLDED OPTICAL SYSTEM" filed Sep. 27, 2019, which are hereby incorporated by reference in their entirety.

BACKGROUND

Technical Field

This disclosure relates generally to camera systems, and more specifically to folded optical systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of an image sensor with small pixel size and a good, compact imaging lens system. Advances in technology have achieved reduction of the pixel size in image sensors. However, as image sensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an optical system that is capable of capturing high brightness, high resolution images under the physical constraints imposed by small form factor cameras.

SUMMARY OF EMBODIMENTS

Embodiments of a freeform folded optical system are described that may, for example, be used in small form factor cameras in mobile multipurpose devices such as smartphones and tablet or pad devices. Embodiments of the freeform folded optical system are described that include two freeform prisms with optical power and without a lens stack between the prisms. At least one of the freeform prisms is configured to fold the optical axis of the optical system twice. Thus, embodiments of the freeform folded optical system fold the optical axis three or four times. Folding the optical axis three or four times in the freeform prisms allows for long focal lengths required for telephoto lens applications without requiring additional lens elements between the prisms. In addition, the configuration of the freeform folded optical system provides reduced Z-axis height when compared to conventional folded lens systems with similar optical characteristics.

The folded optical system includes two freeform prisms. In at least some embodiments, each freeform prism is formed of an optical plastic material. Each freeform prism has more than three surfaces; however, only three of the surfaces of each freeform prism are discussed.

In embodiments of the folded optical system, the first freeform prism has a first surface that is a transmitting and total internal reflection (TIR) surface that transmits light received from an object field and reflects light received from a second surface of the first freeform prism by TIR to a third surface of the first freeform prism. The second surface of the first freeform prism is a reflecting surface coated with a mirror coating that reflects light received through the first surface of the first freeform prism back to the first surface of the first freeform prism. The third surface of the first freeform prism is a transmitting surface that transmits light received from the first surface of the first freeform prism. Thus, the first freeform prism folds the optical axis twice—once at the second surface, and again at the first surface. At least one of the three surfaces of the first freeform prism is a freeform surface.

In embodiments of the folded optical system that fold the optical axis four times, the second freeform prism has a first surface that is a transmitting surface that transmits light received from the first freeform prism to a second surface of the second freeform prism. The second surface of the second freeform prism is a transmitting and TIR surface that reflects light received through the first surface of the second freeform prism by TIR to the third surface of the second freeform prism and transmits light received from the third surface of the second freeform prism to form an image at an image plane. The third surface of the second freeform prism is a reflecting surface coated with a mirror coating that reflects light received from the second surface of the second freeform prism back to the second surface of the second freeform prism. Thus, in these embodiments, the second freeform prism folds the optical axis twice—once at the second surface, and again at the third surface. At least one of the three surfaces of the second freeform prism is a freeform surface.

In embodiments of the folded optical system that fold the optical axis three times, the second freeform prism has a first surface that is a transmitting surface that transmits light received from the first freeform prism to a second surface of the second freeform prism. The second surface of the second freeform prism is a reflecting surface that reflects light received through the first surface of the second freeform prism to the third surface of the second freeform prism. The second surface of the second freeform prism may be coated with a mirror coating, or alternatively may reflect light via total internal reflection. The third surface of the second freeform prism is a transmitting surface that transmits light received from the second surface of the second freeform prism to form an image at an image plane. Thus, in these embodiments, the second freeform prism folds the optical axis once, at the second surface. At least one of the three surfaces of the second freeform prism is a freeform surface.

In some embodiments, an objective lens may be located on the object side of the first freeform prism, for example to correct for aberrations in the optical system. In some embodiments, the objective lens is a rotationally symmetric lens. In some embodiments, at least one of the surfaces of the objective lens is aspherical. Using optical glass instead of plastic for the objective lens may, for example, aid in correcting aberrations. In some embodiments, the objective lens has positive refractive power. In some embodiments, the objective lens is composed of an optical plastic material. In some embodiments, the objective lens is composed of an optical glass material. Using optical glass instead of plastic for the objective lens may, for example, aid in correcting aberrations. In some embodiments, the objective lens is a doublet lens.

In some embodiments, the folded optical system may satisfy the following condition:

$$0.5 < B/A < 0.1.0 \tag{1}$$

where A is the optical power of the overall optical system, and B is the optical power of the objective lens.

In some embodiments, the folded optical system may satisfy the following condition:

$$0.05 < AD < 0.3 \tag{2}$$

where A is the optical power of the overall optical system, and D is the semi-diagonal image height.

In some embodiments, the objective lens is composed of a material (either optical plastic or optical glass) with Abbe number $V_{d1}$ that satisfies the following condition:

$$V_{d1} > 50. \tag{3}$$

In some embodiments, the first freeform prism is composed of an optical plastic material with Abbe number $V_{d2}$ that satisfies the following condition:

$$V_{d2} > 50. \tag{4}$$

In some embodiments, the second freeform prism is composed of an optical plastic material with Abbe number $V_{d3}$ that satisfies the following condition:

$$V_{d3} < 25. \tag{5}$$

Figure 1A:
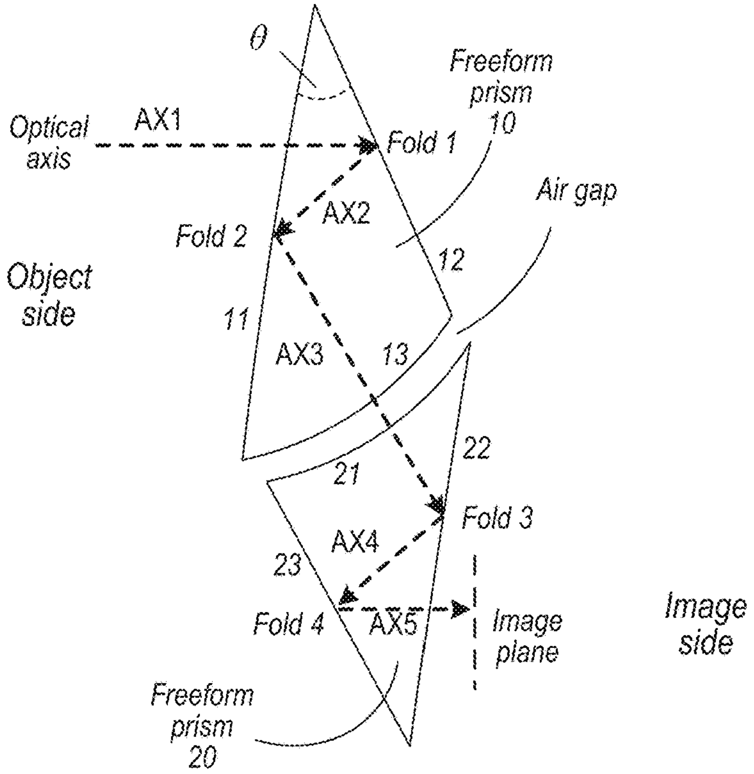
FIG. 1A illustrates a freeform folded optical system that folds the optical axis four times, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a freeform folded optical system are described that may, for example, be used in small form factor cameras in mobile multipurpose devices such as smartphones and tablet or pad devices. Conventional folded lens systems may include one or more prisms and a lens stack including one or more refractive lens elements. A first prism redirects light from a first optical axis to a second optical axis to thus provide a "folded" optical axis for the lens system. In some conventional folded lens systems, a second prism may be located at the image side of the lens stack to fold the optical axis on to a third axis. Using a prism to fold the optical axis may, for example, reduce the Z-height of the lens system, and thus may reduce the Z-height of a camera that includes the folded lens system.

Figure 1B:
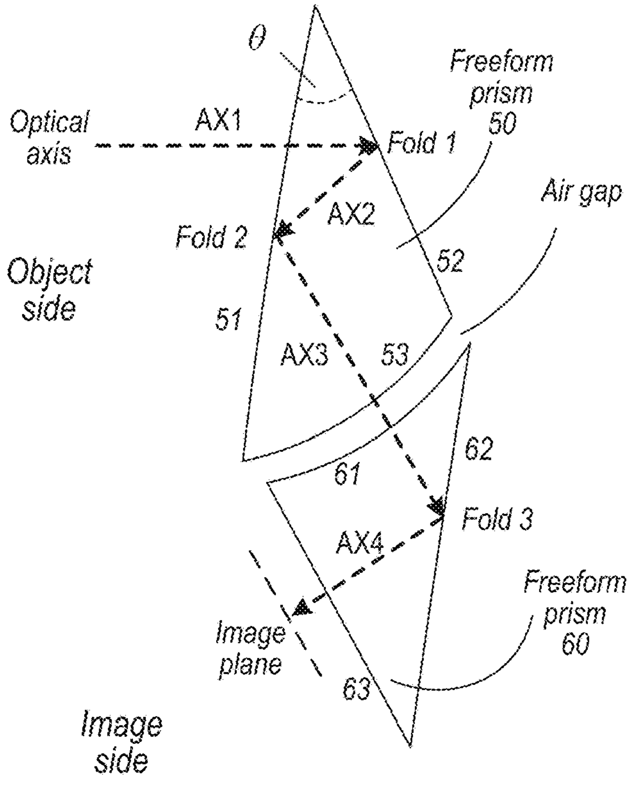
FIG. 1B illustrates a freeform folded optical system that folds the optical axis three times, according to some embodiments.
Figure 12:
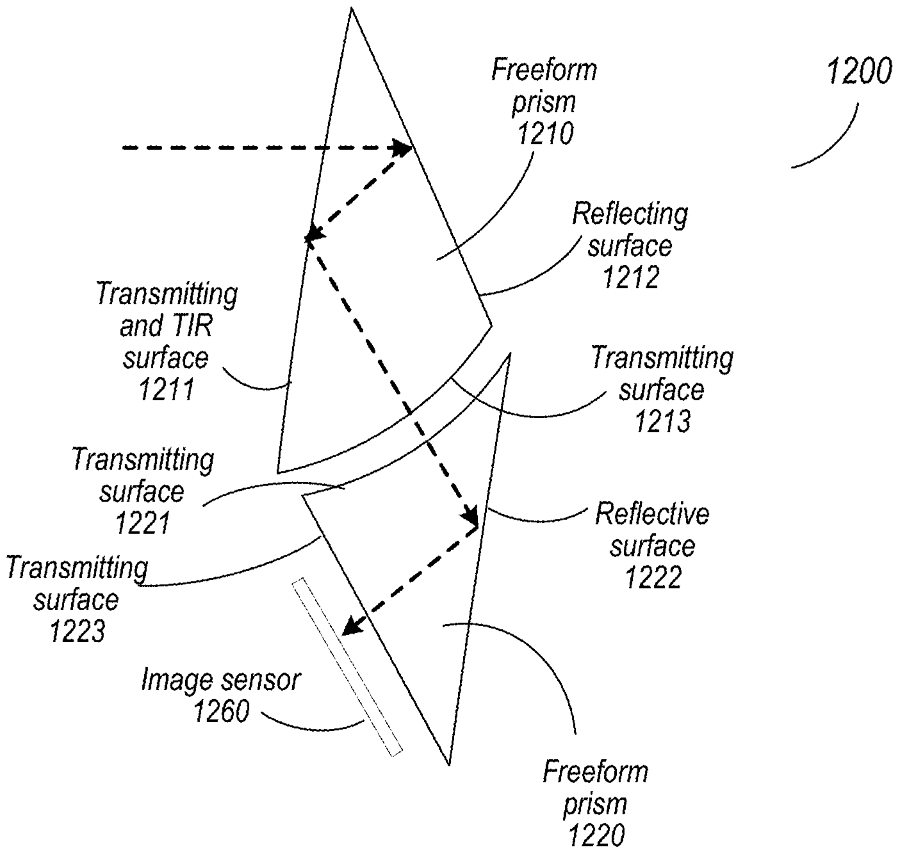
FIG. 12 illustrates a freeform folded optical system that folds the optical axis three times rather than four times, according to some embodiments.

Embodiments of the freeform folded optical system are described that include two freeform prisms with optical power and without a lens stack between the prisms. At least one of the freeform prisms is configured to fold the optical axis twice. Thus, in contrast to conventional folded lens systems in which one or two prisms fold the optical axis either once (one prism) or twice (two prisms), embodiments of the freeform folded optical system described herein fold the optical axis three or four times. FIG. 1A illustrates a freeform folded optical system that folds the optical axis four times, according to some embodiments. FIG. 1B illustrates a freeform folded optical system that folds the optical axis three times, according to some embodiments. Folding the optical axis three or four times in the freeform prisms with optical power allows for long focal lengths required for telephoto lens applications (e.g., an effective focal length within a range of 9 to 31 millimeters (mm)) while providing low F-numbers (e.g., within a range of 2.0 to 4.0) without requiring additional lens elements between the prisms. In addition, the configuration of the freeform folded optical system provides reduced Z-axis height when compared to conventional folded lens systems with similar optical characteristics as illustrated in FIG. 12.

Freeform optics involve optical designs with at least one freeform surface which has no translational or rotational symmetry about axes normal to the mean plane of the surface. A freeform prism is thus a prism that has at least one freeform surface which has no translational or rotational symmetry about axes normal to the mean plane of the surface. In general, if optical rays pass through a conventional rotationally symmetric surface with an angle, asymmetric aberrations may occur. Using a conventional rotationally symmetric surfaces for the prisms may thus degrade the optical performance of a folded optical system. Freeform surfaces can correct for those asymmetric aberrations. Thus, freeform surfaces may be used in the prisms of the folded optical systems as described herein to improve the optical performance of the optical systems, and also to help in reducing the Z-height of the folded optical systems.

FIG. 1A illustrates a freeform folded optical system that folds the optical axis four times, according to some embodiments. The folded optical system includes two freeform prisms 10 and 20. In at least some embodiments, each freeform prism is formed of an optical plastic material. Each freeform prism has more than three surfaces; however, only three of the surfaces of each freeform prism are discussed.

Referring to the first freeform prism 10, a first surface 11 is a transmitting and total internal reflection (TIR) surface that transmits light received from an object field and reflects light received from a second surface 12 in the prism by TIR to a third surface 13. The second surface 12 is a reflecting surface coated with a mirror coating that reflects light received through the first surface 11 back to the first surface 11 in the prism. The third surface 13 is a transmitting surface that transmits light received from the first surface 11. At least one of the three surfaces 11, 12, and 13 is a freeform surface.

Referring to the second freeform prism 20, a first surface 21 is a transmitting surface that transmits light received from the first prism 10 to a second surface 22 in the prism. The second surface 22 is a transmitting and TIR surface that reflects light received through the first surface 21 by TIR to the third surface 23 in the prism and transmits light received from the third surface 23 in the prism to form an image at an image plane. The third surface 23 is a reflecting surface coated with a mirror coating that reflects light received from the second surface 22 back to the second surface 22. At least one of the three surfaces 21, 22, and 23 is a freeform surface.

While not shown, in some embodiments, a first (objective) lens may be located on the object side of the first freeform prism 10, for example to correct for aberrations in the optical system. In some embodiments, the objective lens is a rotationally symmetric lens. In some embodiments, at least one of the surfaces of the objective lens is aspherical. In some embodiments, the objective lens has positive refractive power. In some embodiments, the objective lens is composed of an optical plastic material. In some embodiments, the objective lens is composed of an optical glass material. Using optical glass instead of plastic for the objective lens may, for example, aid in correcting aberrations. In some embodiments, the objective lens is a doublet lens.

The following is a definition of an aspherical surface:

$$z = \frac{\frac{h^2}{r}}{1 + \sqrt{1 - \frac{(1+k)h^2}{r^2}}} + Ah^4 + Bh^6 + Ch^8 + \ldots$$

$$h = \sqrt{x^2 + y^2}$$

where z is the sag (the z-component of the displacement of the surface from the vertex, at distance r from the axis), k is a conic constant, and where:

| Radius of curvature | r |
|---|---|
| 4th order | (A) |
| 6th order | (B) |
| 8th order | (C) |
| 10th order | (D) |
| 12th order | (E) |
| 14th order | (F) |

The folded optical system of FIG. 1A may form an image at an image plane at or near a surface of an image sensor (not shown) located on the image side of the second freeform prism 20. While not shown, an infrared (IR) filter may be located between the second surface 22 of the second freeform prism 20 and the image sensor.

While not shown, an aperture stop may be located at or near the object side of the first freeform prism 10. In embodiments that include an objective lens on the object side of the first freeform prism 10, the aperture stop may be located on the object side of the objective lens.

In at least some embodiments, an angle θ between the first surface 11 and the second surface 12 of the first freeform prism 10 may be less than or equal to 35 degrees, for example within a range of 29 to 35 degrees. For example, in some embodiments, angle θ may be 30 degrees. In some embodiments, angle θ may be determined as the angle between a mean plane of surface 11 and a mean plane of surface 12. In some embodiments, angle θ may be determined by the average angle of surface 11 and of surface 12. In conventional folded lens systems, the angle between a first surface of a first prism and a second (reflective) surface of the first prism is typically 45 degrees. Reducing the angle between the first 11 and second 12 surfaces in the first freeform prism 10 (and similarly reducing the angle between the second 22 and third 23 surfaces in the second freeform prism 20) helps to reduce the Z-height of the freeform folded optical system when compared to conventional folded lens systems, for example as illustrated in FIG. 12.

The freeform folded optical system of FIG. 1A folds the optical axis four times. The second surface 12 of the first freeform prism 10 folds the optical axis from a first portion AX1 to a second portion AX2. The first surface 11 of the first freeform prism 10 then folds the optical axis from the second portion AX2 to a third portion AX3. The second surface 22 of the second prism 20 then folds the optical axis from the third portion AX3 to a fourth portion AX4. The third surface 23 of the second prism 20 then folds the optical axis from the fourth portion AX4 to a fifth portion AX5.

Figure 15:
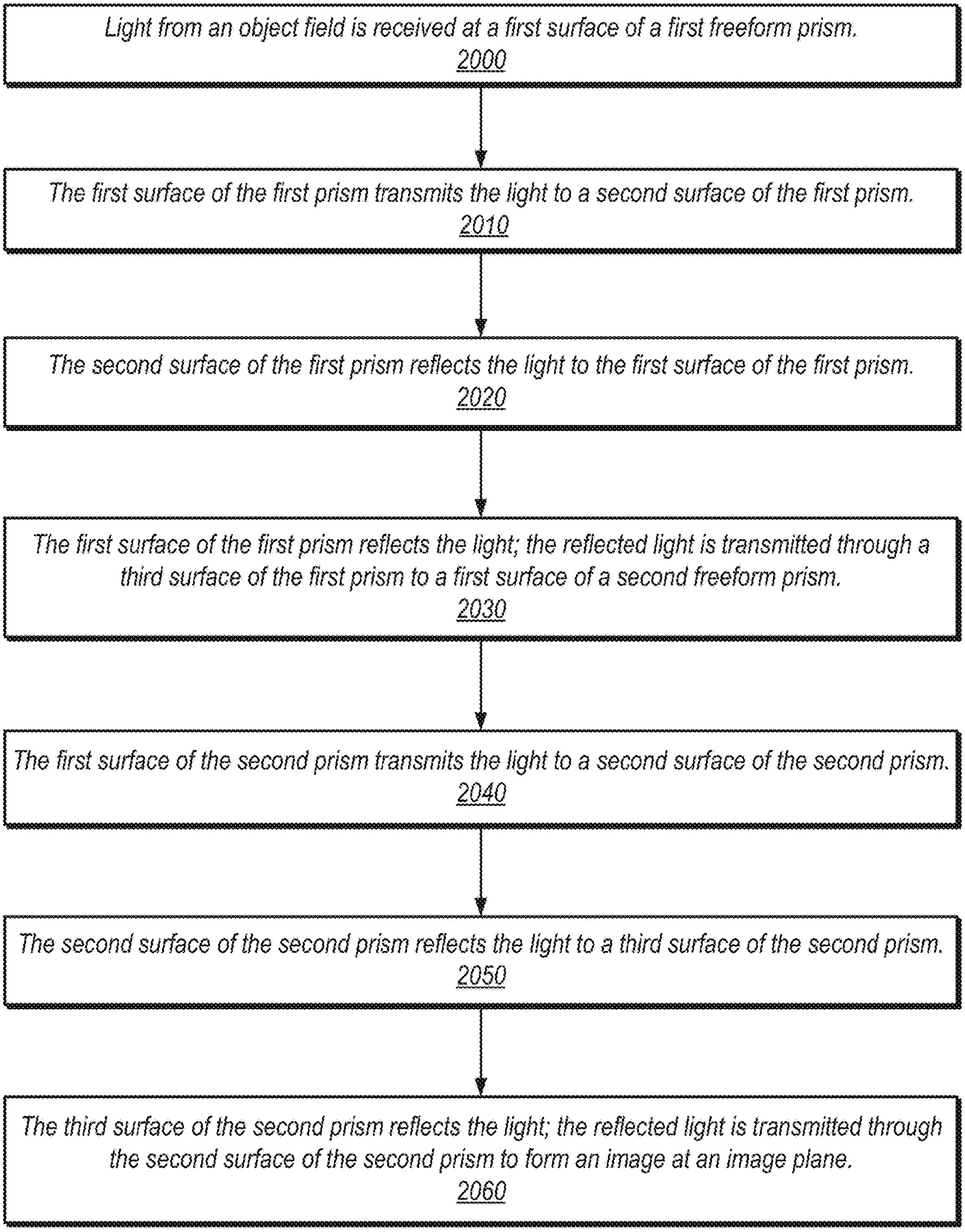
FIG. 15 is a flowchart of a method for capturing images using embodiments of a freeform folded optical system that folds the optical axis four times, according to some embodiments.

FIG. 15 is a flowchart of a method for capturing images using embodiments of a freeform folded optical system as illustrated in FIG. 1A that folds the optical axis four times, according to some embodiments. As indicated at 2000, light from an object field is received at a first surface 11 of a first freeform prism 10. As indicated at 2010, the first surface 11 of the first prism 10 transmits the light to a second surface 12 of the first prism 10. As indicated at 2020, the second surface 12 of the first prism 10 reflects the light to the first surface 11 of the first prism 10. As indicated at 2030, the first surface 11 of the first prism 10 reflects the light by TIR; the reflected light is transmitted through a third surface 13 of the first prism 10 to a first surface 21 of a second freeform prism 20.

As indicated at 2040, the first surface 21 of the second prism 20 transmits the light to a second surface 22 of the second prism 20. As indicated at 2050, the second surface 22 of the second prism 20 reflects the light by TIR to a third surface 23 of the second prism 20. As indicated at 2060, the third surface 23 of the second prism 20 reflects the light; the reflected light is transmitted through the second surface 22 of the second prism 20 to form an image at an image plane.

FIG. 1B illustrates a freeform folded optical system that folds the optical axis three times, according to some embodiments. The folded optical system includes two freeform prisms 50 and 60. In at least some embodiments, each freeform prism is formed of an optical plastic material. Each freeform prism has more than three surfaces; however, only three of the surfaces of each freeform prism are discussed.

Referring to the first freeform prism 50, a first surface 51 is a transmitting and TIR surface that transmits light received from an object field and reflects light received from a second surface 52 in the prism by TIR to a third surface 53. The second surface 52 is a reflecting surface coated with a mirror coating that reflects light received through the first surface 51 back to the first surface 51 in the prism 50. The third surface 53 is a transmitting surface that transmits light received from the first surface 51. At least one of the three surfaces 51, 52, and 53 is a freeform surface.

Referring to the second freeform prism 60, a first surface 61 is a transmitting surface that transmits light received from the first prism 50 to a second surface 62 in the prism 60. The second surface 62 is a reflecting surface that reflects light received through the first surface 61 to the third surface 63 in the prism 60. The second surface 62 may be coated with a mirror coating, or alternatively may reflect light via total internal reflection. The third surface 63 is a transmitting surface that transmits light received from the second surface 62 to form an image at an image plane. At least one of the three surfaces 61, 62, and 63 is a freeform surface.

While not shown, in some embodiments, a first (objective) lens may be located on the object side of the first freeform prism 60, for example to correct for aberrations in the optical system. In some embodiments, the objective lens is a rotationally symmetric lens. In some embodiments, at least one of the surfaces of the objective lens is aspherical. In some embodiments, the objective lens has positive refractive power. In some embodiments, the objective lens is composed of an optical plastic material. In some embodiments, the objective lens is composed of an optical glass material. In some embodiments, the objective lens is a doublet lens.

The folded optical system of FIG. 1B may form an image at an image plane at or near a surface of an image sensor (not shown) located on the image side of the second freeform prism 60. While not shown, an infrared (IR) filter may be located between the third surface 63 of the second freeform prism 60 and the image sensor.

While not shown, an aperture stop may be located at or near the object side of the first freeform prism 50. In embodiments that include an objective lens on the object side of the first freeform prism 50, the aperture stop may be located on the object side of the objective lens.

In at least some embodiments, an angle θ between the first surface 51 and the second surface 52 of the first freeform prism 50 may be less than or equal to 35 degrees, for example within a range of 29 to 35 degrees. For example, in some embodiments, angle θ may be 30 degrees. In some embodiments, angle θ may be determined as the angle between a mean plane of surface 51 and a mean plane of surface 52. In conventional folded lens systems, the angle between a first surface of a first prism and a second (reflective) surface of the first prism is typically 45 degrees. Reducing the angle between the first 51 and second 52 surfaces in the first freeform prism 50 (and similarly reducing the angle between the second 62 and third 63 surfaces in the second freeform prism 60) helps to reduce the Z-height of the freeform folded optical system when compared to conventional folded lens systems, for example as illustrated in FIG. 12.

The freeform folded optical system of FIG. 1B folds the optical axis three times. The second surface 52 of the first freeform prism 50 folds the optical axis from a first portion AX1 to a second portion AX2. The first surface 51 of the first freeform prism 50 then folds the optical axis from the second portion AX2 to a third portion AX3. The second surface 62 of the second prism 60 then folds the optical axis from the third portion AX3 to a fourth portion AX4.

Figure 16:
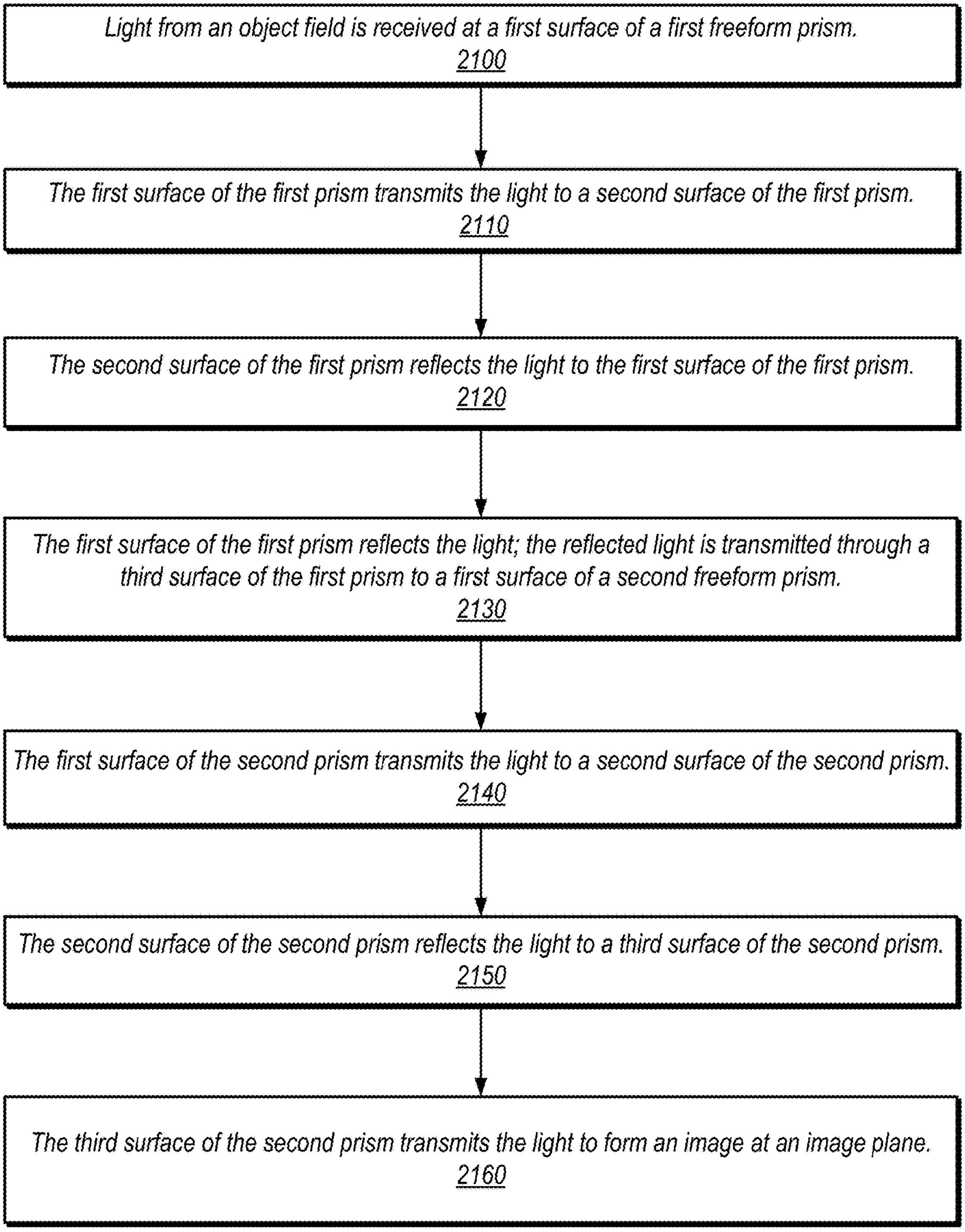
FIG. 16 is a flowchart of a method for capturing images using embodiments of a freeform folded optical system that folds the optical axis three times, according to some embodiments.

FIG. 16 is a flowchart of a method for capturing images using embodiments of a freeform folded optical system as illustrated in FIG. 1B that folds the optical axis three times, according to some embodiments. As indicated at 2100, light from an object field is received at a first surface 51 of a first freeform prism 50. As indicated at 2110, the first surface 51 of the first prism 50 transmits the light to a second surface 52 of the first prism 50. As indicated at 2120, the second surface 52 of the first prism 50 reflects the light to the first surface 51 of the first prism 50. As indicated at 2130, the first surface 51 of the first prism 50 reflects the light by TIR; the reflected light is transmitted through a third surface 53 of the first prism 50 to a first surface 61 of a second freeform prism 60.

As indicated at 2140, the first surface 61 of the second prism 60 transmits the light to a second surface 62 of the second prism 60. As indicated at 2150, the second surface 62 of the second prism 60 reflects the light to a third surface 63 of the second prism 20. As indicated at 2160, the third surface 23 of the second prism 20 transmits the light to form an image at an image plane.

EXAMPLE EMBODIMENTS

FIGS. 2A through 8C show several example embodiments of freeform folded optical systems. These embodiments all include, in order along an optical axis from an object side of the system to an image side of the system, an objective lens, a first freeform optical prism, and a second freeform optical prism. In these embodiments, both the first freeform optical prism and the second freeform optical prism fold the optical axis twice as illustrated in FIG. 1A.

In these example embodiments, the objective lens is a rotationally symmetric singlet lens. In some embodiments, at least one of the surfaces of the objective lens is aspherical. In some embodiments, the objective lens has positive refractive power (i.e., is a converging lens).

In these example embodiments, the first freeform optical prism folds the optical axis twice, and the second freeform optical prism also folds the optical axis twice. A first surface of the first freeform optical prism is a transmitting and total internal reflection (TIR) surface, a second surface of the first freeform optical prism is a reflecting surface, and a third surface of the first freeform optical prism is a transmitting surface. A first surface of the second freeform optical prism is a transmitting surface, a second surface of the second freeform optical prism is a reflecting and TIR surface, and a third surface of the second freeform optical prism is a transmitting surface. The optical axis passes through the objective lens and the first surface of the first freeform optical prism and is folded by a mirror coating at the second surface of the first freeform optical prism. The optical axis is folded again at the first surface of the first freeform optical prism by TIR, passes through the third surface of the first freeform optical prism and the first surface of the second freeform optical prism, is folded by TIR at the second surface of the second freeform optical prism, and is folded again by a mirror coating at the third surface of the second freeform optical prism. The optical axis then passes through the second surface of the second freeform optical prism.

In these example embodiments, both the first freeform optical prism and the second freeform optical prism may have optical power. At least one surface of the first freeform optical prism and of the second freeform optical prism is a freeform surface. The objective lens, first freeform optical prism, and second freeform optical prism of the folded optical systems of FIGS. 2A through 8C affect light received from an object field to form an image at an image plane at or near a surface of an image sensor located on the image side of the second freeform prism.

The folded optical systems of FIGS. 2A through 8C may, but do not necessarily, include an infrared (IR) filter, for example located between the second surface of the second freeform prism and the image sensor. In some embodiments, the image plane formed by the folded optical system is parallel to a principal plane of the objective lens (the principal plane is perpendicular to the optical axis of the objective lens). In these embodiments, referring to FIG. 1, AX1 is thus parallel to AX5.

In these example embodiments, an angle θ between the first surface and the second surface of the first freeform prism may be less than or equal to 35 degrees, for example within a range of 29 to 35 degrees. For example, in some embodiments, angle A may be 30 degrees. In some embodiments, angle θ may be determined as the angle between a mean plane of the first surface of the first freeform prism and a mean plane of the second surface of the first freeform prism. In conventional folded lens systems, the angle between a first surface of a first prism and a second (reflective) surface of the first prism is typically 45 degrees. Reducing the angle between the first and second surfaces in the first freeform prism (and similarly reducing the angle between the second and third surfaces in the second freeform prism) helps to reduce the Z-height of the freeform folded optical system when compared to conventional folded lens systems, for example as illustrated in FIG. 12.

In these example embodiments, effective focal lengths are within a range of 9 to 31 millimeters (mm) while F-numbers are within a range of 2.0 to 4.0. Semi-diagonal image heights in these embodiments are within a range of 2.5 to 2.9 mm; 2.52 mm in the folded optical systems of FIGS. 2A through 7C, and 2.822 in the folded optical system of FIGS. 8A through 8C. Half field of view (FOV) in these embodiments fall within a range of 4.5 degrees to 16 degrees. These embodiments provide 35 mm equivalent focal lengths that fall within a range of 75 to 270 mm. Note, however, that shape, surface shape, spacing, materials, and other aspects of one or more of the objective lens, the first freeform prism, and the second freeform prism may be adjusted to provide freeform folded optical systems in which one or more of these optical characteristics is outside of these ranges.

In these example embodiments, the objective lens, the first freeform prism, and the second freeform prism are all formed of optical plastic materials. In some embodiments, one or more of the objective lens, first freeform prism, and second freeform prism may be formed using an injection molding process. However, in some embodiments, other methods may be used to form one or more of these elements (e.g., 3D printing, extrusion, blow molding, casting, rotomolding, die cast, overmolding, compression molding, computer numerical control (CNC) machining, thermoforming, etc.). In some embodiments, all three of these elements may be formed of the same optical plastic material. In some embodiments, at least two of the three elements are formed of different optical plastic materials.

The folded optical systems of FIGS. 2A through 8C may satisfy the following condition:

$$0.5 < B/A < 0.1.0 \quad (1)$$

where A is the optical power of the overall optical system, and B is the optical power of the objective lens. Optical power (also referred to as dioptric power, refractive power, focusing power, or convergence power) is the degree to which an optical system or optical element converges or diverges light.

The folded optical systems of FIGS. 2A through 8C may satisfy the following condition:

$$0.05 < AD < 0.3 \quad (2)$$

where A is the optical power of the overall optical system, and D is the semi-diagonal image height.

In the folded optical systems of FIGS. 2A through 8C, the objective lens is rotationally symmetric, and at least one of the two surfaces of the objective lens is aspherical. The objective lens may be composed of an optical plastic material (or, alternatively, of an optical glass material as illustrated in the example folded optical system of FIGS. 8A through 8C) with Abbe number $V_{d1}$ that satisfies the following condition:

$$V_{d1} > 50. \quad (3)$$

Using optical glass instead of plastic for the objective lens may, for example, reduce the thermal shift of focus and axial color aberrations.

In the folded optical systems of FIGS. 2A through 8C, the first freeform prism is composed of an optical plastic material with Abbe number $V_{d2}$ that satisfies the following condition:

$$V_{d2} > 50. \quad (4)$$

In the folded optical systems of FIGS. 2A through 8C, the second freeform prism is composed of an optical plastic material with Abbe number $V_{d3}$ that satisfies the following condition:

$$V_{d3} < 25. \quad (5)$$

Figure 2A:
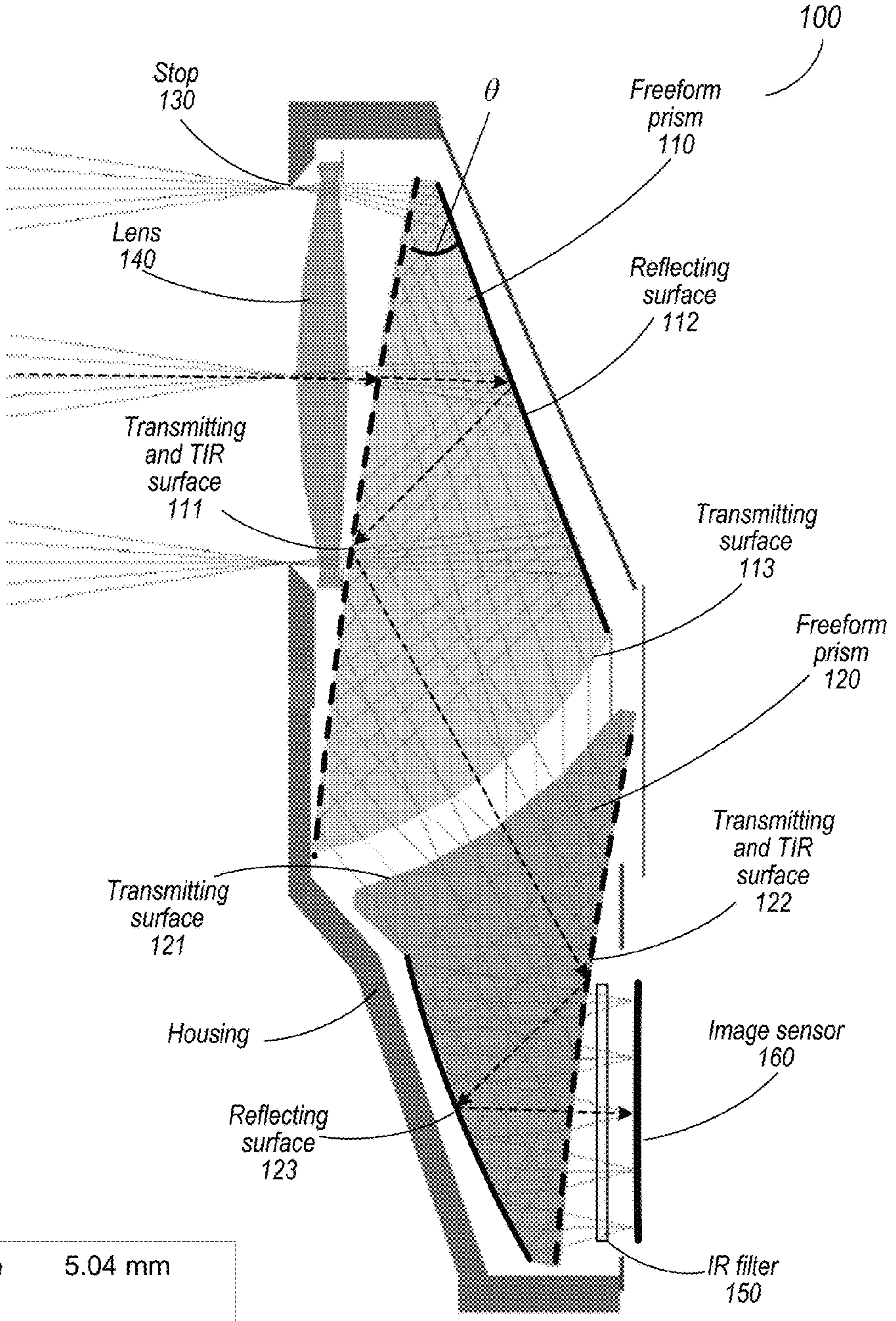
FIG. 2A illustrates a first example embodiment of a freeform folded optical system.

FIG. 2A illustrates a first example embodiment of a freeform folded optical system. FIG. 2A shows a cutaway view of a camera 100 that may include a freeform folded optical system that includes, in order along an optical axis from an object side of the system to an image side of the system, an objective lens 140, a first freeform optical prism 110, and a second freeform optical prism 120. The camera 100 may also include an image sensor 160 located on the image side of freeform optical prism 120. The camera 100 may also include an aperture stop 130, for example located on the object side of lens 140. The camera 100 may also include an IR filter 150, for example located between image sensor 160 and freeform optical prism 120. The folded optical system of FIG. 2A affects light received from an object field through aperture stop 130 to form an image at an image plane at or near a surface of the image sensor 160. In some embodiments, the image plane formed by the folded optical system is parallel to a principal plane of the objective lens 140.

Objective lens 140 may be a rotationally symmetric singlet lens. At least one of the surfaces of objective lens 140 may be aspherical. Objective lens 140 may have positive refractive power. Both freeform optical prism 110 and freeform optical prism 120 have optical power. At least one surface of freeform optical prism 110 and of freeform optical prism 120 is a freeform surface.

Freeform optical prism 110 folds the optical axis twice. A first surface 111 of freeform optical prism 110 is a transmitting and total internal reflection (TIR) surface, a second surface 112 of the freeform optical prism 110 is a reflecting surface, and a third surface 113 of freeform optical prism 110 is a transmitting surface. Freeform optical prism 120 also folds the optical axis twice. A first surface 121 of freeform optical prism 120 is a transmitting surface, a second surface 122 of freeform optical prism 120 is a reflecting and TIR surface, and a third surface 123 of freeform optical prism 120 is a transmitting surface.

The example freeform folded optical system shown in FIG. 2A meets conditions 1 through 5 described above. In an example embodiment of a freeform folded optical system as shown in FIG. 2A, effective focal length (f) is 10 mm, F-number is 2.0, semi-diagonal image height is 2.52 mm, half FOV is 14.1 degrees, and 35 mm equivalent focal length is 86 mm. Note, however, that shape, surface shape, spacing, materials, and other aspects of one or more of objective lens 140, freeform optical prism 110, and freeform optical prism

120 may be adjusted to change one or more of these optical characteristics. Table 1 provides values for various optical and physical parameters of the example freeform folded optical systems of camera 100. Tables 2A through 2K provide prescriptions for the optical elements of the example freeform folded optical system of camera 100.

Figure 2B:
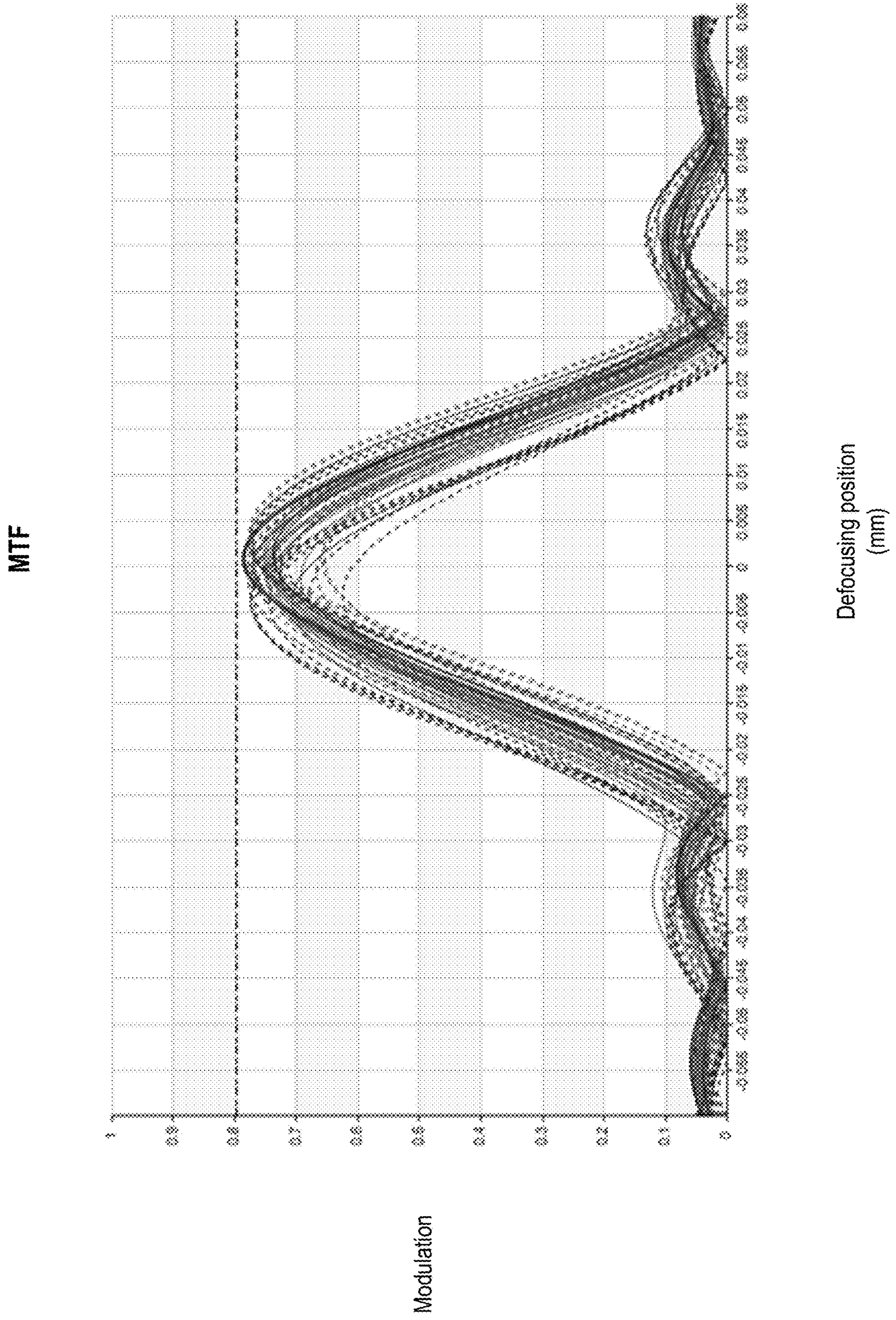
FIG. 2B shows the modulation transfer function (MTF) for the freeform folded optical system of FIG. 2A.
Figure 2C:
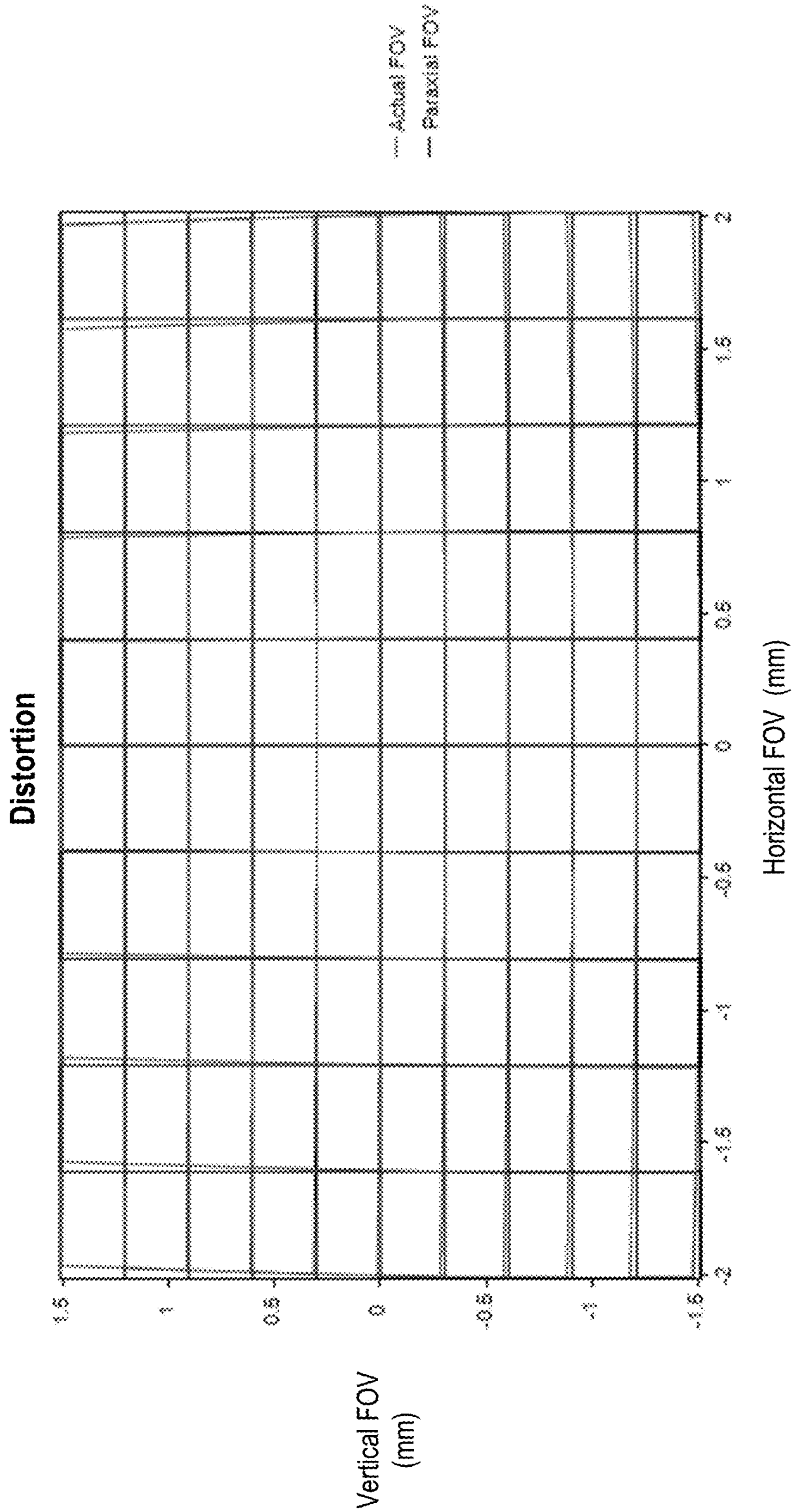
FIG. 2C shows distortion for the freeform folded optical system of FIG. 2A.

FIGS. 2B and 2C illustrate optical performance for the freeform folded optical system of FIG. 2A. FIG. 2B shows the modulation transfer function (MTF) for the freeform folded optical system of FIG. 2A. The frequency of MTF is 125 lp/mm. FIG. 2C shows distortion for the freeform folded optical system of FIG. 2A. As shown by FIGS. 2B and 2C, both the MTF and the distortion in the freeform folded optical system of FIG. 2A are good.

Figure 3A:
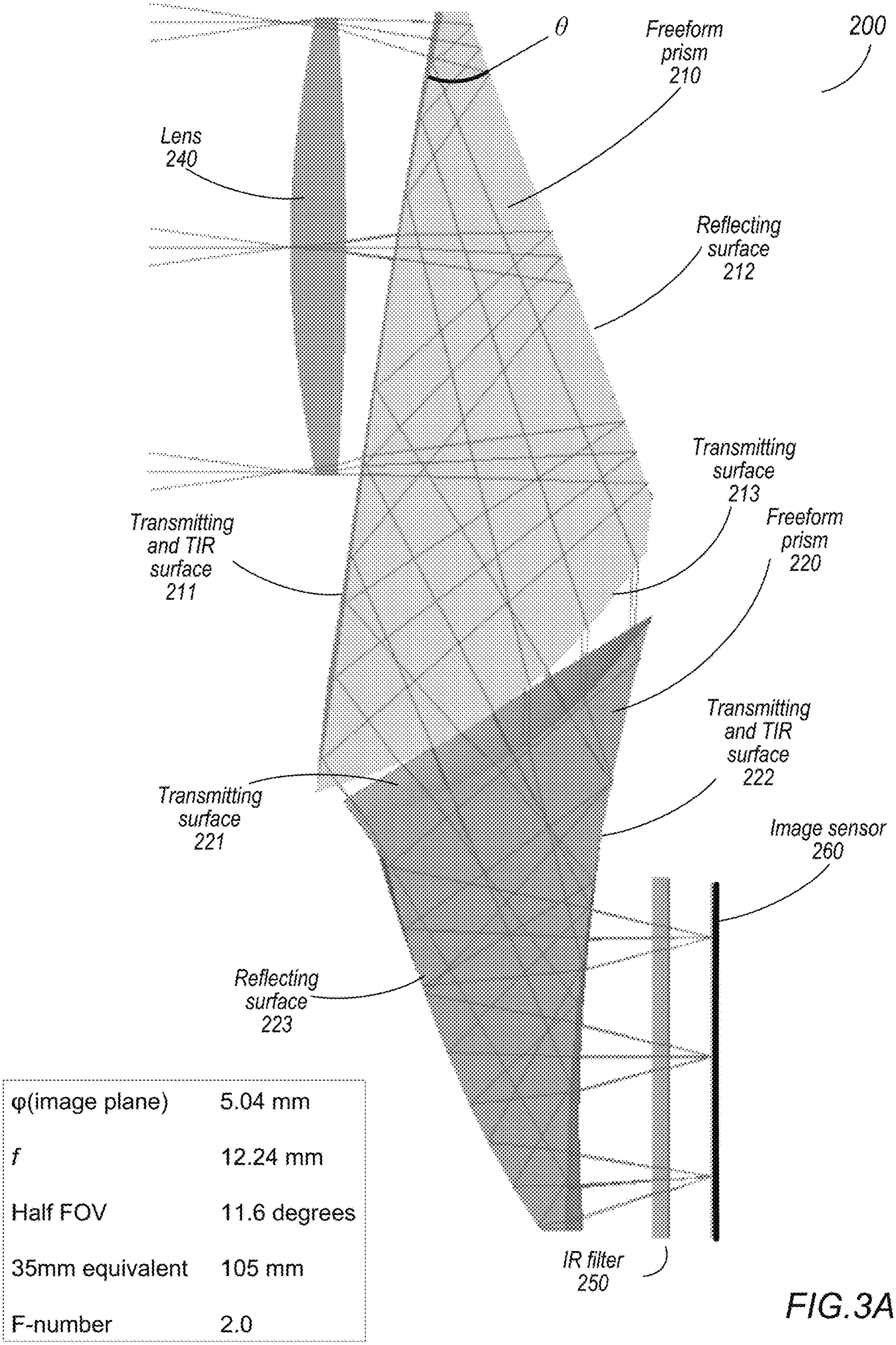
FIG. 3A illustrates a second example embodiment of a freeform folded optical system.

FIG. 3A illustrates a second example embodiment of a freeform folded optical system. FIG. 3A shows a cutaway view of a camera 200 that may include a freeform folded optical system that includes, in order along an optical axis from an object side of the system to an image side of the system, an objective lens 240, a first freeform optical prism 210, and a second freeform optical prism 220. The camera 200 may also include an aperture stop, for example located on the object side of lens 240. The camera 200 may also include an image sensor 260 located on the image side of freeform optical prism 220. The camera 200 may also include an IR filter 250, for example located between image sensor 260 and freeform optical prism 220. The folded optical system of FIG. 3A affects light received from an object field to form an image at an image plane at or near a surface of the image sensor 260. In some embodiments, the image plane formed by the folded optical system is parallel to a principal plane of the objective lens 240.

Objective lens 240 may be a rotationally symmetric singlet lens. At least one of the surfaces of objective lens 240 may be aspherical. Objective lens 240 may have positive refractive power. Both freeform optical prism 210 and freeform optical prism 220 have optical power. At least one surface of freeform optical prism 210 and of freeform optical prism 220 is a freeform surface.

Freeform optical prism 210 folds the optical axis twice. A first surface 211 of freeform optical prism 210 is a transmitting and total internal reflection (TIR) surface, a second surface 212 of the freeform optical prism 210 is a reflecting surface, and a third surface 213 of freeform optical prism 210 is a transmitting surface. Freeform optical prism 220 also folds the optical axis twice. A first surface 221 of freeform optical prism 220 is a transmitting surface, a second surface 222 of freeform optical prism 220 is a reflecting and TIR surface, and a third surface 223 of freeform optical prism 220 is a transmitting surface.

The example freeform folded optical system shown in FIG. 3A meets conditions 1 through 5 described above. In an example embodiment of a freeform folded optical system as shown in FIG. 3A, effective focal length is 12.24 mm, F-number is 2.0, semi-diagonal image height is 2.52 mm, half FOV is 11.6 degrees, and 35 mm equivalent focal length is 105 mm. Note, however, that shape, surface shape, spacing, materials, and other aspects of one or more of objective lens 240, freeform prism 210, and freeform prism 220 may be adjusted to change one or more of these optical characteristics. Table 1 provides values for various optical and physical parameters of the example freeform folded optical systems of camera 200. Tables 3A through 3K provide prescriptions for the optical elements of the example freeform folded optical system of camera 200.

Figure 3B:
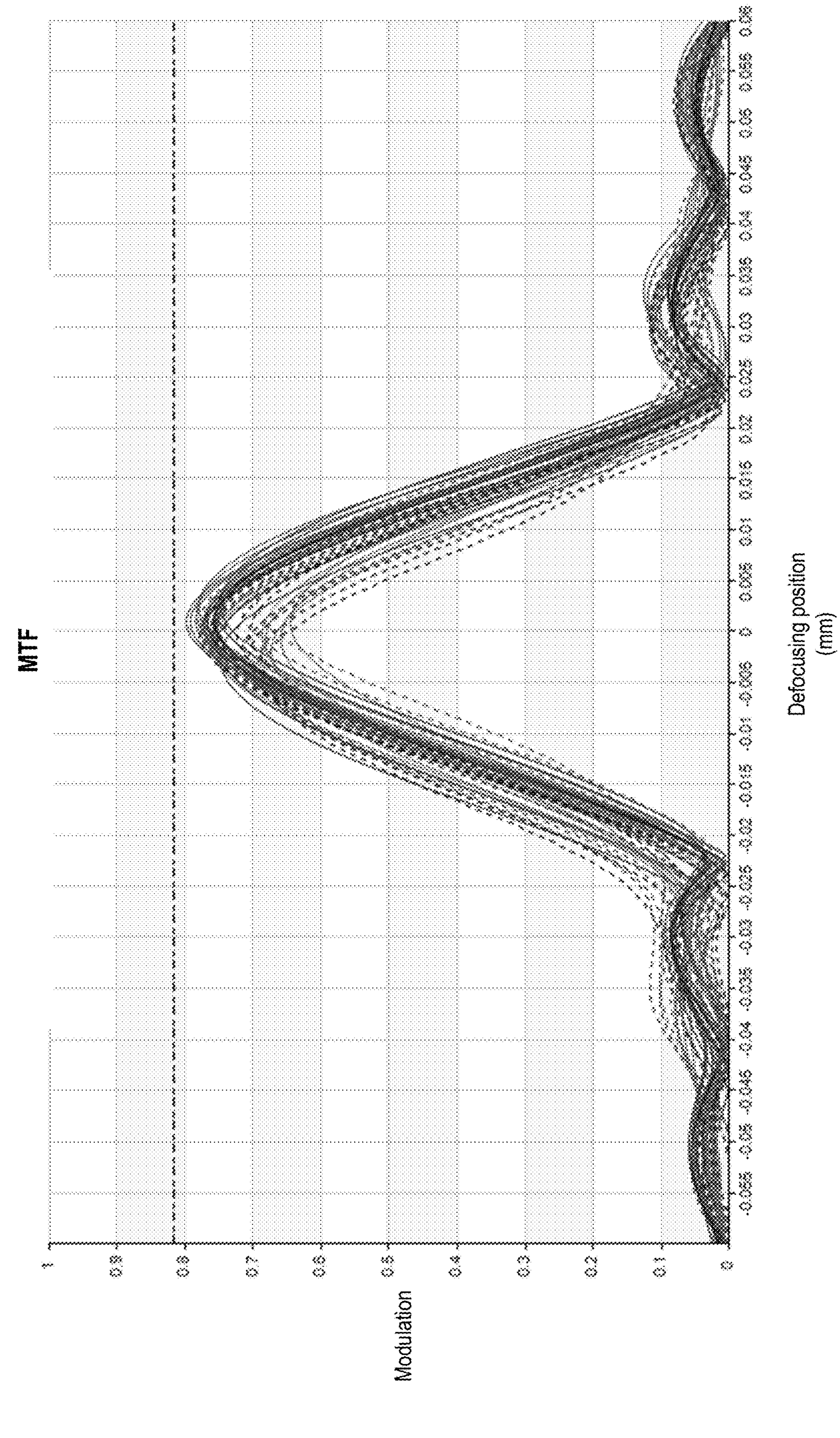
FIG. 3B shows the modulation transfer function (MTF) for the freeform folded optical system of FIG. 3A.
Figure 3C:
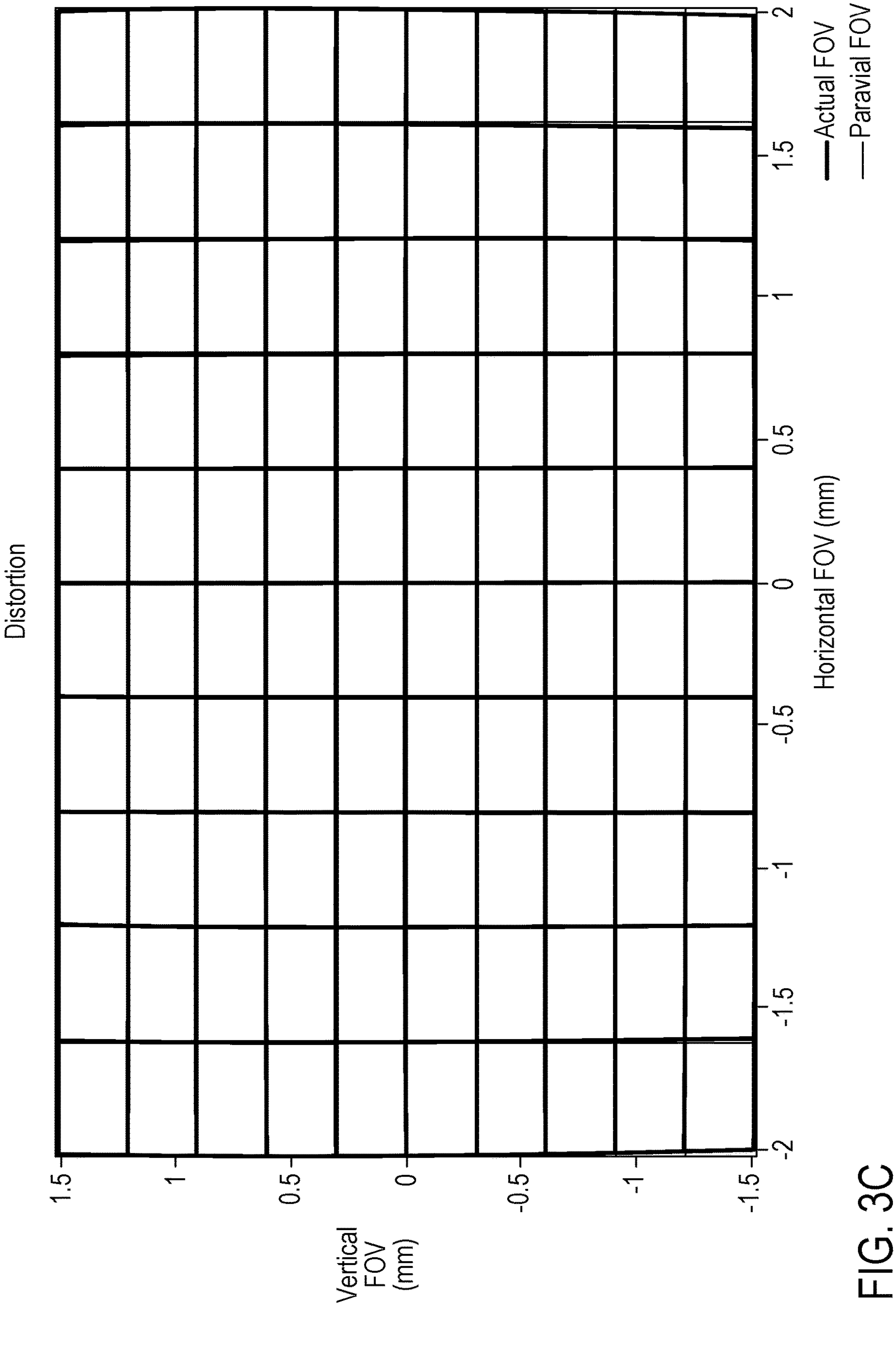
FIG. 3C shows distortion for the freeform folded optical system of FIG. 3A

FIGS. 3B and 3C illustrate optical performance for the freeform folded optical system of FIG. 3A. FIG. 3B shows the modulation transfer function (MTF) for the freeform folded optical system of FIG. 3A. The frequency of MTF is 125 lp/mm. FIG. 3C shows distortion for the freeform folded optical system of FIG. 2A. As shown by FIGS. 3B and 3C, both the MTF and the distortion in the freeform folded optical system of FIG. 3A are good.

Figure 4A:
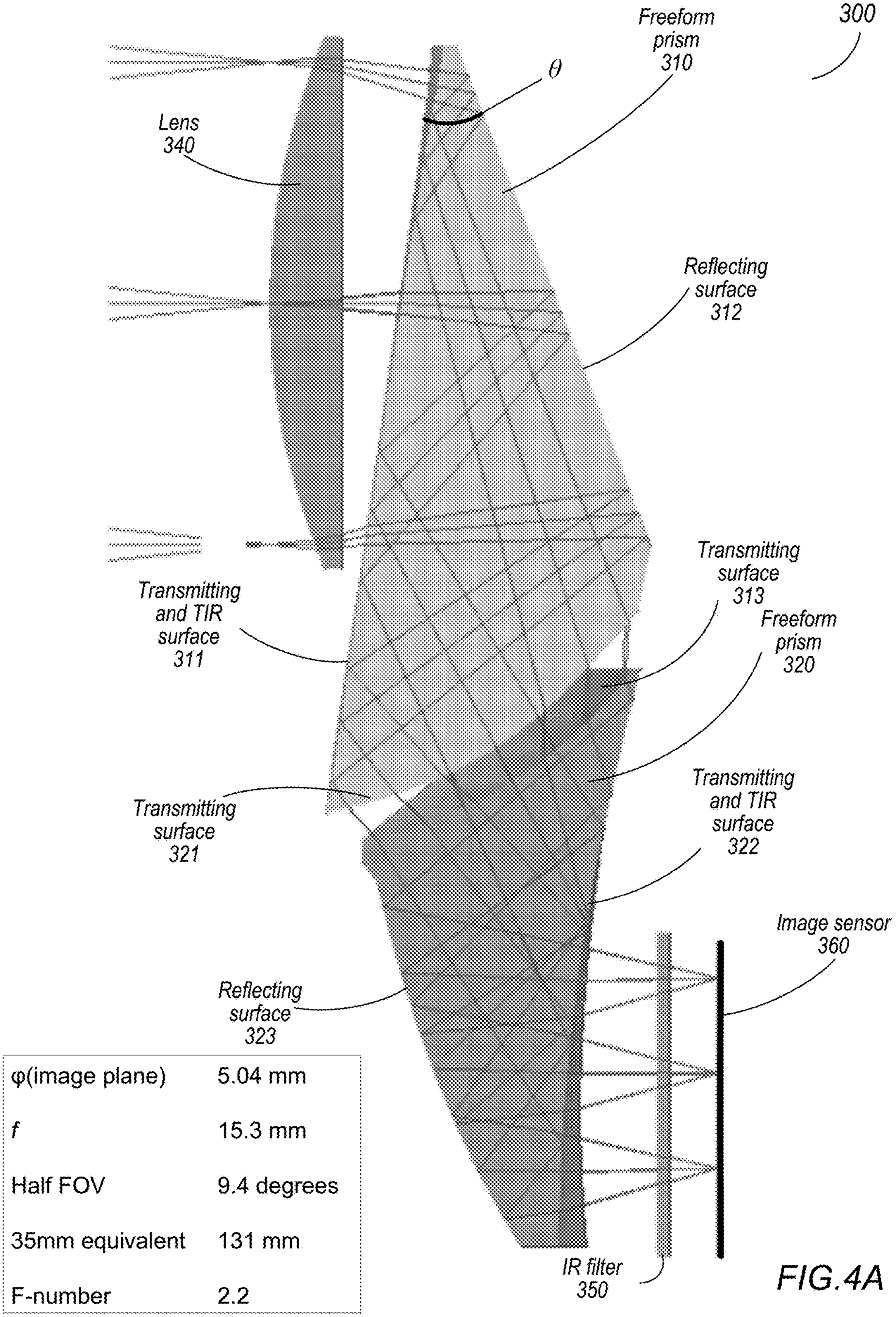
FIG. 4A illustrates a third example embodiment of a freeform folded optical system.

FIG. 4A illustrates a third example embodiment of a freeform folded optical system. FIG. 4A shows a cutaway view of a camera 300 that may include a freeform folded optical system that includes, in order along an optical axis from an object side of the system to an image side of the system, an objective lens 340, a first freeform optical prism 310, and a second freeform optical prism 320. The camera 300 may also include an aperture stop, for example located on the object side of lens 340. The camera 300 may also include an image sensor 360 located on the image side of freeform optical prism 320. The camera 300 may also include an IR filter 350, for example located between image sensor 360 and freeform optical prism 320. The folded optical system of FIG. 4A affects light received from an object field to form an image at an image plane at or near a surface of the image sensor 360. In some embodiments, the image plane formed by the folded optical system is parallel to a principal plane of the objective lens 340.

Objective lens 340 may be a rotationally symmetric singlet lens. At least one of the surfaces of objective lens 340 may be aspherical. Objective lens 340 may have positive refractive power. Both freeform optical prism 310 and freeform optical prism 320 have optical power. At least one surface of freeform optical prism 310 and of freeform optical prism 320 is a freeform surface.

Freeform optical prism 310 folds the optical axis twice. A first surface 311 of freeform optical prism 310 is a transmitting and total internal reflection (TIR) surface, a second surface 312 of the freeform optical prism 310 is a reflecting surface, and a third surface 313 of freeform optical prism 310 is a transmitting surface. Freeform optical prism 320 also folds the optical axis twice. A first surface 321 of freeform optical prism 320 is a transmitting surface, a second surface 322 of freeform optical prism 320 is a reflecting and TIR surface, and a third surface 323 of freeform optical prism 320 is a transmitting surface.

The example freeform folded optical system shown in FIG. 4A meets conditions 1 through 5 described above. In an example embodiment of a freeform folded optical system as shown in FIG. 4A, effective focal length is 15.3 mm, F-number is 2.2, semi-diagonal image height is 2.52 mm, half FOV is 9.4 degrees, and 35 mm equivalent focal length is 131 mm. Note, however, that shape, surface shape, spacing, materials, and other aspects of one or more of objective lens 340, freeform prism 310, and freeform prism 320 may be adjusted to change one or more of these optical characteristics. Table 1 provides values for various optical and physical parameters of the example freeform folded optical systems of camera 300. Tables 4A through 4K provide prescriptions for the optical elements of the example freeform folded optical system of camera 300.

Figure 4B:
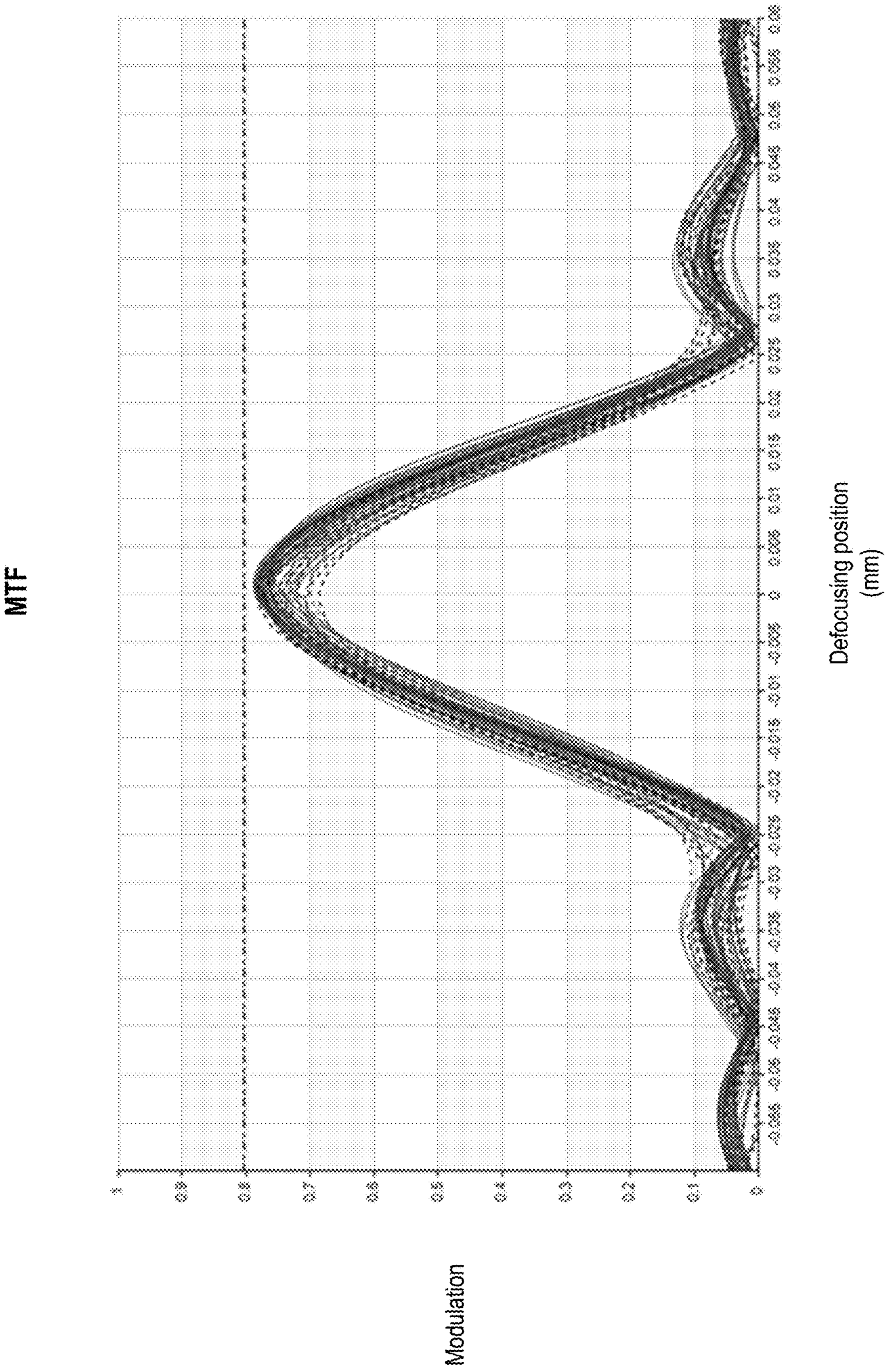
FIG. 4B shows the modulation transfer function (MTF) for the freeform folded optical system of FIG. 4A.
Figure 4C:
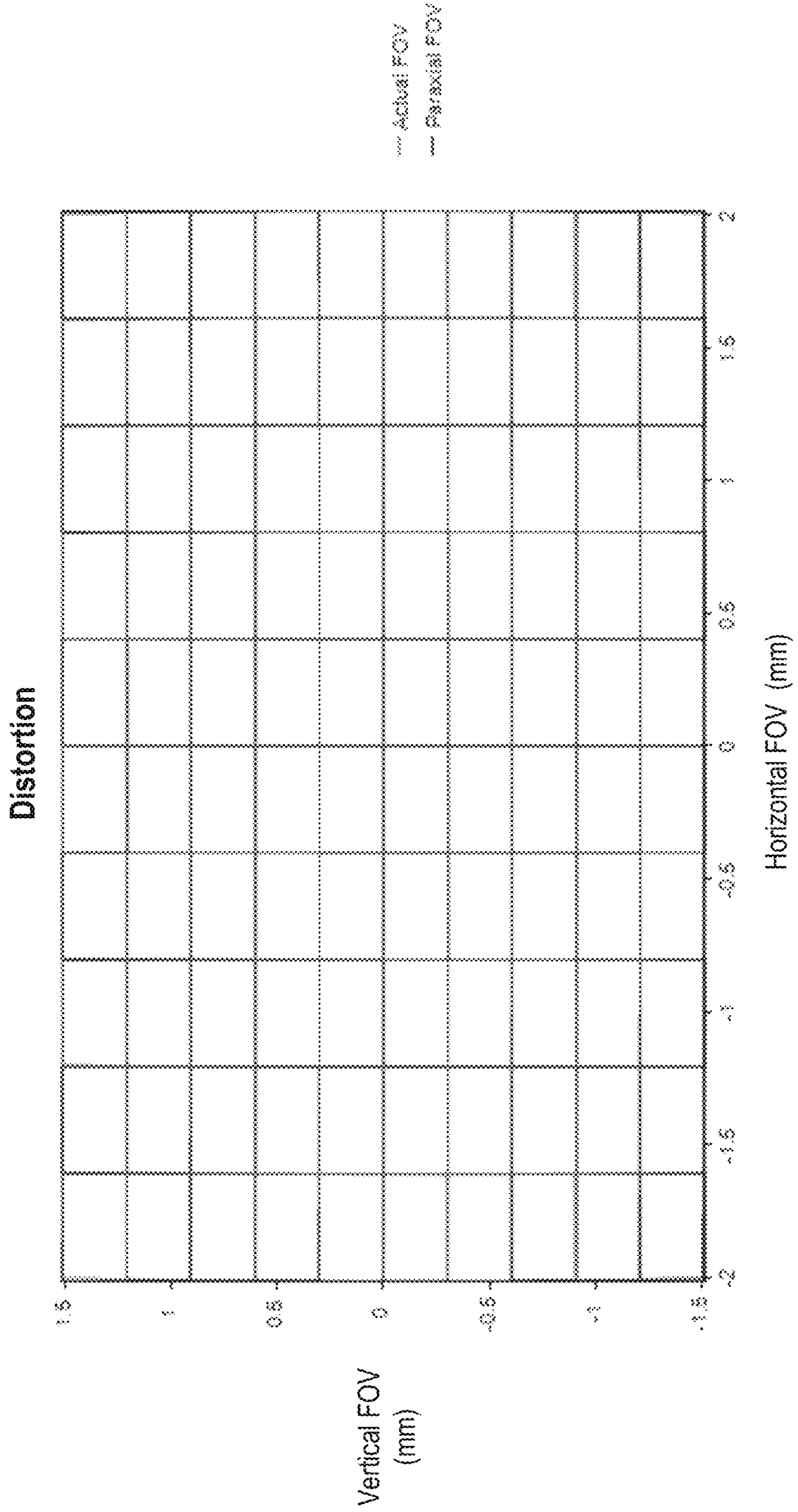
FIG. 4C shows distortion for the freeform folded optical system of FIG. 4A.

FIGS. 4B and 4C illustrate optical performance for the freeform folded optical system of FIG. 4A. FIG. 4B shows the modulation transfer function (MTF) for the freeform folded optical system of FIG. 4A. The frequency of MTF is 125 lp/mm. FIG. 4C shows distortion for the freeform folded optical system of FIG. 4A. As shown by FIGS. 4B and 4C, both the MTF and the distortion in the freeform folded optical system of FIG. 4A are good.

Figure 5A:
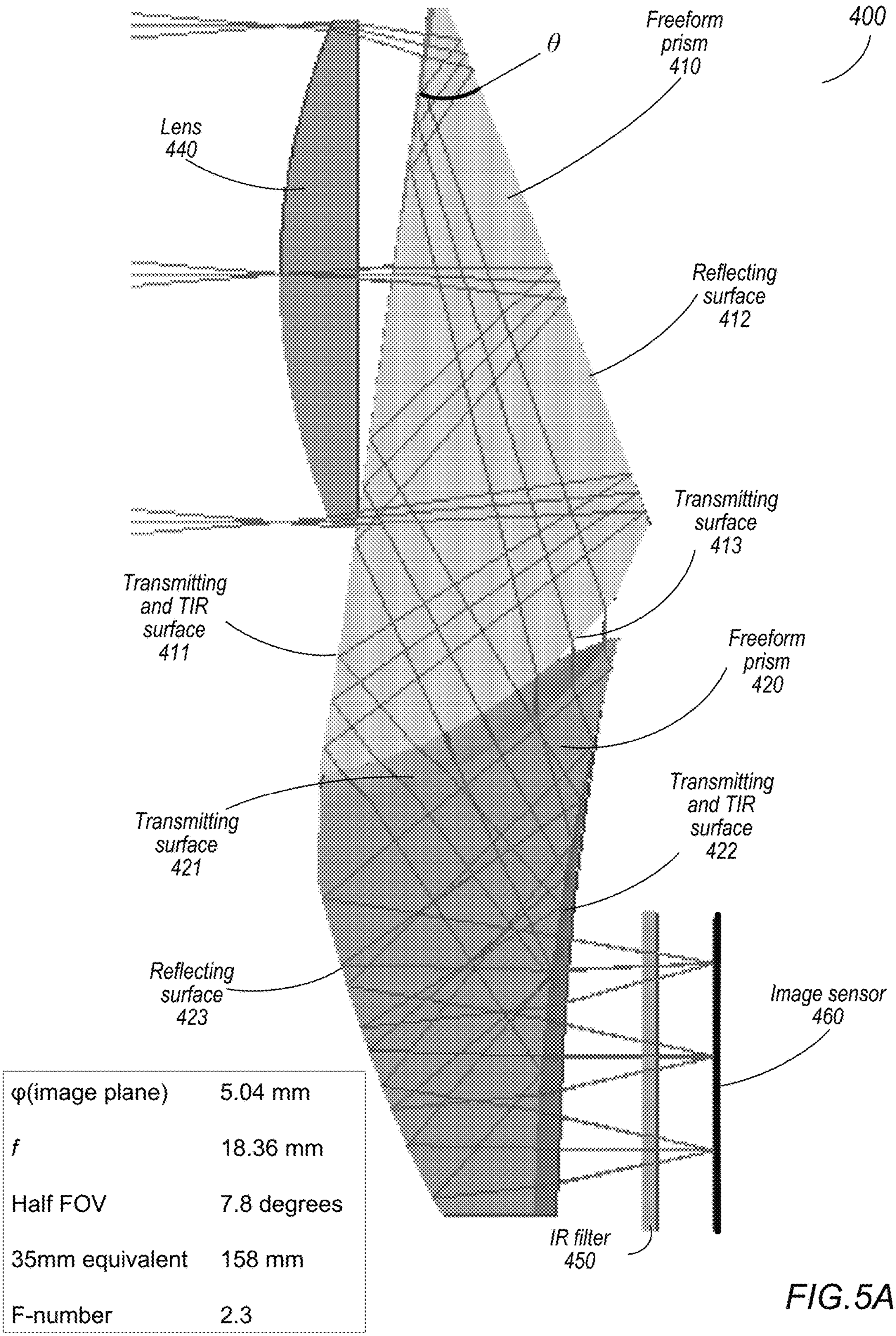
FIG. 5A illustrates a fourth example embodiment of a freeform folded optical system.

FIG. 5A illustrates a fourth example embodiment of a freeform folded optical system. FIG. 5A shows a cutaway view of a camera 400 that may include a freeform folded optical system that includes, in order along an optical axis from an object side of the system to an image side of the system, an objective lens 440, a first freeform optical prism 410, and a second freeform optical prism 420. The camera 400 may also include an aperture stop, for example located on the object side of lens 440. The camera 400 may also include an image sensor 460 located on the image side of freeform optical prism 420. The camera 400 may also include an IR filter 450, for example located between image sensor 460 and freeform optical prism 420. The folded optical system of FIG. 5A affects light received from an object field to form an image at an image plane at or near a surface of the image sensor 460. In some embodiments, the image plane formed by the folded optical system is parallel to a principal plane of the objective lens 440.

Objective lens 440 may be a rotationally symmetric singlet lens. At least one of the surfaces of objective lens 440 may be aspherical. Objective lens 440 may have positive refractive power. Both freeform optical prism 410 and freeform optical prism 420 have optical power. At least one surface of freeform optical prism 410 and of freeform optical prism 420 is a freeform surface.

Freeform optical prism 410 folds the optical axis twice. A first surface 411 of freeform optical prism 410 is a transmitting and total internal reflection (TIR) surface, a second surface 412 of the freeform optical prism 410 is a reflecting surface, and a third surface 413 of freeform optical prism 410 is a transmitting surface. Freeform optical prism 420 also folds the optical axis twice. A first surface 421 of freeform optical prism 420 is a transmitting surface, a second surface 422 of freeform optical prism 420 is a reflecting and TIR surface, and a third surface 423 of freeform optical prism 420 is a transmitting surface.

The example freeform folded optical system shown in FIG. 5A meets conditions 1 through 5 described above. In an example embodiment of a freeform folded optical system as shown in FIG. 5A, effective focal length is 18.36 mm, F-number is 2.3, semi-diagonal image height is 2.52 mm, half FOV is 7.8 degrees, and 35 mm equivalent focal length is 158 mm. Note, however, that shape, surface shape, spacing, materials, and other aspects of one or more of objective lens 440, freeform prism 410, and freeform prism 420 may be adjusted to change one or more of these optical characteristics. Table 1 provides values for various optical and physical parameters of the example freeform folded optical systems of camera 400. Tables 5A through 5K provide prescriptions for the optical elements of the example freeform folded optical system of camera 400.

Figure 5B:
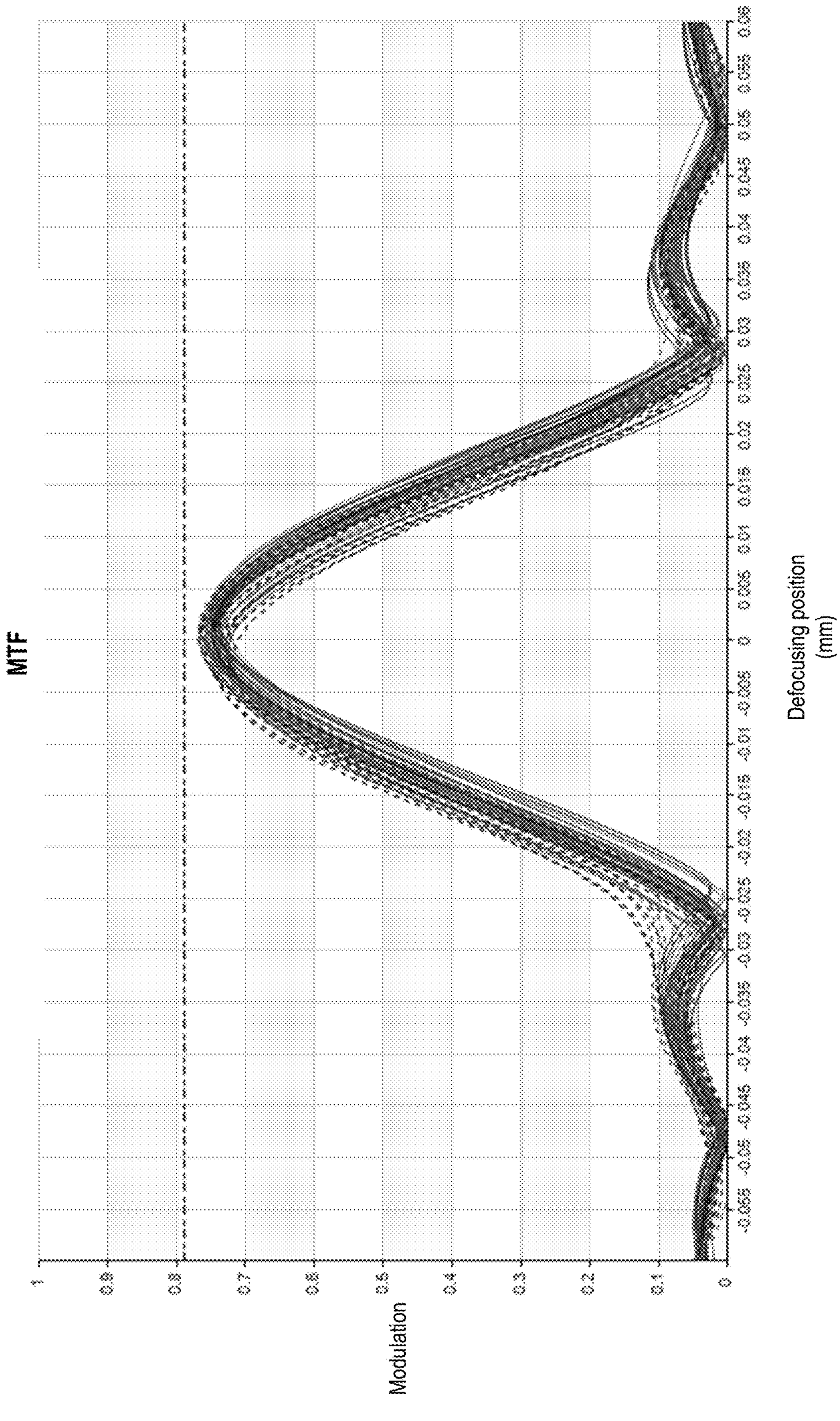
FIG. 5B shows the modulation transfer function (MTF) for the freeform folded optical system of FIG. 5A.
Figure 5C:
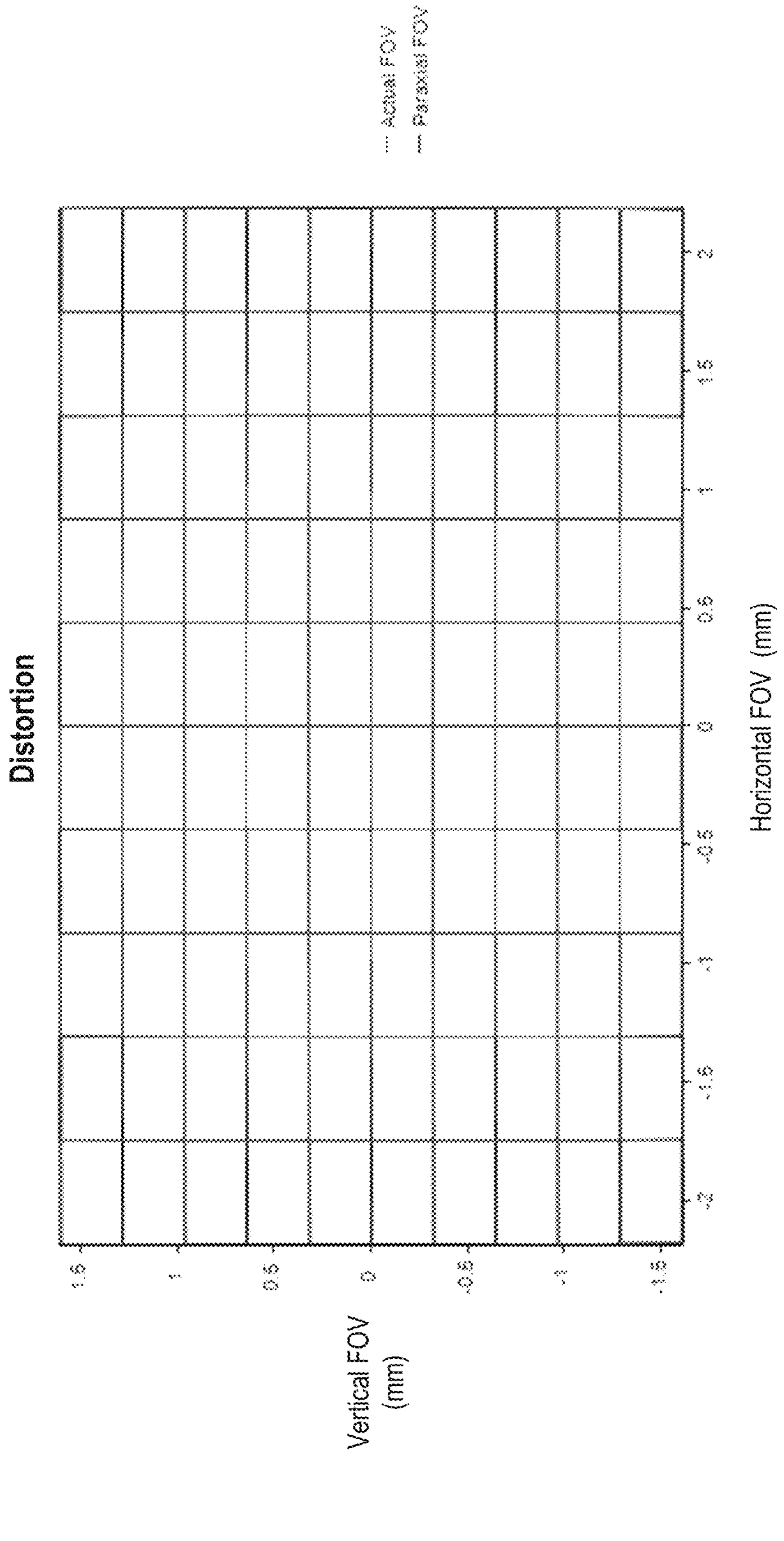
FIG. 5C shows distortion for the freeform folded optical system of FIG. 5A.

FIGS. 5B and 5C illustrate optical performance for the freeform folded optical system of FIG. 5A. FIG. 5B shows the modulation transfer function (MTF) for the freeform folded optical system of FIG. 5A. The frequency of MTF is 125 lp/mm. FIG. 5C shows distortion for the freeform folded optical system of FIG. 5A. As shown by FIGS. 5B and 5C, both the MTF and the distortion in the freeform folded optical system of FIG. 5A are good.

Figure 6A:
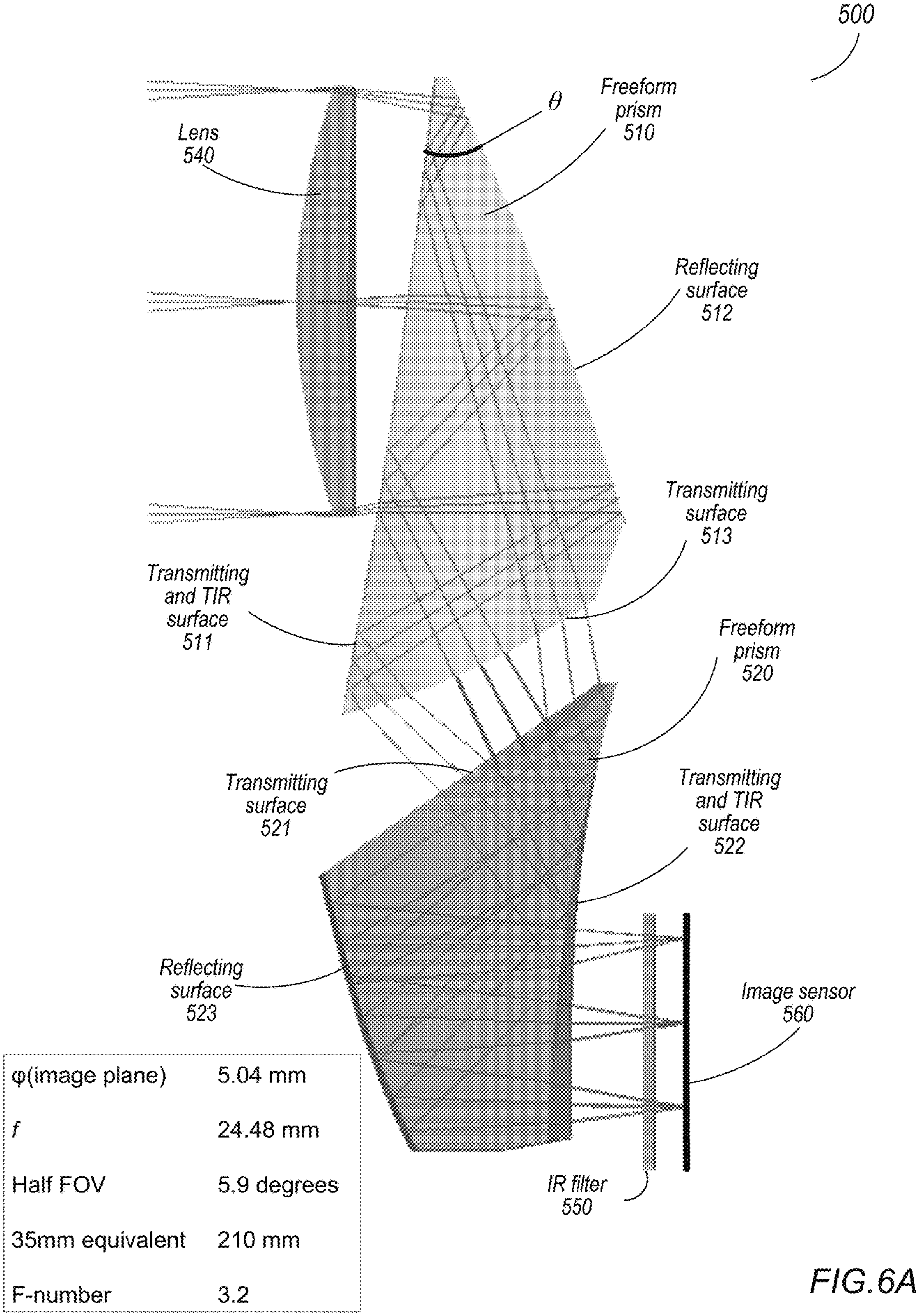
FIG. 6A illustrates a fifth example embodiment of a freeform folded optical system.

FIG. 6A illustrates a fifth example embodiment of a freeform folded optical system. FIG. 6A shows a cutaway view of a camera 500 that may include a freeform folded optical system that includes, in order along an optical axis from an object side of the system to an image side of the system, an objective lens 540, a first freeform optical prism 510, and a second freeform optical prism 520. The camera 500 may also include an aperture stop, for example located on the object side of lens 540. The camera 500 may also include an image sensor 560 located on the image side of freeform optical prism 520. The camera 500 may also include an IR filter 550, for example located between image sensor 560 and freeform optical prism 520. The folded optical system of FIG. 6A affects light received from an object field to form an image at an image plane at or near a surface of the image sensor 560. In some embodiments, the image plane formed by the folded optical system is parallel to a principal plane of the objective lens 540.

Objective lens 540 may be a rotationally symmetric singlet lens. At least one of the surfaces of objective lens 540 may be aspherical. Objective lens 540 may have positive refractive power. Both freeform optical prism 510 and freeform optical prism 520 have optical power. At least one surface of freeform optical prism 510 and of freeform optical prism 520 is a freeform surface.

Freeform optical prism 510 folds the optical axis twice. A first surface 511 of freeform optical prism 510 is a transmitting and total internal reflection (TIR) surface, a second surface 512 of the freeform optical prism 510 is a reflecting surface, and a third surface 513 of freeform optical prism 510 is a transmitting surface. Freeform optical prism 520 also folds the optical axis twice. A first surface 521 of freeform optical prism 520 is a transmitting surface, a second surface 522 of freeform optical prism 520 is a reflecting and TIR surface, and a third surface 523 of freeform optical prism 520 is a transmitting surface.

The example freeform folded optical system shown in FIG. 6A meets conditions 1 through 5 described above. In an example embodiment of a freeform folded optical system as shown in FIG. 6A, effective focal length is 24.48 mm, F-number is 3.2, semi-diagonal image height is 2.52 mm, half FOV is 5.9 degrees, and 35 mm equivalent focal length is 210 mm. Note, however, that shape, surface shape, spacing, materials, and other aspects of one or more of objective lens 540, freeform prism 510, and freeform prism 520 may be adjusted to change one or more of these optical characteristics. Table 1 provides values for various optical and physical parameters of the example freeform folded optical systems of camera 500. Tables 6A through 6K provide prescriptions for the optical elements of the example freeform folded optical system of camera 500.

Figure 6B:
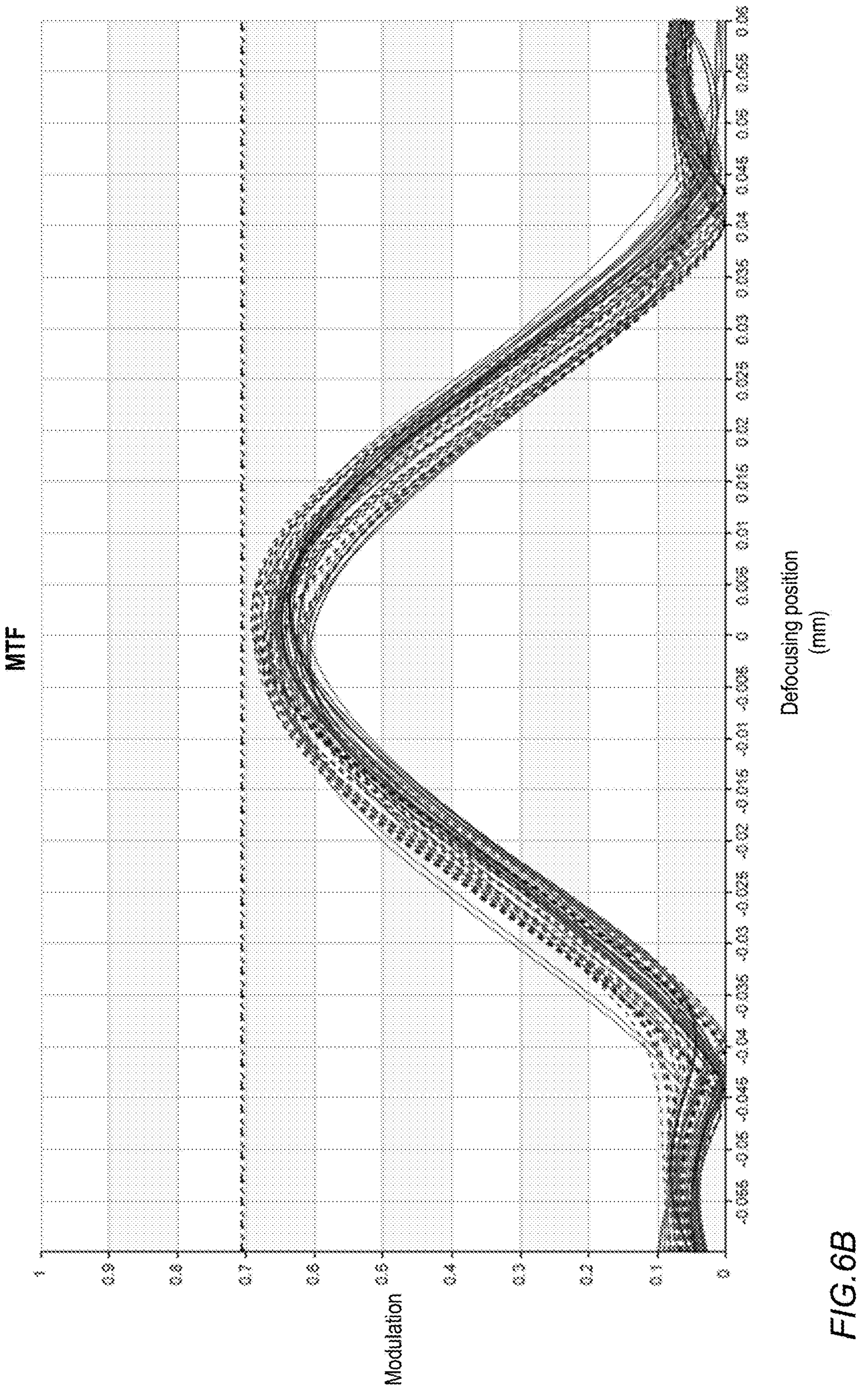
FIG. 6B shows the modulation transfer function (MTF) for the freeform folded optical system of FIG. 6A.
Figure 6C:
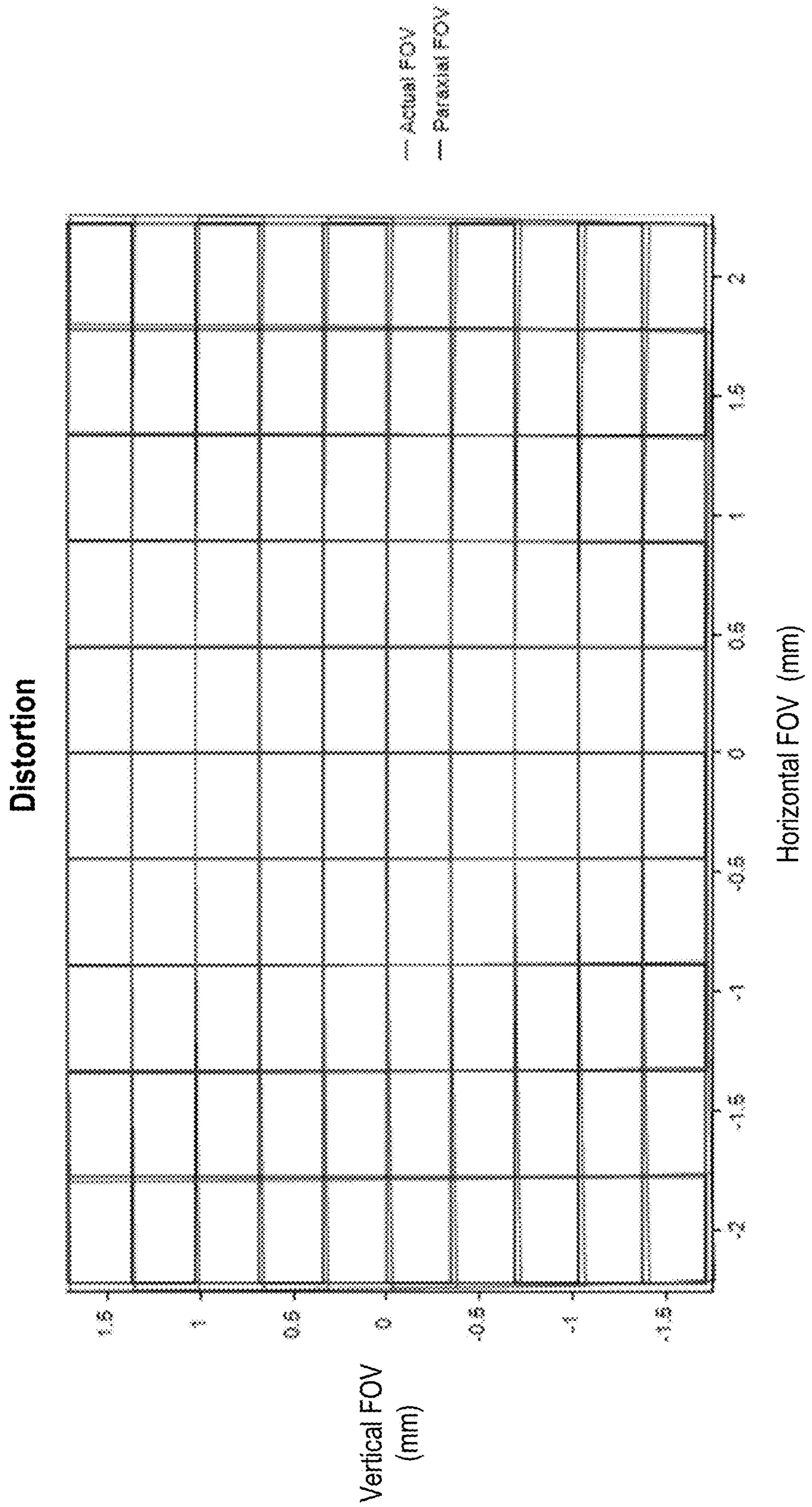
FIG. 6C shows distortion for the freeform folded optical system of FIG. 6A.

FIGS. 6B and 6C illustrate optical performance for the freeform folded optical system of FIG. 6A. FIG. 6B shows the modulation transfer function (MTF) for the freeform folded optical system of FIG. 6A. The frequency of MTF is 125 lp/mm. FIG. 6C shows distortion for the freeform folded optical system of FIG. 6A. As shown by FIGS. 6B and 6C, both the MTF and the distortion in the freeform folded optical system of FIG. 6A are good.

Figure 7A:
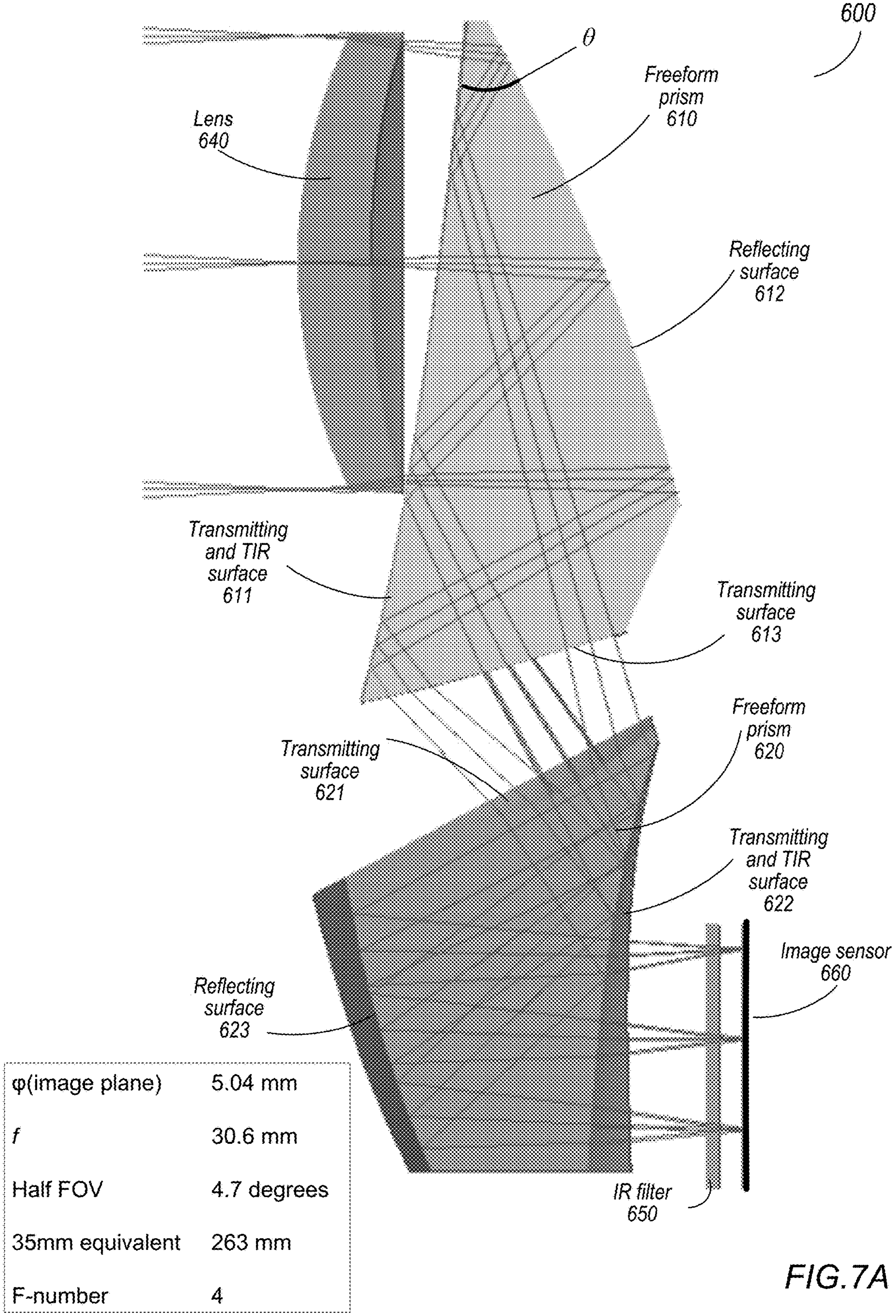
FIG. 7A illustrates a sixth example embodiment of a freeform folded optical system.

FIG. 7A illustrates a sixth example embodiment of a freeform folded optical system. FIG. 7A shows a cutaway view of a camera 600 that may include a freeform folded optical system that includes, in order along an optical axis from an object side of the system to an image side of the system, an objective lens 640, a first freeform optical prism 610, and a second freeform optical prism 620. The camera 600 may also include an aperture stop, for example located on the object side of lens 640. The camera 600 may also include an image sensor 660 located on the image side of freeform optical prism 620. The camera 600 may also include an IR filter 650, for example located between image sensor 660 and freeform optical prism 620. The folded optical system of FIG. 7A affects light received from an object field to form an image at an image plane at or near a surface of the image sensor 660. In some embodiments, the image plane formed by the folded optical system is parallel to a principal plane of the objective lens 640.

Objective lens 640 may be a rotationally symmetric singlet lens. At least one of the surfaces of objective lens 640 may be aspherical. Objective lens 640 may have positive refractive power. Both freeform optical prism 610 and freeform optical prism 620 have optical power. At least one surface of freeform optical prism 610 and of freeform optical prism 620 is a freeform surface.

Freeform optical prism 610 folds the optical axis twice. A first surface 611 of freeform optical prism 610 is a transmitting and total internal reflection (TIR) surface, a second surface 612 of the freeform optical prism 610 is a reflecting surface, and a third surface 613 of freeform optical prism 610 is a transmitting surface. Freeform optical prism 620 also folds the optical axis twice. A first surface 621 of freeform optical prism 620 is a transmitting surface, a second surface 622 of freeform optical prism 620 is a reflecting and TIR surface, and a third surface 623 of freeform optical prism 620 is a transmitting surface.

The example freeform folded optical system shown in FIG. 7A meets conditions 1 through 5 described above. In an example embodiment of a freeform folded optical system as shown in FIG. 7A, effective focal length is 30.6 mm, F-number is 4, semi-diagonal image height is 2.52 mm, half FOV is 4.7 degrees, and 35 mm equivalent focal length is 263 mm. Note, however, that shape, surface shape, spacing, materials, and other aspects of one or more of objective lens 640, freeform prism 610, and freeform prism 620 may be adjusted to change one or more of these optical characteristics. Table 1 provides values for various optical and physical parameters of the example freeform folded optical systems of camera 600. Tables 7A through 7K provide prescriptions for the optical elements of the example freeform folded optical system of camera 600.

Figure 7B:
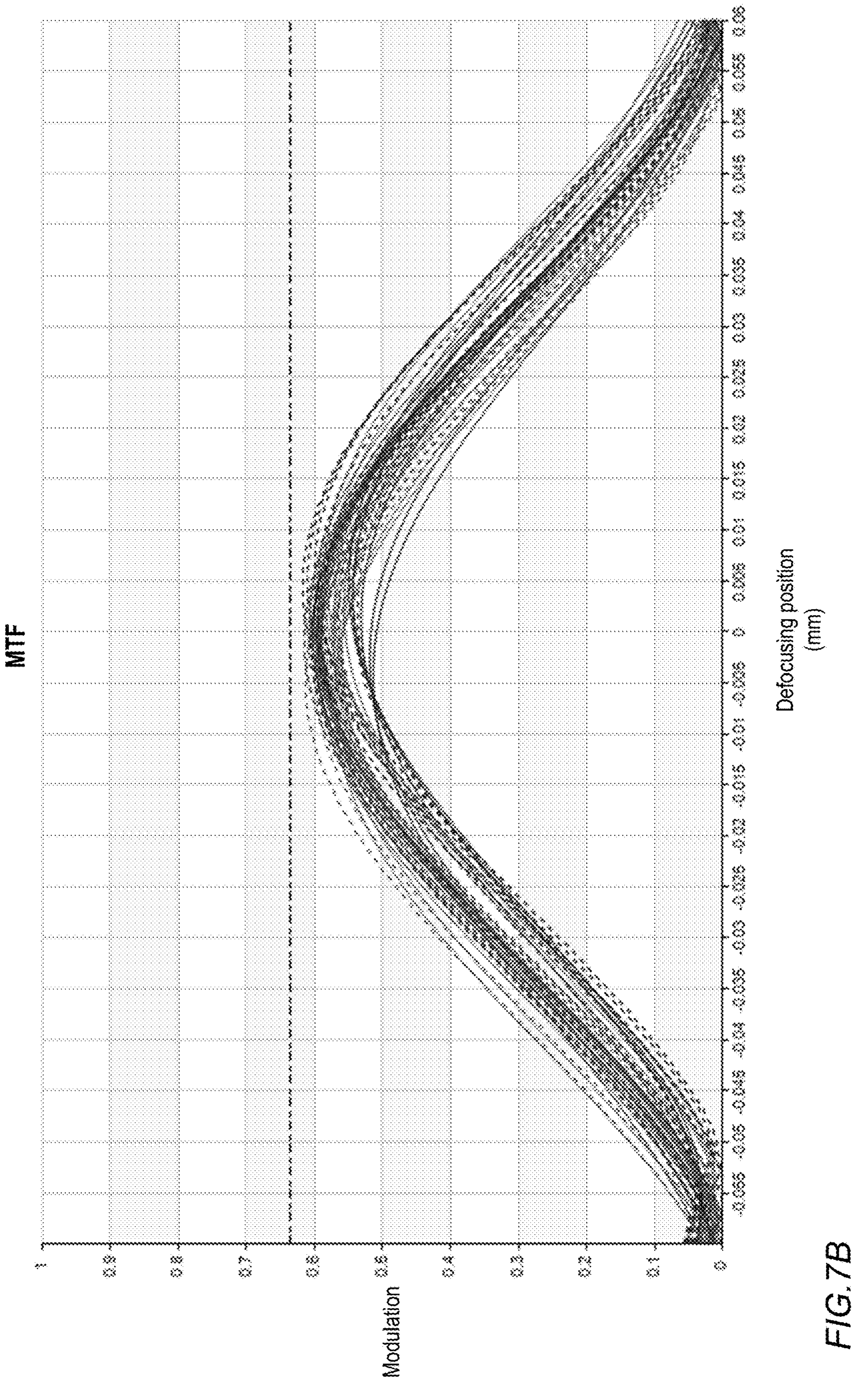
FIG. 7B shows the modulation transfer function (MTF) for the freeform folded optical system of FIG. 7A.
Figure 7C:
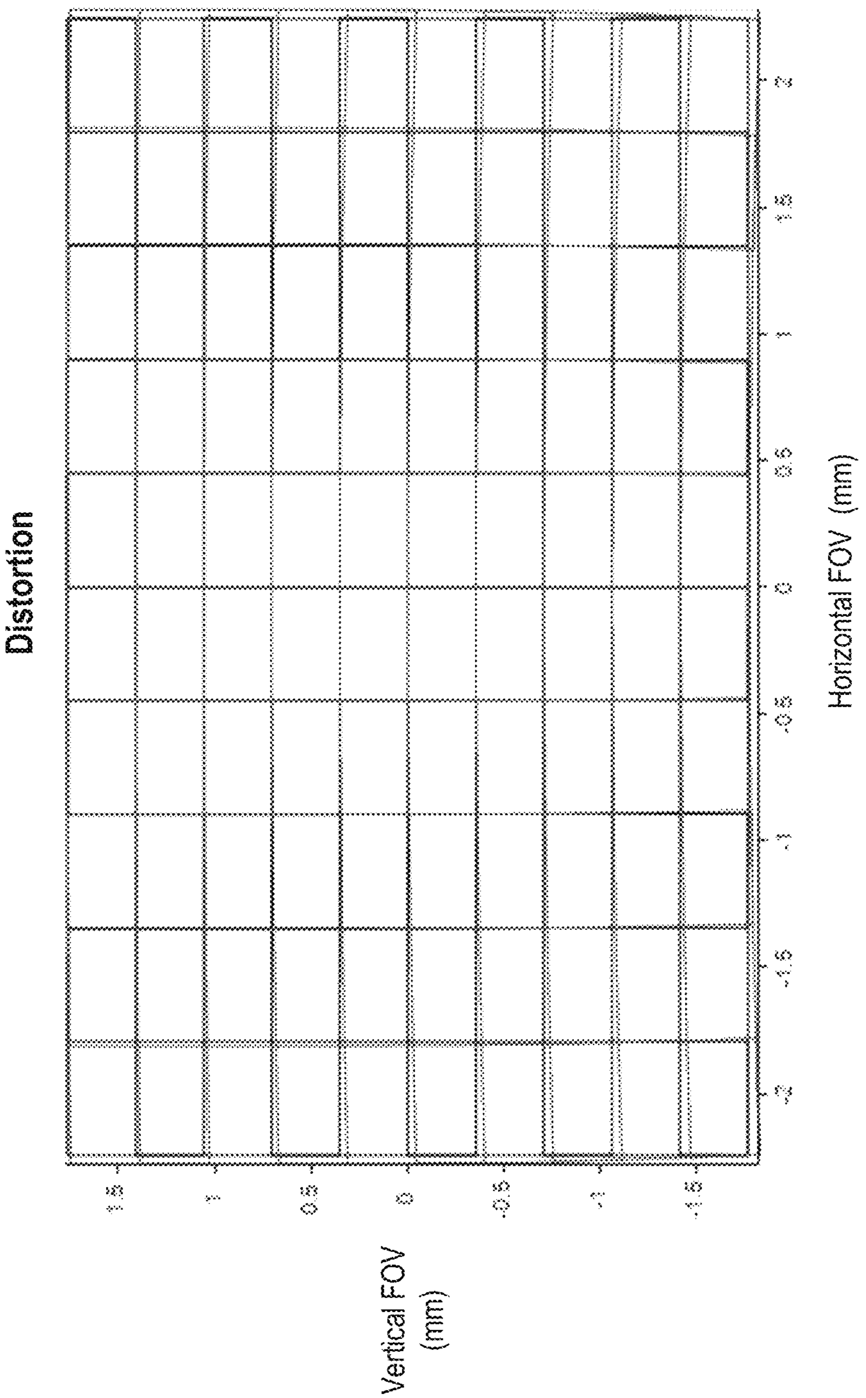
FIG. 7C shows distortion for the freeform folded optical system of FIG. 7A.

FIGS. 7B and 7C illustrate optical performance for the freeform folded optical system of FIG. 7A. FIG. 7B shows the modulation transfer function (MTF) for the freeform folded optical system of FIG. 7A. The frequency of MTF is 125 lp/mm. FIG. 7C shows distortion for the freeform folded optical system of FIG. 7A. As shown by FIGS. 7B and 7C, both the MTF and the distortion in the freeform folded optical system of FIG. 7A are good.

Figure 8A:
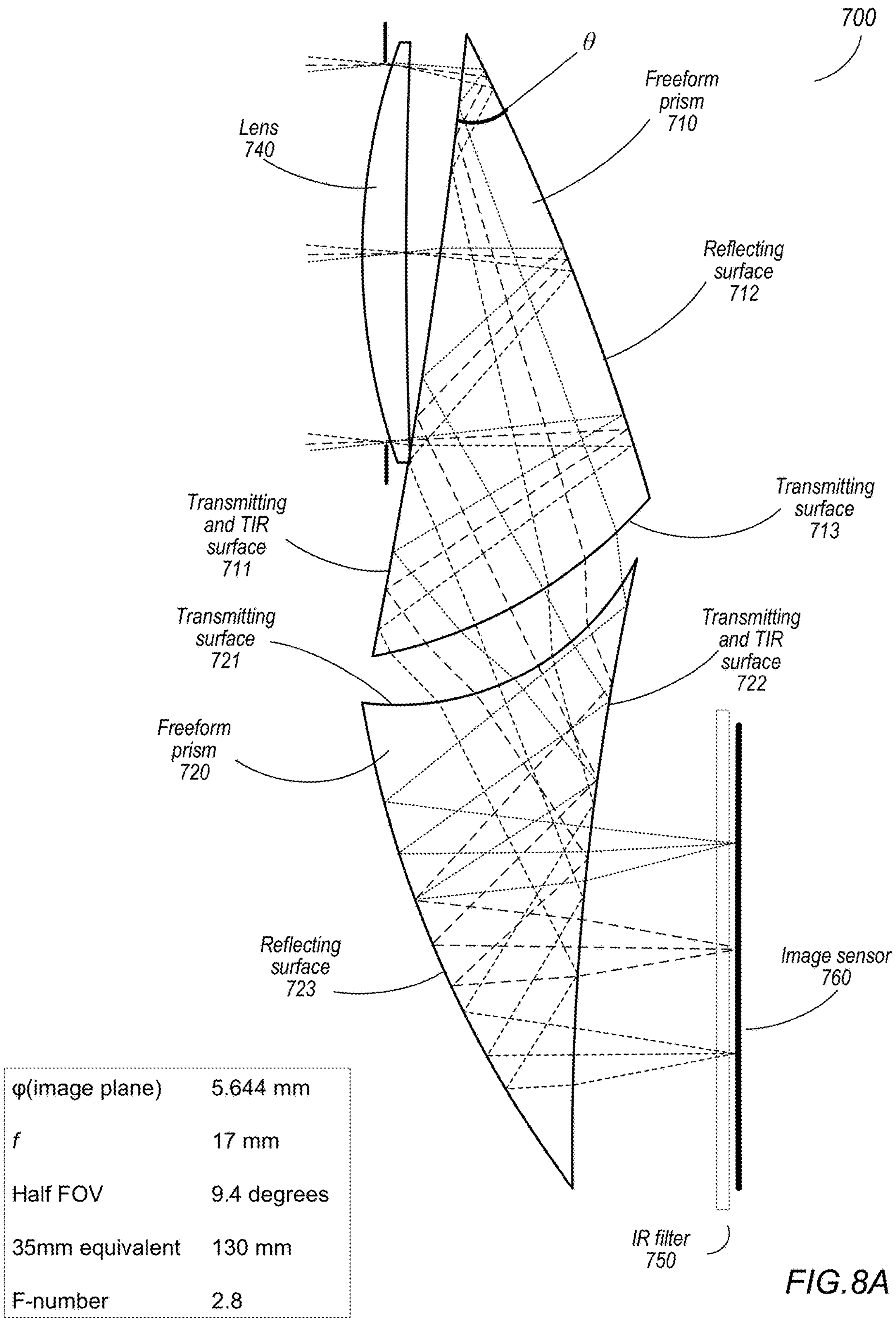
FIG. 8A illustrates a sixth example embodiment of a freeform folded optical system.

FIG. 8A illustrates a seventh example embodiment of a freeform folded optical system. FIG. 8A shows a cutaway view of a camera 700 that may include a freeform folded optical system that includes, in order along an optical axis from an object side of the system to an image side of the system, an objective lens 740, a first freeform optical prism 710, and a second freeform optical prism 720. The camera 700 may also include an aperture stop, for example located on the object side of lens 740. The camera 700 may also include an image sensor 760 located on the image side of freeform optical prism 720. The camera 700 may also include an IR filter 750, for example located between image sensor 760 and freeform optical prism 720. The folded optical system of FIG. 8A affects light received from an object field to form an image at an image plane at or near a surface of the image sensor 760. In some embodiments, the image plane formed by the folded optical system is parallel to a principal plane of the objective lens 740.

Objective lens 740 may be a rotationally symmetric singlet lens. At least one of the surfaces of objective lens 740 may be aspherical. Objective lens 740 may have positive refractive power. Objective lens 740 may be formed of an optical glass material. Using optical glass instead of plastic for the objective lens 740 may, for example, reduce the thermal shift of focus and axial color aberrations. Both freeform optical prism 710 and freeform optical prism 720 have optical power. At least one surface of freeform optical prism 710 and of freeform optical prism 720 is a freeform surface.

Freeform optical prism 710 folds the optical axis twice. A first surface 711 of freeform optical prism 710 is a transmitting and total internal reflection (TIR) surface, a second surface 712 of the freeform optical prism 710 is a reflecting surface, and a third surface 713 of freeform optical prism 710 is a transmitting surface. Freeform optical prism 720 also folds the optical axis twice. A first surface 721 of freeform optical prism 720 is a transmitting surface, a second surface 722 of freeform optical prism 720 is a reflecting and TIR surface, and a third surface 723 of freeform optical prism 720 is a transmitting surface.

The example freeform folded optical system shown in FIG. 8A meets conditions 1 through 5 described above. In an example embodiment of a freeform folded optical system as shown in FIG. 8A, effective focal length is 17 mm, F-number is 2.8, semi-diagonal image height is 2.822 mm, half FOV is 9.4 degrees, and 35 mm equivalent focal length is 130 mm. Note, however, that shape, surface shape, spacing, materials, and other aspects of one or more of objective lens 740, freeform prism 710, and freeform prism 720 may be adjusted to change one or more of these optical characteristics. Table 1 provides values for various optical and physical parameters of the example freeform folded optical systems of camera 700.

Figure 8B:
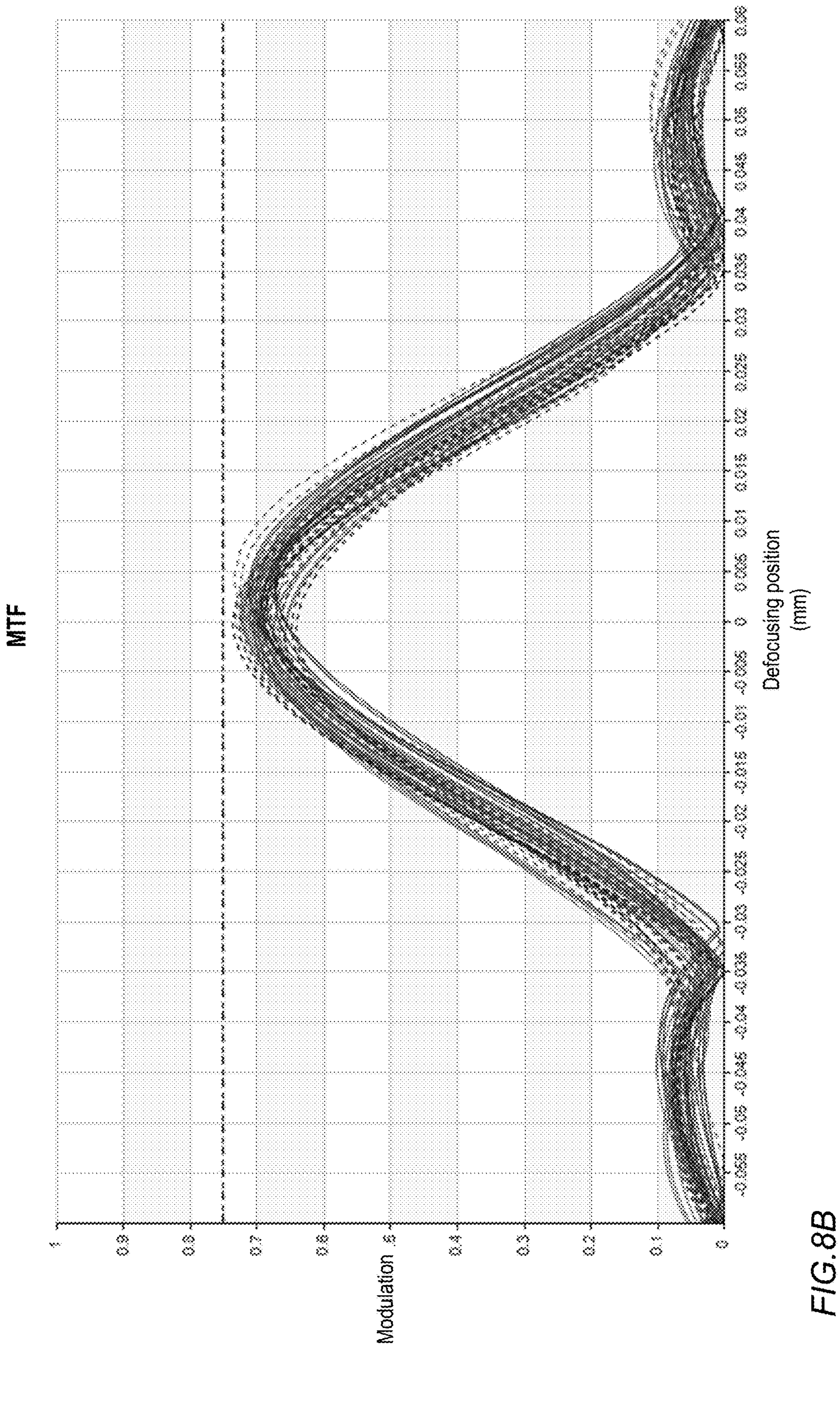
FIG. 8B shows the modulation transfer function (MTF) for the freeform folded optical system of FIG. 8A.
Figure 8C:
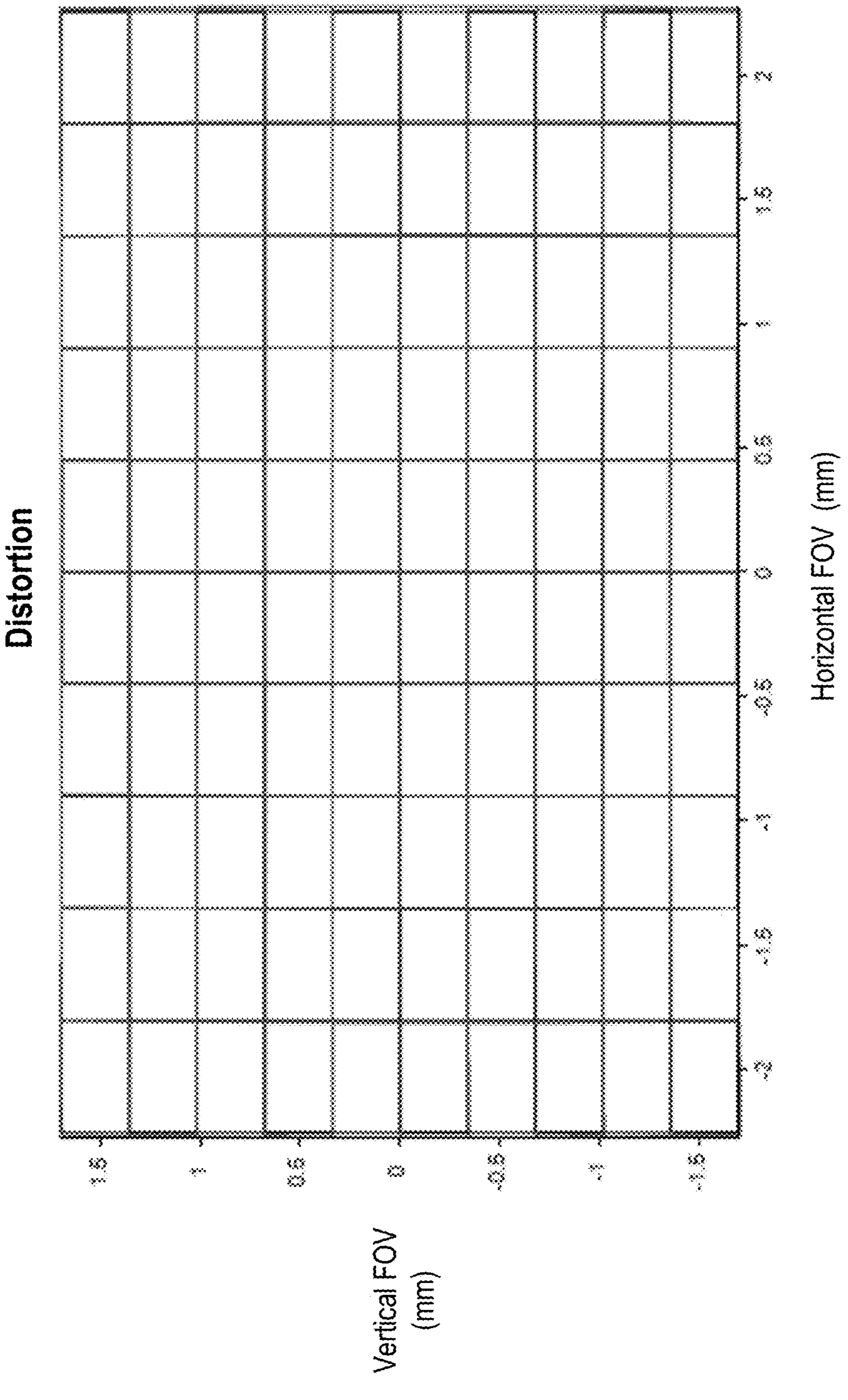
FIG. 8C shows distortion for the freeform folded optical system of FIG. 8A.

FIGS. 8B and 8C illustrate optical performance for the freeform folded optical system of FIG. 8A. FIG. 8B shows the modulation transfer function (MTF) for the freeform folded optical system of FIG. 8A. The frequency of MTF is 125 lp/mm. FIG. 8C shows distortion for the freeform folded optical system of FIG. 8A. As shown by FIGS. 8B and 8C, both the MTF and the distortion in the freeform folded optical system of FIG. 8A are good.

FIGS. 9 through 12 illustrate various alternative embodiments of a freeform folded optical system.

Figure 9:
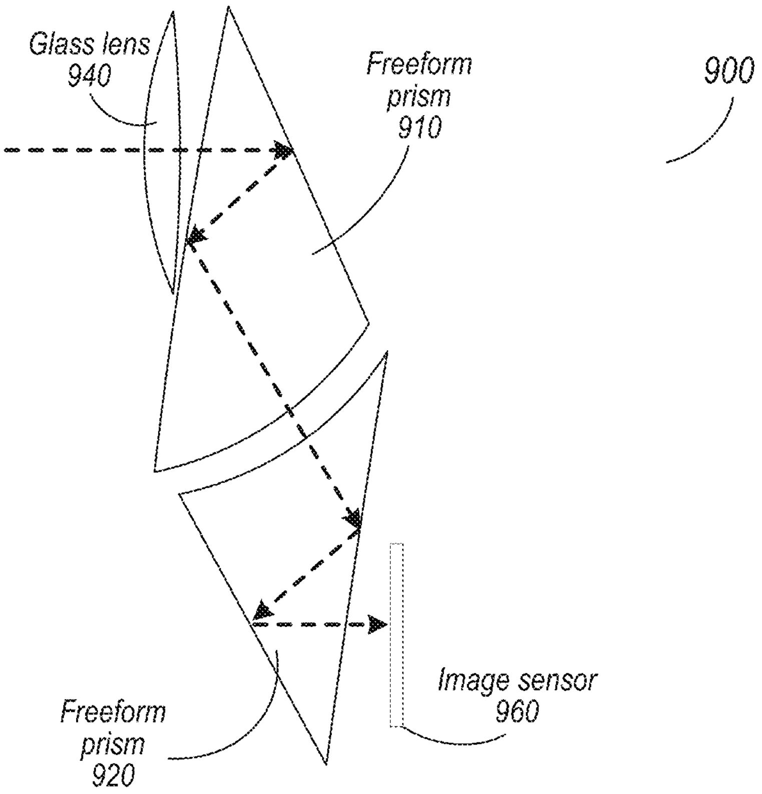
FIG. 9 illustrates a freeform folded optical system that includes an objective lens composed of a glass material, according to some embodiments.

FIG. 9 illustrates a freeform folded optical system that includes an objective lens composed of a glass material, according to some embodiments. A camera 900 may include a freeform folded optical system that includes, in order along an optical axis from an object side of the system to an image side of the system, an objective lens 940, a first freeform optical prism 910 that folds the optical axis twice, and a second freeform optical prism 920 that folds the optical axis twice. The camera 900 may also include an aperture stop, for example located on the object side of lens 940. The camera 900 may also include an image sensor 960 located on the image side of freeform optical prism 920. While not shown, the camera 900 may also include an IR filter, for example located between image sensor 960 and freeform optical prism 920.

The freeform folded optical system of FIG. 9 may correspond to or be similar to any of the example embodiments shown in FIGS. 2A through 8C. The first freeform prism 910 and the second freeform prism 920 are formed of optical plastic materials. However, instead of being formed of an optical plastic material as in the example embodiments shown in FIGS. 2A through 7C, lens 940 is a glass lens. In the example embodiment 800 shown in FIGS. 8A through 8C, lens 740 is a glass lens. Using optical glass instead of plastic for the objective lens 940 may, for example, aid in correcting aberrations. More precisely, using optical glass instead of plastic for the objective lens 940 may reduce the thermal shift of focus and axial color aberrations.

Figure 10:
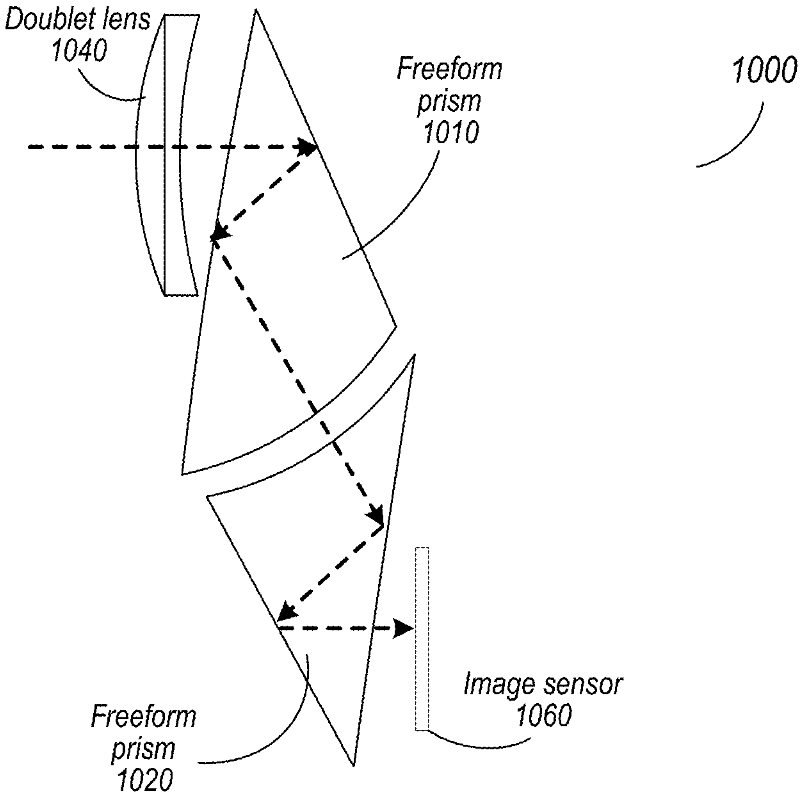
FIG. 10 illustrates a freeform folded optical system in which the objective lens is a doublet lens, according to some embodiments.

FIG. 10 illustrates a freeform folded optical system in which the objective lens is a doublet lens, according to some embodiments. A camera 1000 may include a freeform folded optical system that includes, in order along an optical axis from an object side of the system to an image side of the system, an objective lens 1040, a first freeform optical prism 1010 that folds the optical axis twice, and a second freeform optical prism 1020 that folds the optical axis twice. The camera 1000 may also include an aperture stop, for example located on the object side of lens 1040. The camera 1000 may also include an image sensor 1060 located on the image side of freeform optical prism 1020. While not shown, the camera 1000 may also include an IR filter, for example located between image sensor 1060 and freeform optical prism 1020.

The freeform folded optical system of FIG. 10 may correspond to or be similar to any of the example embodiments shown in FIGS. 2A through 8C. However, instead of being a singlet lens, lens 1040 is a doublet. Using a doublet lens for the objective lens 1040 may, for example, aid in correcting aberrations. In some embodiments, both of the lens elements in the doublet lens 1040 may be composed of optical plastic. Alternatively, one or both of the lens elements in the doublet lens may be composed of optical glass.

Figure 11:
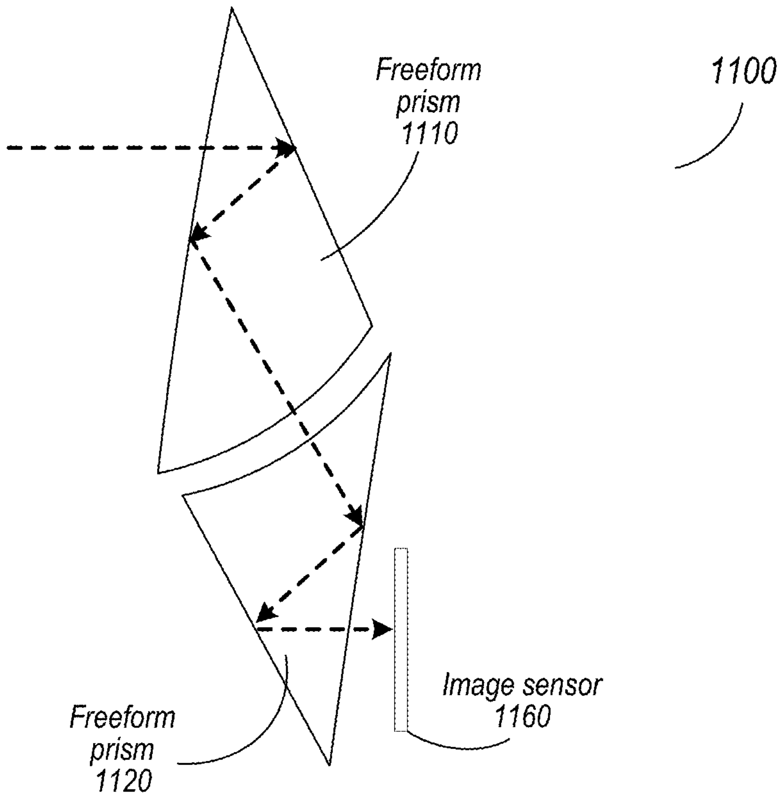
FIG. 11 illustrates a freeform folded optical system that does not include an objective lens, according to some embodiments.

FIG. 11 illustrates a freeform folded optical system that does not include an objective lens, according to some embodiments. A camera 1100 may include a freeform folded optical system that includes, in order along an optical axis from an object side of the system to an image side of the system, a first freeform optical prism 1110 that folds the optical axis twice, and a second freeform optical prism 1120 that folds the optical axis twice. The camera 1100 may also include an aperture stop, for example located on the object side of prism 1110. The camera 1100 may also include an image sensor 1160 located on the image side of freeform optical prism 1120. While not shown, the camera 1100 may also include an IR filter, for example located between image sensor 1160 and freeform optical prism 1120.

FIG. 12 illustrates a freeform folded optical system that folds the optical axis three times rather than four times, according to some embodiments. A camera 1200 may include a freeform folded optical system that includes, in order along an optical axis from an object side of the system to an image side of the system, a first freeform optical prism 1210 that folds the optical axis twice, and a second freeform optical prism 1220 that folds the optical axis once.

Referring to the first freeform prism 1210, a first surface 1211 is a transmitting and TIR surface that transmits light received from an object field and reflects light received from a second surface 1212 in the prism by TIR to a third surface 1213. The second surface 1212 is a reflecting surface coated with a mirror coating that reflects light received through the first surface 1211 back to the first surface 1211 in the prism 101. The third surface 1213 is a transmitting surface that transmits light received from the first surface 1211. At least one of the three surfaces 1211, 1212, and 1213 is a freeform surface.

Referring to the second freeform prism 1220, a first surface 1221 is a transmitting surface that transmits light received from the first prism 1210 to a second surface 1222 in the prism 1220. The second surface 1222 is a reflecting surface that reflects light received through the first surface 1221 to the third surface 1223 in the prism 1220. The second surface 1222 may be coated with a mirror coating, or alternatively may reflect light via total internal reflection. The third surface 1223 is a transmitting surface that transmits light received from the second surface 1222 to form an image at an image plane. At least one of the three surfaces 1221, 1222, and 1223 is a freeform surface.

The camera 1200 may also include an aperture stop, for example located on the object side of freeform optical prism 1210. The camera 1200 may also include an image sensor 1260 located on the image side of freeform optical prism 1220. While not shown, the camera 1200 may also include an IR filter, for example located between image sensor 1260 and freeform optical prism 1220. While not shown, the camera 1200 may also include an objective lens located on the object side of freeform optical prism 1210. The objective lens may be a singlet lens composed of optical plastic or glass, or a doublet lens that includes two optical plastic or glass lens elements.

Figure 13A:
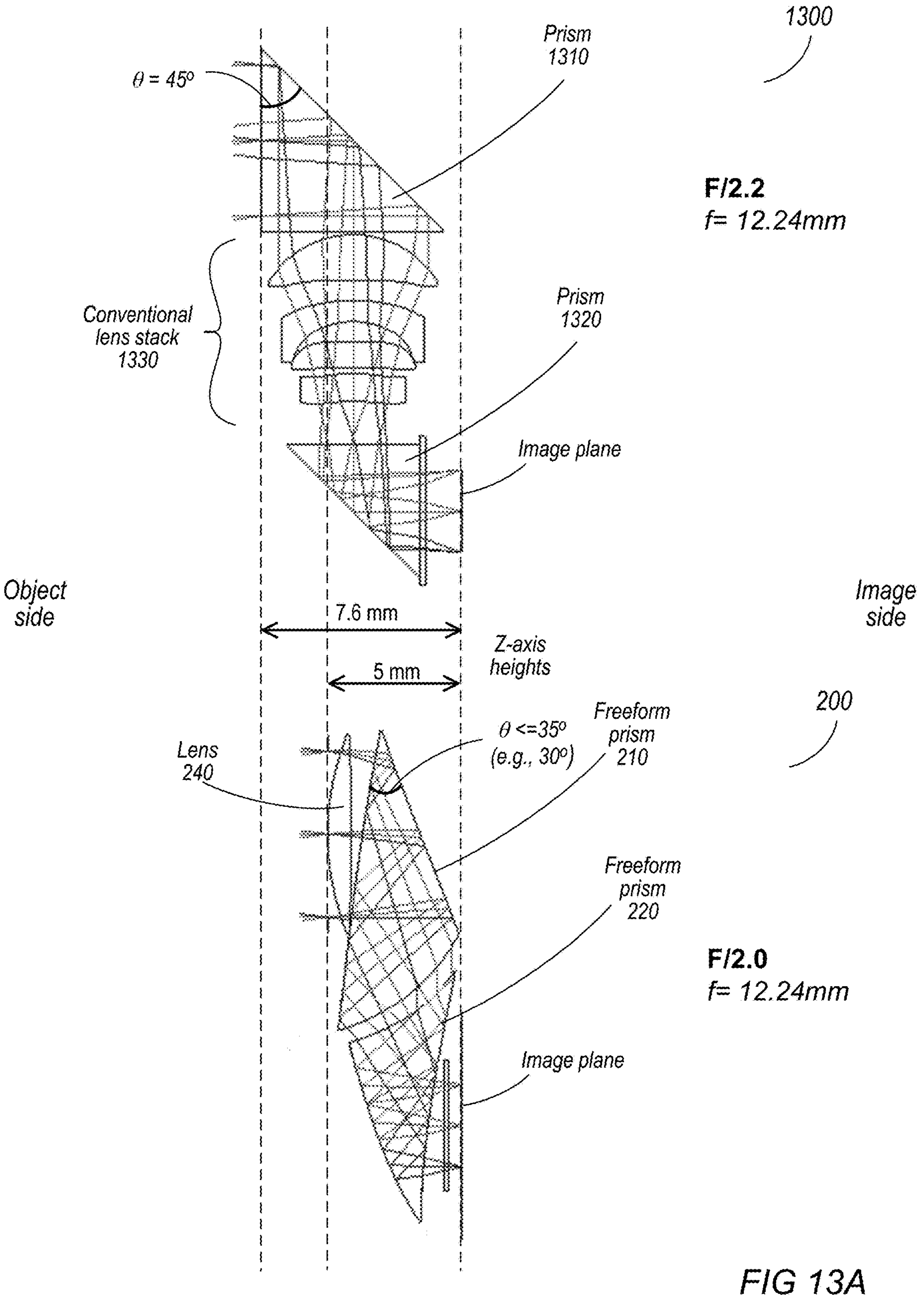
FIGS. 13A through 13C compare an embodiment of the freeform folded optical system to a conventional folded lens system.
Figure 13B:
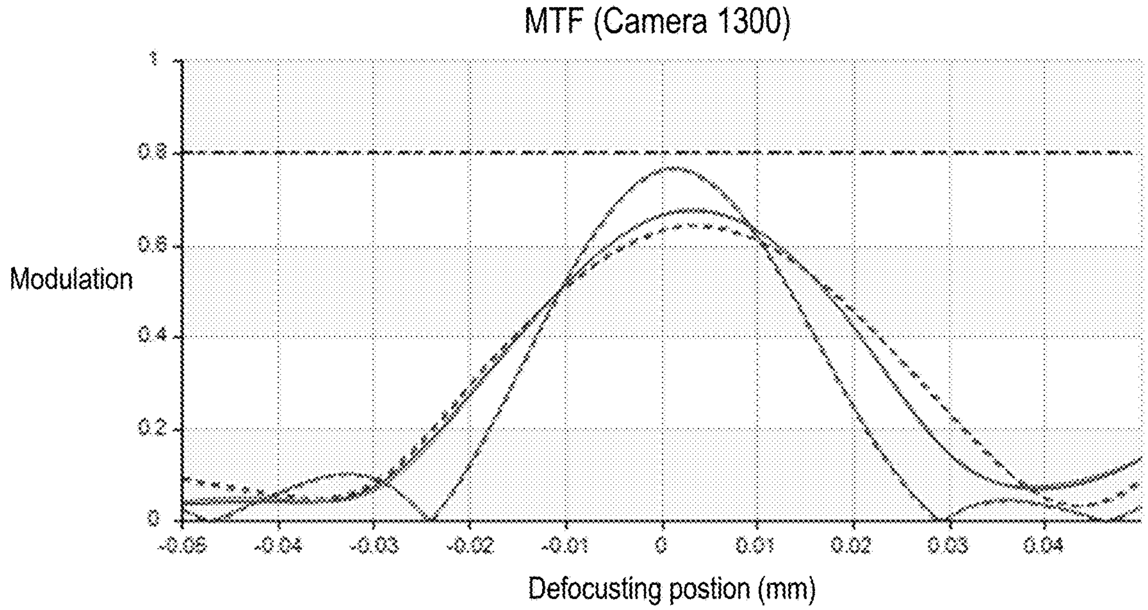
Figure 13B:
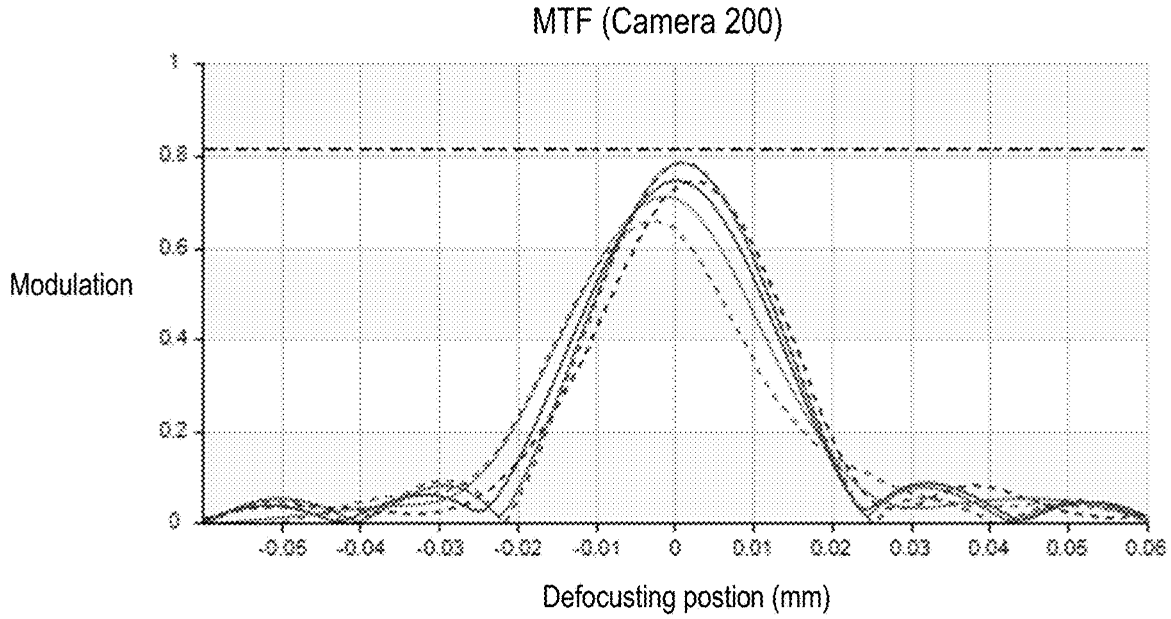
Figure 13C:
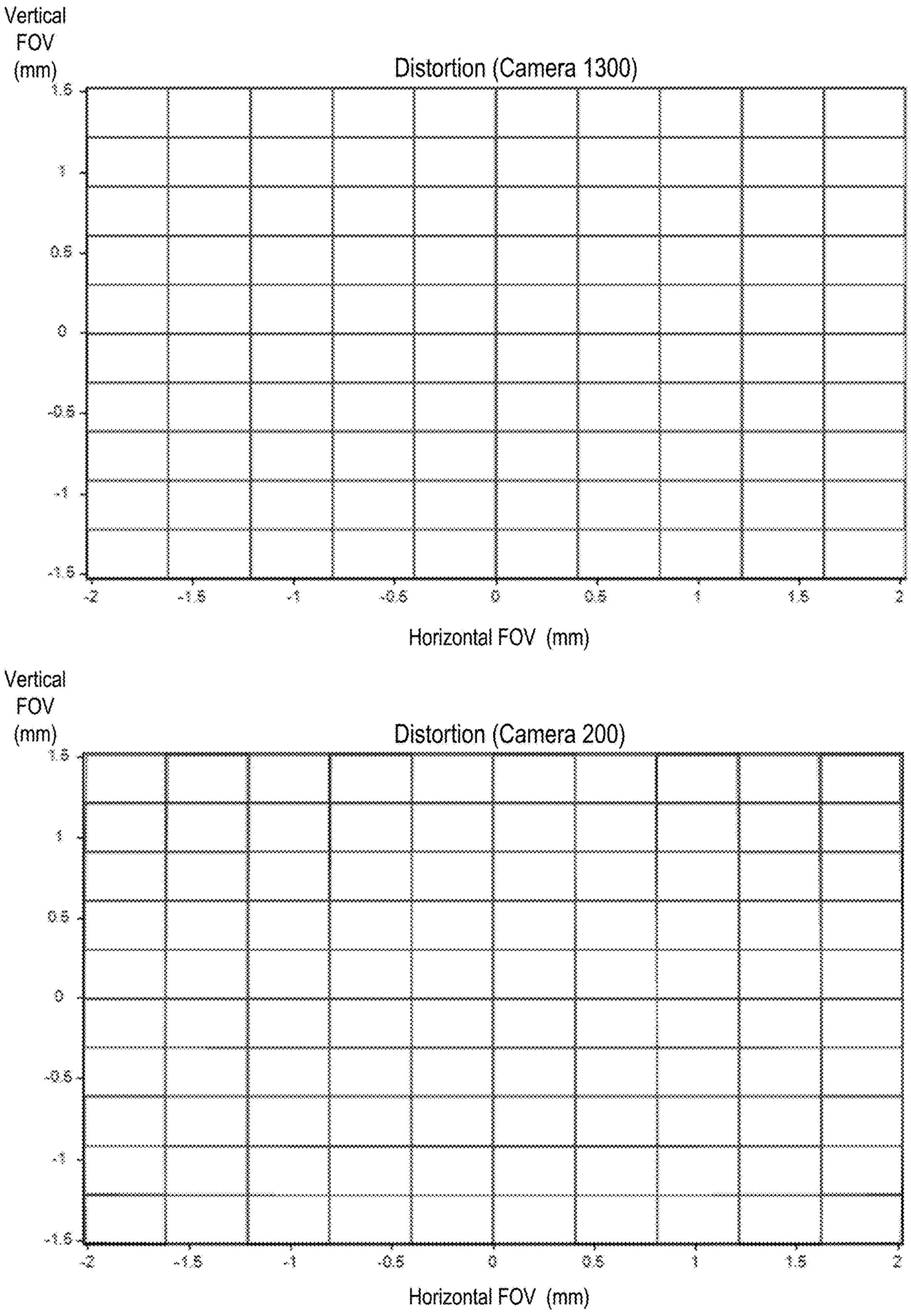

FIGS. 13A through 13C compare an embodiment of the freeform folded optical system to a conventional folded lens system. FIG. 13A is a side view that compares a camera 1300 with a conventional folded lens system (top) to a camera with a freeform folded optical system (bottom), for example a camera 200 as illustrated in FIG. 3A. Camera 1300 has a conventional folded lens system that includes, in order from an object side to an image side, a first prism 1310, a lens stack 1330, and a second prism 1320. The conventional folded lens system affects light received at an object side of the first prism 1310 to form an image at an image plane on the image side of the second prism 1320. Camera 200 has a freeform folded optical system that includes, in order from an object side to an image side, a lens 240, a first freeform prism 210, and a second freeform prism 220. The freeform folded optical system affects light received at an object side of lens 240 to form an image at an image plane on the image side of the second freeform prism 220.

In conventional folded lens systems as shown in camera 1300, the angle θ between a first surface of the first prism 1310 and a second (reflective) surface of the first prism 1310 is typically 45 degrees. Z-height of the example camera 1300 (measured from the object side surface of the first prism 1310 to the image plane) is 7.6 mm. In a freeform folded optical system as shown in camera 200, the angle θ between a first surface of the first prism 210 and the second surface of the first prism 210 is less than or equal to 35 degrees, for example within a range of 29 to 35 degrees. For example, in some embodiments, angle A may be 30 degrees. Z-height of the example camera 200 (measured from the apex of the object side surface of lens 240 to the image plane) is 5 mm. Reducing the angle between the first and second surfaces in the first freeform prism 210 (and similarly reducing the angle between the second and third surfaces in the second freeform prism 220) thus helps to reduce the Z-height of a camera 200 including a freeform folded optical system significantly when compared cameras 1300 including conventional folded lens systems.

Embodiments of the freeform folded optical system as described herein may provide lower F-numbers at similar effective focal lengths when compared to conventional folded lens systems. For example, the example conventional folded lens system in camera 1300 may have an effective focal length of ~12.24 mm, with an F-number of ~2.2. The freeform folded optical system in camera 200 may have an effective focal length of 12.24 mm, with an F-number of 2.0.

FIG. 13B compares the modulation transfer function (MTF) of the conventional folded optical system in camera 1300 shown in FIG. 13A to the MTF of the freeform folded optical system in camera 200 shown in FIG. 13A. FIG. 13C compares distortion of the conventional folded optical system in camera 1300 shown in FIG. 13A to distortion of the freeform folded optical system in camera 200 shown in FIG. 13A. As can be seen from FIGS. 13B and 13C, the freeform folded optical system performs well when compared to the conventional folded optical system.

NUMERICAL EXAMPLES AND TABLES

Table 1 provides values for various optical and physical parameters of the example freeform folded optical systems of cameras 100, 200, 300, 400, 500, 600, and 700 as described in FIGS. 2A through 8C, as well as ranges for some of the parameters. In Table 1, A is the optical power of the overall optical system, B is the optical power of the objective lens, and D is the semi-diagonal image height (SDIH). The optical elements (e.g., the objective lens, first prism, and second prism) are designated by d1, d2, and d3, respectively. N is the refractive index of a respective optical element (e.g., Nd1 is the refractive index of the objective lens), and V is the Abbe number of a respective optical element (e.g., Vd1 is the Abbe number of the objective lens). EFL is effective focal length of the system, and Fno is the F-number of the optical system. Angle θ is the angle between a first surface of the first prism and a second (reflective) surface of the first prism. Half FOV is half field of view, and 35 mm EFL is 35 mm equivalent focal length.

TABLE 1

| Parameter | Range | 100 | 200 | 300 | 400 | 500 | 600 | 700 |
|---|---|---|---|---|---|---|---|---|
| 1/A | — | 10 | 12.24 | 15.3 | 18.36 | 24.48 | 30.6 | 17 |
| 1/B | — | 14.071 | 18.68 | 23.06 | 18.42 | 26.0545 | 39.9823 | 17.885 |
| A | — | 0.100 | 0.082 | 0.065 | 0.054 | 0.041 | 0.033 | 0.059 |
| B | — | 0.071 | 0.054 | 0.043 | 0.054 | 0.038 | 0.025 | 0.056 |
| B/A | 0.5-1.0 | 0.71 | 0.66 | 0.66 | 0.997 | 0.94 | 0.77 | 0.95 |
| D | | 2.52 | 2.52 | 2.52 | 2.52 | 2.52 | 2.52 | 2.82 |
| AD | 0.05-0.3 | 0.252 | 0.206 | 0.165 | 0.137 | 0.103 | 0.082 | 0.166 |
| Nd1 | — | 1.544 | 1.544 | 1.545 | 1.544 | 1.544 | 1.544 | 1.589 |
| Nd2 | — | 1.544 | 1.544 | 1.545 | 1.544 | 1.544 | 1.544 | 1.544 |
| Nd3 | — | 1.671 | 1.671 | 1.640 | 1.671 | 1.671 | 1.671 | 1.640 |
| Vd1 | >50 | 55.97 | 55.97 | 55.96 | 55.97 | 55.97 | 55.97 | 61.14 |
| Vd2 | >50 | 55.97 | 55.97 | 55.96 | 55.97 | 55.97 | 55.97 | 55.96 |
| Vd3 | <25 | 19.23 | 19.23 | 23.52 | 19.23 | 19.23 | 19.23 | 23.52 |
| EFL | 9-31 | 10 | 12.24 | 15.3 | 18.36 | 24.48 | 30.6 | 17 |
| Fno | 2.0-4.0 | 2.0 | 2.0 | 2.2 | 2.3 | 3.2 | 4.0 | 2.8 |
| SDIH | 2.5-2.9 | 2.52 | 2.52 | 2.52 | 2.52 | 2.52 | 2.52 | 2.822 |
| Angle θ | 29°-35° | 29° | 30° | 30° | 30° | 30° | 31° | 30° |
| Half FOV | 4.5-16 | 14.1 | 11.6 | 9.4 | 7.8 | 5.9 | 4.7 | 9.4 |
| 35 mm EFL | 75-270 | 86 | 105 | 131 | 158 | 210 | 263 | 130 |

Figure 14:
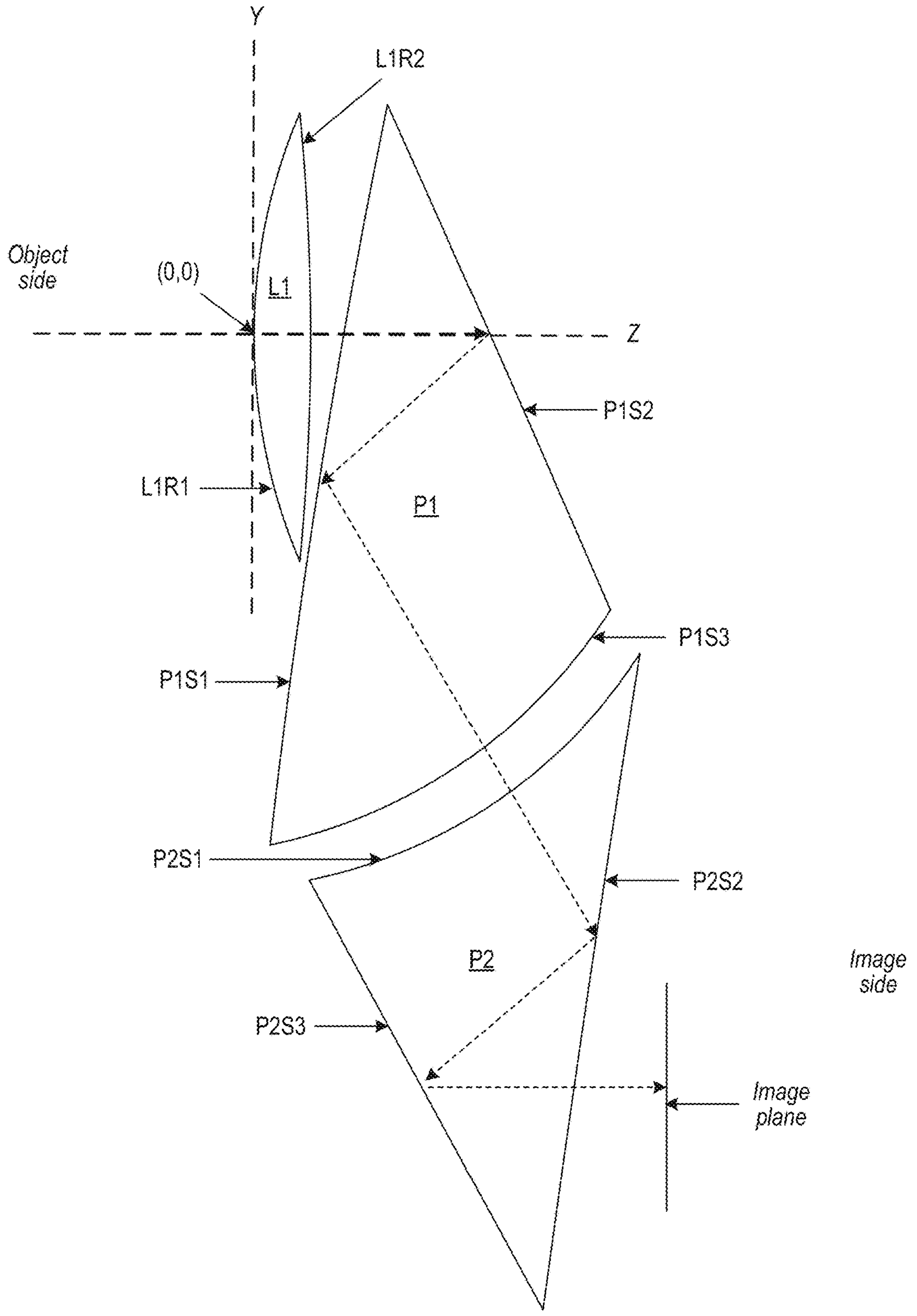
FIG. 14 provides labels for the optical elements and surfaces of the optical elements that are used in the Tables.

Tables 2A through 8K provide prescriptions for the optical elements of the example freeform folded optical systems of cameras 100, 200, 300, 400, 500, 600, and 700 as described in reference to FIGS. 2A through 8C. FIG. 14 shows labels designating the optical elements and surfaces of the optical elements that are used in Tables 2A through 8K. The objective lens is designated L1, the first prism is designated P1, and the second prism is designated P2. From the object side of the system along the optical axis, the surfaces are designated as L1R1, L1R2, P1S1, P1S2, P1S3, P2S1, P2S2, and P2S3. Surface locations are determined by global coordinates based on L1R1 (i.e., the apex of surface R1 is an origin (0,0), with the Y and Z axes shown). While not shown in FIG. 14, an aperture stop may be located on the object side of the objective lens (L1). The aperture stop and the image plane are also considered surfaces in the Tables.

Tables 2A through 2K provide prescriptions for the optical elements of the example freeform folded optical system of camera 100 as described in reference to FIGS. 2A through 2C. Tables 2A through 2D show the local coordinates and angles of all surfaces based on the R1 global coordinate for the freeform folded optical system of camera 100.

TABLE 2A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 6.8500E−01 |
| angle of each surface | 0.0000E+00 | 0.0000E+00 |

TABLE 2B

| | P1 | | |
|---|---|---|---|
| | S1 | S2 | S3 |
| X | 0.0000E+00 | 0.0000E+00 | 0.0000E+00 |
| Y | −1.8716E+00 | 2.2204E−16 | −5.6451E+00 |
| Z | 7.7306E−01 | 2.7689E+00 | 2.5755E+00 |
| angle of each surface | 7.4250E+00 | −2.1580E+01 | 5.7031E+01 |

TABLE 2C

| | P2 | | |
|---|---|---|---|
| | S1 | S2 | S3 |
| X | 0.0000E+00 | 0.0000E+00 | 0.0000E+00 |
| Y | −5.8661E+00 | −1.0392E+01 | −1.1653E+01 |
| Z | 1.6063E+00 | 3.7307E+00 | 2.7882E+00 |
| angle of each surface | 6.4858E+01 | 5.8192E+00 | −2.6610E+01 |

TABLE 2D

| | aperture | Image plane |
|---|---|---|
| X | 0.0000E+00 | 0.0000E+00 |
| Y | 0.0000E+00 | −1.0035E+01 |
| Z | −1.0000E−01 | 5.0000E+00 |
| angle of each surface | 0.0000E+00 | 0.0000E+00 |

Table 2E shows the aspherical coefficients of surfaces R1 and R2 of L1 for the freeform folded optical system of camera 100.

TABLE 2E

| | R1 | R2 |
|---|---|---|
| Radius of curvature | 9.6851E+00 | −3.5850E+01 |
| 4th order | −4.1081E−04 | −2.2926E−04 |
| 6th order | −3.4319E−07 | 1.3412E−05 |
| 8th order | −2.5887E−06 | −2.9379E−06 |
| 10th order | 1.4052E−07 | 1.8324E−07 |

Tables 2F through 2H show the aspherical coefficients of surfaces S1, S2, and S3, respectively, of P1 for the freeform folded optical system of camera 100. XY polynomial coefficients are shown for S1 and S2, and Standard Zernike coefficients are shown for S3.

TABLE 2F

| P1S1 | | | | | |
|---|---|---|---|---|---|
| X2: | 1.2328E−03 | Y2: | 4.3111E−03 | X2Y: | 3.6478E−04 |
| Y3: | 3.6150E−04 | X4: | 4.0324E−05 | X2Y2: | −1.9567E−05 |
| Y4: | −9.2506E−07 | X4Y: | −2.5607E−05 | X2Y3: | −7.2075E−06 |
| Y5: | 3.5850E−06 | X6: | 2.9916E−06 | X4Y2: | 6.1786E−07 |
| X2Y4: | −9.9562E−07 | Y6: | −1.1106E−07 | X6Y: | 2.6702E−07 |
| X4Y3: | 3.4933E−07 | X2Y5: | −3.2195E−08 | Y7: | 2.9442E−08 |
| X8: | −7.9587E−08 | X6Y2: | 6.5762E−08 | X4Y4: | −7.2555E−09 |
| X2Y6: | −6.3510E−08 | Y8: | −1.4553E−09 | | |

TABLE 2G

| P1S2 | | | | | |
|---|---|---|---|---|---|
| X2: | 5.1746E−04 | Y2: | 3.5742E−03 | X2Y: | 4.8065E−04 |
| Y3: | 9.8164E−04 | X4: | 5.5470E−05 | X2Y2: | 6.2326E−05 |
| Y4: | 1.0288E−04 | X4Y: | −1.4649E−05 | X2Y3: | −7.0812E−06 |
| Y5: | 1.3998E−05 | X6: | 9.0699E−07 | X4Y2: | −4.8501E−06 |
| X2Y4: | −6.8238E−06 | Y6: | 1.3164E−06 | X6Y: | 3.2005E−07 |
| X4Y3: | 5.9569E−07 | X2Y5: | −2.1128E−07 | Y7: | 4.7924E−07 |
| X8: | 1.1881E−08 | X6Y2: | 6.1828E−07 | X4Y4: | 9.2337E−07 |
| X2Y6: | 1.5008E−07 | Y8: | 6.4118E−08 | | |

TABLE 2H

| P1S3 | | | | | |
|---|---|---|---|---|---|
| Radius of curvature | −5.4296E+00 | | | | |
| ZP1: | 1.1270E−01 | ZP3: | 7.7990E−02 | ZP4: | −2.3789E−02 |
| ZP5: | −5.6901E−03 | ZP9: | 6.1637E−03 | ZP10: | 1.8562E−02 |
| ZP11: | 3.1953E−03 | ZP12: | 1.4158E−02 | ZP13: | 1.9125E−02 |
| ZP19: | 7.1611E−03 | ZP20: | −1.8737E−03 | ZP21: | 3.5065E−04 |
| ZP22: | 1.1161E−03 | ZP23: | 8.9128E−04 | ZP24: | −2.4812E−03 |
| ZP25: | −1.7085E−03 | ZP33: | −1.1747E−04 | ZP34: | −6.1182E−04 |
| ZP35: | 2.1134E−04 | ZP36: | −1.6513E−03 | ZP37: | −4.6628E−04 |
| ZP38: | 2.1694E−04 | ZP39: | −3.6364E−04 | ZP40: | 8.3883E−04 |
| ZP41: | 2.7900E−04 | ZP51: | 3.2965E−04 | ZP52: | −1.9495E−04 |
| ZP53: | 3.3374E−04 | ZP54: | −1.6678E−04 | ZP55: | 4.3056E−04 |
| ZP56: | 1.6211E−04 | ZP57: | −4.2780E−05 | ZP58: | 4.7369E−05 |
| ZP59: | −8.1842E−05 | ZP60: | −7.9380E−05 | ZP61: | −8.1680E−05 |
| NRADIUS: | 3.0498E+00 | | | | |

Tables 2I through 2K show the aspherical coefficients of surfaces S1, S2, and S3, respectively, of P2 for the freeform folded optical system of camera 100. Standard Zernike coefficients are shown for S1, and XY polynomial coefficients are shown for S2 and S3.

TABLE 2I

| P2S1 | | | | | |
|---|---|---|---|---|---|
| Radius of curvature | −5.6610E+00 | | | | |
| ZP1: | 1.0952E+00 | ZP3: | 9.8386E−02 | ZP4: | −2.7527E−02 |
| ZP5: | 3.0773E−02 | ZP9: | −1.8532E−02 | ZP10: | 6.8280E−02 |
| ZP11: | −1.0050E−02 | ZP12: | 5.0446E−04 | ZP13: | 1.3270E−02 |
| ZP19: | −5.7044E−03 | ZP20: | 3.1674E−03 | ZP21: | 4.4215E−02 |
| ZP22: | 3.3890E−02 | ZP23: | −9.7978E−03 | ZP24: | −7.5249E−03 |
| ZP25: | 4.7831E−03 | ZP33: | −4.6537E−03 | ZP34: | −2.4610E−03 |
| ZP35: | 7.2143E−03 | ZP36: | −1.7016E−02 | ZP37: | −6.4307E−03 |
| ZP38: | 2.4255E−03 | ZP39: | −2.5328E−04 | ZP40: | −1.8655E−03 |
| ZP41: | 1.5220E−03 | ZP51: | −1.1014E−03 | ZP52: | 1.2248E−03 |
| ZP53: | 2.9369E−04 | ZP54: | 1.5656E−04 | ZP55: | 2.6684E−03 |
| ZP56: | 5.3612E−04 | ZP57: | 1.1697E−04 | ZP58: | −1.1903E−04 |
| ZP59: | 6.5491E−05 | ZP60: | −4.2175E−04 | ZP61: | 6.8164E−05 |
| NRADIUS: | 3.0498E+00 | | | | |

TABLE 2J

| P2S2 | | | | | |
|---|---|---|---|---|---|
| X2: | 7.3128E−03 | Y2: | 1.3389E−02 | X2Y: | −8.6068E−04 |
| Y3: | −7.0201E−04 | X4: | 2.0413E−04 | X2Y2: | 4.4963E−05 |
| Y4: | −1.4962E−04 | X4Y: | −2.9382E−05 | X2Y3: | −2.3458E−05 |
| Y5: | 2.4463E−05 | X6: | 1.8794E−05 | X4Y2: | 5.9414E−06 |
| X2Y4: | 3.4009E−06 | Y6: | −8.9834E−07 | X6Y: | −9.1301E−06 |
| X4Y3: | −1.7092E−06 | X2Y5: | −2.8930E−07 | Y7: | −1.8104E−09 |
| X8: | 5.5755E−07 | X6Y2: | 3.6949E−07 | X4Y4: | 2.1167E−07 |
| X2Y6: | 1.7270E−08 | Y8: | 2.5066E−09 | | |

TABLE 2K

| P2S3 | | | | | |
|---|---|---|---|---|---|
| X2: | 2.0725E−02 | Y2: | 3.8371E−02 | X2Y: | −2.4160E−03 |
| Y3: | −2.6147E−03 | X4: | 2.3937E−04 | X2Y2: | 4.3054E−04 |
| Y4: | −3.5917E−04 | X4Y: | −1.9644E−04 | X2Y3: | −8.0213E−05 |
| Y5: | 1.3522E−04 | X6: | 1.5783E−05 | X4Y2: | 4.8256E−05 |
| X2Y4: | −5.6418E−06 | Y6: | −1.3096E−05 | X6Y: | −4.2369E−06 |
| X4Y3: | −8.9815E−06 | X2Y5: | 3.5679E−06 | Y7: | 5.1763E−08 |
| X8: | −1.7716E−07 | X6Y2: | 2.3145E−07 | X4Y4: | 8.3435E−07 |
| X2Y6: | −4.9429E−07 | Y8: | −1.1385E−08 | | |

Tables 3A through 3K provide prescriptions for the optical elements of the example freeform folded optical system of camera 200 as described in reference to FIGS. 3A through 3C. Tables 3A through 3D show the local coordinates and angles of all surfaces based on the R1 global coordinate for the freeform folded optical system of camera 200.

TABLE 3A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 7.7203E−01 |
| angle of each surface | 0.0000E+00 | 0.0000E+00 |

TABLE 3B

| | P1 | | |
|---|---|---|---|
| | S1 | S2 | S3 |
| X | 0.0000E+00 | 0.0000E+00 | 0.0000E+00 |
| Y | −2.3961E+00 | −4.4409E−16 | −6.5438E+00 |
| Z | 1.1043E+00 | 3.6551E+00 | 2.5980E+00 |
| angle of each surface | 8.2193E+00 | −2.1605E+01 | 5.7447E+01 |

TABLE 3C

| | P2 | | |
|---|---|---|---|
| | S1 | S2 | S3 |
| X | 0.0000E+00 | 0.0000E+00 | 0.0000E+00 |
| Y | −6.0633E+00 | −1.0247E+01 | −1.2020E+01 |
| Z | 2.0153E+00 | 3.9299E+00 | 2.5971E+00 |
| angle of each surface | 6.5410E+01 | 6.1751E+00 | −2.6530E+01 |

TABLE 3D

| | aperture | Image plane |
|---|---|---|
| X | 0.0000E+00 | 0.0000E+00 |
| Y | 0.0000E+00 | −1.1044E+01 |
| Z | 0.0000E+00 | 5.7500E+00 |
| angle of each surface | 0.0000E+00 | 0.0000E+00 |

Table 3E shows the aspherical coefficients of surfaces R1 and R2 of L1 for the freeform folded optical system of camera 200.

TABLE 3E

| | R1 | R2 |
|---|---|---|
| Radius of curvature | 1.2908E+01 | −4.7064E+01 |
| 4th order | −2.5061E−04 | −1.0392E−04 |
| 6th order | −1.8682E−06 | −9.1017E−07 |
| 8th order | −6.1682E−07 | −4.5580E−07 |

Tables 3F through 3H show the aspherical coefficients of surfaces S1, S2, and S3, respectively, of P1 for the example freeform folded optical system of camera 200. XY polynomial coefficients are shown for S1 and S2, and Standard Zernike coefficients are shown for S3.

TABLE 3F

| P1S1 | | | | | |
|---|---|---|---|---|---|
| X2: | −3.5095E−03 | Y2: | 2.9289E−03 | X2Y: | 5.5317E−04 |
| Y3: | 4.5481E−04 | X4: | 3.4693E−05 | X2Y2: | −7.2200E−05 |
| Y4: | −1.8307E−05 | X4Y: | −1.0340E−05 | X2Y3: | 4.0330E−06 |
| Y5: | 4.0167E−06 | X6: | 2.8135E−06 | X4Y2: | 2.5033E−06 |
| X2Y4: | −1.3309E−06 | Y6: | −8.1114E−08 | X6Y: | −2.9519E−07 |
| X4Y3: | 2.4244E−08 | X2Y5: | 1.3772E−07 | Y7: | 1.4765E−08 |
| X8: | −1.0841E−07 | X6Y2: | −1.6783E−07 | X4Y4: | −1.0881E−07 |
| X2Y6: | −5.1891E−08 | Y8: | −1.4786E−09 | | |

TABLE 3G

| P1S2 | | | | | |
|---|---|---|---|---|---|
| X2: | −3.7256E−03 | Y2: | −1.3926E−03 | X2Y: | 5.5215E−04 |
| Y3: | 9.3941E−04 | X4: | 2.2343E−05 | X2Y2: | −3.8240E−05 |
| Y4: | 5.5463E−05 | X4Y: | −1.3872E−06 | X2Y3: | 3.4788E−06 |
| Y5: | 1.2334E−05 | X6: | 1.4161E−06 | X4Y2: | 1.0258E−06 |

TABLE 3G-continued

| P1S2 | | | | | |
|---|---|---|---|---|---|
| X2Y4: | −4.8210E−07 | Y6: | 1.9497E−06 | X6Y: | −2.5124E−07 |
| X4Y3: | 2.1663E−07 | X2Y5: | −6.8913E−08 | Y7: | 4.3985E−07 |
| X8: | −5.9539E−08 | X6Y2: | −2.9123E−08 | X4Y4: | 4.1044E−08 |
| X2Y6: | −9.2035E−08 | Y8: | 2.6111E−08 | | |

TABLE 3H

| P1S3 | | | | | |
|---|---|---|---|---|---|
| Radius of curvature | −4.9093E+00 | | | | |
| ZP1: | 2.3020E−01 | ZP3: | 8.2483E−02 | ZP4: | −8.4278E−02 |
| ZP5: | 3.5161E−01 | ZP9: | 6.9965E−02 | ZP10: | 4.0886E−02 |
| ZP11: | 1.5798E−03 | ZP12: | 4.6503E−02 | ZP13: | 7.0710E−02 |
| ZP19: | 2.7145E−02 | ZP20: | −2.0862E−02 | ZP21: | 3.0212E−02 |
| ZP22: | 4.0310E−02 | ZP23: | −1.6333E−02 | ZP24: | 4.5817E−03 |
| ZP25: | 9.0657E−03 | ZP33: | −1.0761E−03 | ZP34: | −1.0716E−02 |
| ZP35: | 1.6367E−02 | ZP36: | −3.2069E−02 | ZP37: | −1.6126E−02 |
| ZP38: | 7.3529E−03 | ZP39: | −6.5426E−03 | ZP40: | 2.0706E−03 |
| ZP41: | 3.3486E−03 | ZP51: | 2.2953E−04 | ZP52: | −5.2360E−04 |
| ZP53: | 1.9069E−03 | ZP54: | −2.2496E−03 | ZP55: | 6.4244E−03 |
| ZP56: | 7.6338E−04 | ZP57: | −2.3103E−04 | ZP58: | −8.3918E−05 |
| ZP59: | −1.0706E−04 | ZP60: | −6.2087E−04 | ZP61: | 1.0956E−04 |
| NRADIUS: | 4.0000E+00 | | | | |

Tables 31 through 3K show the aspherical coefficients of surfaces S1. S2, and S3, respectively, of P2 for the freeform folded optical system of camera 200. Standard Zernike coefficients are shown for S1, and XY polynomial coefficients are shown for S2 and S3.

TABLE 3I

| P2S1 | | | | | |
|---|---|---|---|---|---|
| Radius of curvature | −5.9766E+00 | | | | |
| ZP5: | 4.0930E−01 | ZP9: | 7.1930E−01 | ZP10: | −9.8304E−01 |
| ZP11: | −5.2634E−01 | ZP12: | 2.7501E−01 | ZP13: | 1.5788E−01 |
| ZP19: | 2.9383E−01 | ZP20: | −5.7483E−01 | ZP21: | 7.5375E−01 |
| ZP22: | 2.2443E−01 | ZP23: | −2.5236E−01 | ZP24: | 9.5702E−02 |
| ZP25: | 6.9367E−02 | ZP33: | 2.0166E−02 | ZP34: | −1.2217E−01 |
| ZP35: | 1.2633E−01 | ZP36: | −1.5532E−01 | ZP37: | 2.8595E−02 |
| ZP38: | −3.5080E−02 | ZP39: | −5.5277E−02 | ZP40: | 2.4987E−02 |
| ZP41: | 1.2333E−02 | ZP51: | −1.4053E−04 | ZP52: | 2.2209E−03 |
| ZP53: | −1.6432E−03 | ZP54: | 1.5347E−02 | ZP55: | 2.1915E−02 |
| ZP56: | −2.7735E−02 | ZP57: | 1.9440E−02 | ZP58: | −1.2007E−02 |
| ZP59: | −3.9521E−03 | ZP60: | −8.2731E−04 | ZP61: | −2.2128E−04 |

TABLE 3I-continued

| P2S1 | |
|---|---|
| NRADIUS: | 5.0000E+00 |
| Radius of curvature | −5.9766E+00 |

TABLE 3J

| P2S2 | | | | | |
|---|---|---|---|---|---|
| X2: | −6.3897E−04 | Y2: | 1.7737E−02 | X2Y: | −8.2134E−04 |
| Y3: | −3.7734E−04 | X4: | 2.2350E−04 | X2Y2: | −9.9851E−05 |
| Y4: | −1.1818E−04 | X4Y: | −7.0096E−05 | X2Y3: | 2.1693E−06 |
| Y5: | 2.2662E−05 | X6: | 3.1002E−06 | X4Y2: | 1.1461E−05 |
| X2Y4: | 1.8293E−06 | Y6: | −1.4023E−06 | X6Y: | −1.1191E−06 |
| X4Y3: | −3.4267E−06 | X2Y5: | −6.2429E−07 | Y7: | −1.2591E−07 |
| X8: | 5.3797E−08 | X6Y2: | −1.1617E−07 | X4Y4: | 4.6304E−07 |
| X2Y6: | 6.3632E−08 | Y8: | 6.8996E−08 | | |

TABLE 3K

| P2S3 | | | | | |
|---|---|---|---|---|---|
| X2: | 3.2160E−03 | Y2: | 3.9372E−02 | X2Y: | −1.1659E−03 |
| Y3: | −2.0014E−03 | X4: | 2.7091E−04 | X2Y2: | 1.4532E−04 |
| Y4: | −4.0006E−05 | X4Y: | −1.8054E−04 | X2Y3: | −6.9765E−05 |
| Y5: | 6.3982E−05 | X6: | 2.6133E−07 | X4Y2: | 3.2422E−05 |
| X2Y4: | 8.5557E−06 | Y6: | −1.2349E−05 | X6Y: | 2.6745E−06 |
| X4Y3: | −8.3419E−06 | X2Y5: | −2.5074E−06 | Y7: | 7.7794E−07 |
| X8: | −2.0461E−07 | X6Y2: | −6.4072E−07 | X4Y4: | 1.4627E−06 |
| X2Y6: | 1.8704E−07 | Y8: | −1.8362E−08 | | |

Tables 4A through 4K provide prescriptions for the optical elements of the example freeform folded optical system of camera 300 as described in reference to FIGS. 4A through 4C. Tables 4A through 4D show the local coordinates and angles of all surfaces based on the R1 global coordinate for the freeform folded optical system of camera 300.

TABLE 4A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 1.0740E+00 |
| angle of each surface | 0.0000E+00 | 0.0000E+00 |

TABLE 4B

| | P1 | | |
|---|---|---|---|
| | S1 | S2 | S3 |
| X | 0.0000E+00 | 0.0000E+00 | 0.0000E+00 |
| Y | −2.8639E+00 | 8.8818E−16 | −7.5501E+00 |
| Z | 1.2177E+00 | 4.2679E+00 | 2.8594E+00 |
| angle of each surface | 8.2147E+00 | −2.1598E+01 | 5.7781E+01 |

TABLE 4C

| | P2 | | |
|---|---|---|---|
| | S1 | S2 | S3 |
| X | 0.0000E+00 | 0.0000E+00 | 0.0000E+00 |
| Y | −6.8198E+00 | −1.2013E+01 | −1.4077E+01 |
| Z | 2.0627E+00 | 4.4442E+00 | 2.8914E+00 |
| angle of each surface | 6.5363E+01 | 6.1548E+00 | −2.6527E+01 |

TABLE 4D

| | aperture | Image plane |
|---|---|---|
| X | 0.0000E+00 | 0.0000E+00 |
| Y | 0.0000E+00 | −1.2623E+01 |
| Z | 4.5000E−01 | 7.1001E+00 |
| angle of each surface | 0.0000E+00 | 0.0000E+00 |

Table 4E shows the aspherical coefficients of surfaces R1 and R2 of L1 for the freeform folded optical system of camera 300.

TABLE 4E

| | R1 | R2 |
|---|---|---|
| Radius of curvature | 1.3779E+01 | −1.4250E+02 |
| 4th order | −6.9632E−05 | 8.3882E−07 |
| 6th order | 3.4866E−06 | 8.5677E−06 |
| 8th order | 3.7304E−07 | 2.4073E−07 |

Tables 4F through 4H show the aspherical coefficients of surfaces S1, S2, and S3, respectively, of P1 for the freeform folded optical system of camera 300. XY polynomial coefficients are shown for S1 and S2, and Standard Zernike coefficients are shown for S3.

TABLE 4F

| P1S1 | | | | | |
|---|---|---|---|---|---|
| X2: | −4.1030E−03 | Y2: | −2.0438E−03 | X2Y: | 3.0841E−04 |
| Y3: | 2.1374E−04 | X4: | 7.4688E−05 | X2Y2: | −5.8378E−05 |
| Y4: | −2.7081E−05 | X4Y: | −8.1083E−06 | X2Y3: | 2.7833E−06 |
| Y5: | 1.3664E−06 | X6: | 1.0048E−06 | X4Y2: | 8.0682E−07 |
| X2Y4: | −1.5666E−06 | Y6: | −2.3636E−07 | X6Y: | −3.7678E−07 |
| X4Y3: | −7.0892E−08 | X2Y5: | 2.0387E−07 | Y7: | 5.3612E−09 |
| X8: | 1.7177E−08 | X6Y2: | 9.2501E−09 | X4Y4: | 1.1531E−08 |
| X2Y6: | −1.0276E−08 | Y8: | −1.0023E−10 | | |

TABLE 4G

| P1S2 | | | | | |
|---|---|---|---|---|---|
| X2: | −4.0517E−03 | Y2: | −6.4299E−03 | X2Y: | 1.9527E−04 |
| Y3: | 1.9196E−04 | X4: | 4.2377E−05 | X2Y2: | −3.5460E−05 |
| Y4: | −1.9359E−05 | X4Y: | −3.1760E−06 | X2Y3: | −1.1339E−06 |
| Y5: | −6.9096E−07 | X6: | −7.4827E−07 | X4Y2: | −2.1279E−06 |
| X2Y4: | −2.8271E−06 | Y6: | −7.7148E−07 | X6Y: | −2.1208E−07 |
| X4Y3: | −4.6639E−08 | X2Y5: | −7.0024E−08 | Y7: | −6.0365E−08 |
| X8: | 7.7508E−08 | X6Y2: | 2.2880E−07 | X4Y4: | 2.7047E−07 |
| X2Y6: | 1.3074E−07 | Y8: | 1.2554E−08 | | |

TABLE 4H

| P1S3 | | | | | |
|---|---|---|---|---|---|
| Radius of curvature | −5.2022E+00 | | | | |
| ZP1: | 4.3990E−01 | ZP3: | 8.0953E−01 | ZP4: | 6.3020E−02 |
| ZP5: | 6.2129E−01 | ZP9: | 2.2885E−01 | ZP10: | 3.3807E−02 |
| ZP11: | 1.1773E−01 | ZP12: | 5.9172E−02 | ZP13: | 2.3739E−01 |
| ZP19: | 4.9033E−02 | ZP20: | −2.7243E−02 | ZP21: | −6.0975E−02 |
| ZP22: | −3.4146E−02 | ZP23: | 2.2046E−02 | ZP24: | −7.1215E−05 |
| ZP25: | 4.8177E−02 | ZP33: | 1.5254E−02 | ZP34: | −2.2465E−02 |
| ZP35: | 3.4118E−03 | ZP36: | 2.9765E−03 | ZP37: | 4.3637E−04 |
| ZP38: | −4.5495E−03 | ZP39: | −5.7368E−03 | ZP40: | 8.2263E−03 |
| ZP41: | 1.1196E−02 | NRADIUS: | 5.0000E+00 | | |

Tables 41 through 4K show the aspherical coefficients of surfaces S1, S2, and S3, respectively, of P2 for the freeform folded optical system of camera 300. Standard Zernike coefficients are shown for S1, and XY polynomial coefficients are shown for S2 and S3.

TABLE 4I

| P2S1 | | | | | |
|---|---|---|---|---|---|
| Radius of curvature | −7.1912E+00 | | | | |
| ZP1: | 1.8375E+00 | ZP3: | 8.5303E−01 | ZP4: | 1.0826E+00 |
| ZP5: | 4.9466E−01 | ZP9: | 7.5084E−01 | ZP10: | −1.8544E+00 |
| ZP11: | −9.6105E−01 | ZP12: | 5.7025E−01 | ZP13: | 4.4681E−01 |
| ZP19: | 3.9429E−01 | ZP20: | −1.1961E+00 | ZP21: | 9.9587E−01 |
| ZP22: | 3.1859E−01 | ZP23: | −4.7837E−01 | ZP24: | 2.9845E−01 |
| ZP25: | 1.5519E−01 | ZP33: | 9.9804E−02 | ZP34: | −3.2426E−01 |
| ZP35: | 2.0437E−01 | ZP36: | −7.8131E−02 | ZP37: | 4.5649E−02 |
| ZP38: | 4.3533E−03 | ZP39: | −8.8371E−02 | ZP40: | 6.1961E−02 |
| ZP41: | 4.4628E−02 | NRADIUS: | 6.2500E+00 | | |

TABLE 4J

| P2S2 | | | | | |
|---|---|---|---|---|---|
| X2: | −3.3900E−03 | Y2: | 1.2000E−02 | X2Y: | −2.6583E−04 |
| Y3: | −8.9382E−05 | X4: | 2.3106E−04 | X2Y2: | −1.7748E−04 |
| Y4: | −5.6288E−05 | X4Y: | −7.6938E−05 | X2Y3: | 8.5945E−06 |
| Y5: | −8.7135E−07 | X6: | 8.5941E−06 | X4Y2: | 1.8457E−05 |
| X2Y4: | 7.7362E−07 | Y6: | −5.2980E−07 | X6Y: | −6.2832E−07 |
| X4Y3: | −3.3326E−06 | X2Y5: | 5.8876E−07 | Y7: | 4.1715E−07 |
| X8: | −1.5106E−07 | X6Y2: | −2.2790E−07 | X4Y4: | 2.5596E−07 |
| X2Y6: | −1.0205E−07 | Y8: | −3.7415E−08 | | |

TABLE 4K

| P2S3 | | | | | |
|---|---|---|---|---|---|
| X2: | −6.2694E−04 | Y2: | 3.1710E−02 | X2Y: | −5.6440E−04 |
| Y3: | −1.1796E−03 | X4: | 2.9229E−04 | X2Y2: | −2.3184E−04 |
| Y4: | −9.9880E−05 | X4Y: | −1.3183E−04 | X2Y3: | 1.9399E−05 |
| Y5: | 2.9709E−05 | X6: | 2.2939E−06 | X4Y2: | 3.5026E−05 |
| X2Y4: | −6.4207E−07 | Y6: | −8.7850E−06 | X6Y: | 9.4914E−07 |
| X4Y3: | −6.9571E−06 | X2Y5: | 4.6764E−07 | Y7: | 2.1291E−06 |
| X8: | −5.1533E−08 | X6Y2: | −4.2400E−07 | X4Y4: | 7.6908E−07 |
| X2Y6: | −1.0919E−07 | Y8: | −2.0390E−07 | | |

Tables 5A through 5K provide prescriptions for the optical elements of the example freeform folded optical system of camera 400 as described in reference to FIGS. 5A through 5C. Tables 5A through 5D show the local coordinates and angles of all surfaces based on the R1 global coordinate for the freeform folded optical system of camera 400.

TABLE 5A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 1.2612E+00 |
| angle of each surface | 0.0000E+00 | 0.0000E+00 |

TABLE 5B

| | P1 | | |
|---|---|---|---|
| | S1 | S2 | S3 |
| X | 0.0000E+00 | 0.0000E+00 | 0.0000E+00 |
| Y | −2.8396E+00 | 0.0000E+00 | −7.4975E+00 |
| Z | 1.4331E+00 | 4.4448E+00 | 3.0119E+00 |
| angle of each surface | 8.2004E+00 | −2.1657E−01 | 5.7494E−01 |

TABLE 5C

| | P2 | | |
|---|---|---|---|
| | S1 | S2 | S3 |
| X | 0.0000E+00 | 0.0000E+00 | 0.0000E+00 |
| Y | −6.2664E+00 | −1.1940E+01 | −1.4589E+01 |
| Z | 1.6720E+00 | 4.2998E+00 | 2.3059E+00 |
| angle of each surface | 6.5148E−01 | 6.0616E+00 | −2.6513E−01 |

TABLE 5D

| | aperture | Image plane |
|---|---|---|
| X | 0.0000E+00 | 0.0000E+00 |
| Y | 0.0000E+00 | −1.2624E+01 |
| Z | 0.0000E+00 | 7.0000E+00 |
| angle of each surface | 0.0000E+00 | 0.0000E+00 |

Table 5E shows the aspherical coefficients of surfaces R1 and R2 of L1 for the freeform folded optical system of camera 400.

TABLE 5E

| | R1 | R2 |
|---|---|---|
| Radius of curvature | 1.0031E+01 | 2.2229E+04 |
| 4th order | −2.2896E−05 | 3.5394E−05 |
| 6th order | −1.6868E−06 | −2.1342E−06 |
| 8th order | 5.3139E−08 | 7.8283E−08 |
| 10th order | −4.0851E−09 | −3.6425E−09 |

Tables 5F through 5H show the aspherical coefficients of surfaces S1, S2, and S3, respectively, of P1 for the freeform folded optical system of camera 400. XY polynomial coefficients are shown for S1 and S2, and Standard Zernike coefficients are shown for S3.

TABLE 5F

| P1S1 | | | | | |
|---|---|---|---|---|---|
| X2: | −4.5543E−04 | Y2: | 6.4053E−04 | X2Y: | −2.3979E−04 |
| Y3: | 1.9895E−04 | X4: | −3.9579E−06 | X2Y2: | 3.0698E−08 |
| Y4: | −2.2450E−05 | X4Y: | 2.8192E−06 | X2Y3: | −2.7515E−06 |
| Y5: | 2.0284E−06 | X6: | 4.4608E−07 | X4Y2: | −8.2259E−07 |
| X2Y4: | 2.4269E−08 | Y6: | −2.0299E−07 | X6Y: | −1.5154E−07 |
| X4Y3: | 9.0080E−08 | X2Y5: | −2.2847E−08 | Y7: | 1.7511E−08 |
| X8: | −4.9405E−09 | X6Y2: | 2.3692E−08 | X4Y4: | −1.6216E−08 |
| X2Y6: | −5.1094E−09 | Y8: | −2.0773E−09 | | |

TABLE 5G

| P1S2 | | | | | |
|---|---|---|---|---|---|
| X2: | −1.6273E−03 | Y2: | −2.4812E−03 | X2Y: | 2.2888E−05 |
| Y3: | 3.2143E−04 | X4: | −5.7852E−06 | X2Y2: | −2.6798E−05 |
| Y4: | −3.9699E−06 | X4Y: | −1.3602E−07 | X2Y3: | −2.4113E−06 |

TABLE 5G-continued

| P1S2 | | | | | |
|---|---|---|---|---|---|
| Y5: | 9.6929E−07 | X6: | 3.1876E−07 | X4Y2: | 8.8558E−08 |
| X2Y4: | −5.4202E−08 | Y6: | 1.4351E−07 | X6Y: | −2.0160E−08 |
| X4Y3: | −3.0249E−08 | X2Y5: | −9.1154E−08 | Y7: | −3.5094E−08 |
| X8: | −1.3766E−08 | X6Y2: | −2.4974E−08 | X4Y4: | −4.1940E−08 |
| X2Y6: | −3.7645E−08 | Y8: | −1.2102E−08 | | |

TABLE 5H

| P1S3 | | | | | |
|---|---|---|---|---|---|
| Radius of curvature | −6.3097E+00 | | | | |
| ZP1: | 4.8394E−01 | ZP3: | 4.8168E−01 | ZP4: | 2.1211E−01 |
| ZP5: | 8.1466E−01 | ZP9: | −4.5111E−02 | ZP10: | 3.8402E−01 |
| ZP11: | 4.6161E−02 | ZP12: | −2.2978E−02 | ZP13: | 1.4383E−01 |
| ZP19: | −1.8961E−02 | ZP20: | 1.0007E−01 | ZP21: | 1.3601E−01 |
| ZP22: | 6.2411E−01 | ZP23: | −7.9147E−02 | ZP24: | 6.4665E−02 |
| ZP25: | 1.2522E−02 | ZP33: | 1.4510E−02 | ZP34: | −2.1825E−02 |
| ZP35: | 7.9700E−02 | ZP36: | −4.9564E−01 | ZP37: | −4.3220E−01 |
| ZP38: | 1.6732E−01 | ZP39: | −7.9496E−02 | ZP40: | 5.2080E−02 |
| ZP41: | −2.1835E−02 | ZP51: | 2.4908E−03 | ZP52: | 1.1218E−02 |
| ZP53: | 2.8213E−03 | ZP54: | −6.5446E−02 | ZP55: | 1.6333E−01 |
| ZP56: | 1.4409E−01 | ZP57: | −6.2183E−02 | ZP58: | 1.7172E−02 |
| ZP59: | −1.2107E−02 | ZP60: | 8.6648E−03 | ZP61: | −5.0489E−03 |
| NRADIUS: | 6.0000E+00 | | | | |

Tables 51 through 5K show the aspherical coefficients of surfaces S1, S2, and S3, respectively, of P2 for the freeform folded optical system of camera 400. Standard Zernike coefficients are shown for S1, and XY polynomial coefficients are shown for S2 and S3.

TABLE 5I

| P2S1 | | | | | |
|---|---|---|---|---|---|
| Radius of curvature | −6.7292E+00 | | | | |
| ZP1: | 2.3755E+00 | ZP3: | 1.1681E+00 | ZP4: | 9.5930E−01 |
| ZP5: | 4.1826E−01 | ZP9: | 8.8117E−01 | ZP10: | −6.0724E−01 |
| ZP11: | −5.4366E−01 | ZP12: | 4.5785E−01 | ZP13: | 2.3040E−01 |
| ZP19: | 4.7024E−01 | ZP20: | −1.1643E+00 | ZP21: | 4.0108E+00 |
| ZP22: | 6.6523E+00 | ZP23: | −4.6990E−01 | ZP24: | 1.6282E−01 |
| ZP25: | 1.6400E−01 | ZP33: | 1.5319E−01 | ZP34: | −3.4682E−01 |
| ZP35: | 9.0065E−01 | ZP36: | −7.9447E+00 | ZP37: | −6.4993E+00 |
| ZP38: | 7.7843E−01 | ZP39: | −1.1310E−01 | ZP40: | −3.4355E−02 |
| ZP41: | 2.9440E−02 | ZP51: | −4.7922E−03 | ZP52: | 4.5851E−02 |
| ZP53: | −6.5913E−03 | ZP54: | −8.6574E−01 | ZP55: | 3.9292E+00 |
| ZP56: | 1.8646E+00 | ZP57: | −4.6809E−01 | ZP58: | −3.2108E−02 |
| ZP59: | −3.2491E−02 | ZP60: | 8.6424E−04 | ZP61: | 3.4461E−04 |
| NRADIUS: | 7.5000E+00 | | | | |

TABLE 5J

| P2S2 | | | | | |
|---|---|---|---|---|---|
| X2: | 6.9182E−03 | Y2: | 1.6072E−02 | X2Y: | −2.0157E−03 |
| Y3: | 2.7670E−04 | X4: | 5.0748E−05 | X2Y2: | 1.9051E−04 |
| Y4: | −8.6587E−05 | X4Y: | 3.0146E−06 | X2Y3: | −3.5129E−05 |
| Y5: | −5.6475E−06 | X6: | 9.4523E−07 | X4Y2: | −6.7788E−06 |
| X2Y4: | 2.4293E−06 | Y6: | 1.2289E−07 | X6Y: | 2.4807E−07 |
| X4Y3: | 2.7042E−06 | X2Y5: | 4.1284E−07 | Y7: | 2.6102E−07 |
| X8: | 2.0806E−07 | X6Y2: | −4.1283E−07 | X4Y4: | −2.8925E−07 |
| X2Y6: | −3.4697E−08 | Y8: | −2.8260E−08 | | |

TABLE 5K

| P2S3 | | | | | |
|---|---|---|---|---|---|
| X2: | 8.1546E−03 | Y2: | 2.9680E−02 | X2Y: | −2.5720E−03 |
| Y3: | −7.8572E−04 | X4: | −7.0060E−07 | X2Y2: | 4.3181E−04 |
| Y4: | −3.9084E−05 | X4Y: | 2.3016E−05 | X2Y3: | −8.0333E−05 |
| Y5: | −9.3595E−06 | X6: | −1.1998E−06 | X4Y2: | −1.7497E−05 |
| X2Y4: | 6.4297E−06 | Y6: | 1.4123E−06 | X6Y: | 4.3808E−07 |
| X4Y3: | 3.5705E−06 | X2Y5: | 2.3803E−07 | Y7: | 2.4785E−07 |
| X8: | 9.5021E−08 | X6Y2: | −6.6709E−08 | X4Y4: | −2.4073E−07 |
| X2Y6: | −6.7071E−08 | Y8: | −3.8233E−08 | | |

Tables 6A through 6K provide prescriptions for the optical elements of the example freeform folded optical system of camera 500 as described in reference to FIGS. 6A through 6C. Tables 6A through 6D show the local coordinates and angles of all surfaces based on the R1 global coordinate for the freeform folded optical system of camera 500.

TABLE 6A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 9.1331E−01 |
| angle of each surface | 0.0000E+00 | 0.0000E+00 |

TABLE 6B

| | P1 | | |
|---|---|---|---|
| | S1 | S2 | S3 |
| X | 0.0000E+00 | 0.0000E+00 | 0.0000E+00 |
| Y | −2.7510E+00 | 0.0000E+00 | −7.2396E+00 |
| Z | 1.6615E+00 | 4.5652E+00 | 3.3919E+00 |
| angle of each surface | 8.3182E+00 | −2.1726E−01 | 5.7051E−01 |

TABLE 6C

| | P2 | | |
|---|---|---|---|
| | S1 | S2 | S3 |
| X | 0.0000E+00 | 0.0000E+00 | 0.0000E+00 |
| Y | −6.2521E+00 | −1.2392E+01 | −1.5580E+01 |
| Z | 1.8189E+00 | 4.7268E+00 | 2.3114E+00 |
| angle of each surface | 6.4657E−01 | 5.9020E+00 | −2.6427E−01 |

TABLE 6D

| | aperture | Image plane |
|---|---|---|
| X | 0.0000E+00 | 0.0000E+00 |
| Y | 0.0000E+00 | −1.3011E+01 |
| Z | 0.0000E+00 | 7.0000E+00 |
| angle of each surface | 0.0000E+00 | 0.0000E+00 |

Table 6E shows the aspherical coefficients of surfaces R1 and R2 of L1 for the freeform folded optical system of camera 500.

TABLE 6E

| | R1 | R2 |
|---|---|---|
| Radius of curvature | 1.1108E+01 | 4.9615E+01 |
| 4th order | −7.8523E−05 | −2.3386E−05 |
| 6th order | −3.1053E−07 | 1.5326E−06 |
| 8th order | 3.6348E−08 | 4.0305E−08 |

Tables 6F through 6H show the aspherical coefficients of surfaces S1, S2, and S3, respectively, of P1 for the freeform folded optical system of camera 500. XY polynomial coefficients are shown for S1 and S2, and Standard Zernike coefficients are shown for S3.

TABLE 6F

| P1S1 | |
|---|---|
| X2: | −1.2574E−03 |
| Y2: | −3.4899E−03 |
| X2Y: | −9.3471E−05 |
| Y3: | 3.0175E−04 |
| X4: | 1.0196E−05 |
| X2Y2: | −8.4511E−06 |
| Y4: | −3.1020E−05 |
| X4Y: | 4.5054E−06 |
| X2Y3: | 2.4496E−06 |
| Y5: | 2.1977E−06 |
| X6: | −3.1450E−07 |
| X4Y2: | −7.6725E−07 |
| X2Y4: | −2.7463E−07 |
| Y6: | −9.2808E−08 |

TABLE 6G

| P1S2 | |
|---|---|
| X2: | −5.3713E−03 |
| Y2: | −9.7583E−03 |
| X2Y: | 6.8529E−05 |
| Y3: | 2.0767E−04 |
| X4: | 1.8023E−06 |
| X2Y2: | −2.5461E−05 |
| Y4: | −1.2655E−05 |
| X4Y: | 3.3642E−07 |
| X2Y3: | −5.2884E−07 |
| Y5: | −9.4009E−07 |
| X6: | −4.9775E−07 |
| X4Y2: | −1.0824E−06 |
| X2Y4: | −7.5822E−07 |
| Y6: | −2.2155E−07 |

TABLE 6H

| P1S3 | |
|---|---|
| Radius of curvature | −7.0171E+00 |
| ZP1: | 6.2089E−01 |
| ZP3: | 1.2815E+00 |
| ZP4: | 2.3659E+00 |
| ZP5: | 1.0846E+00 |
| ZP9: | −3.0334E−01 |
| ZP10: | −7.3919E−01 |
| ZP11: | −7.6865E−01 |
| ZP12: | 1.3237E+00 |
| ZP13: | −2.7353E−01 |
| ZP19: | −3.3278E−01 |
| ZP20: | −2.4673E−01 |
| ZP21: | 7.5606E−01 |
| ZP22: | 1.0313E−01 |
| ZP23: | −1.8634E−01 |
| ZP24: | 4.3999E−01 |
| ZP25: | −1.4850E−01 |
| ZP33: | −6.7682E−02 |

TABLE 6H-continued

| P1S3 | |
|---|---|
| ZP34: | −8.6103E−02 |
| ZP35: | 1.9254E−01 |
| ZP36: | −5.3608E−02 |
| ZP37: | 5.8097E−02 |
| ZP38: | 2.5860E−02 |
| ZP39: | −5.0847E−02 |
| ZP40: | 7.0788E−02 |
| ZP41: | −3.9819E−02 |
| NRADIUS: | 8.0000E+00 |

Tables 6I through 6K show the aspherical coefficients of surfaces S1, S2, and S3, respectively, of P2 for the freeform folded optical system of camera 500. Standard Zernike coefficients are shown for S1, and XY polynomial coefficients are shown for S2 and S3.

TABLE 6I

| P2S1 | |
|---|---|
| Radius of curvature | −6.7659E+00 |
| ZP1: | 2.7976E+00 |
| ZP3: | 2.7250E+00 |
| ZP4: | 3.1104E+00 |
| ZP5: | 2.4097E−01 |
| ZP9: | 8.4945E−01 |
| ZP10: | 6.9713E−01 |
| ZP11: | 1.5345E+01 |
| ZP12: | 4.3060E−01 |
| ZP13: | 4.8787E−01 |
| ZP19: | 6.4501E−01 |
| ZP20: | −1.8877E+00 |
| ZP21: | −1.0193E+00 |
| ZP22: | −1.2919E+01 |
| ZP23: | 5.1161E+00 |
| ZP24: | 1.4155E−01 |
| ZP25: | 2.5003E−01 |
| ZP33: | 5.1597E−01 |
| ZP34: | −9.6561E−01 |
| ZP35: | 7.9243E−01 |
| ZP36: | 2.7432E+00 |
| ZP37: | 3.9039E+00 |
| ZP38: | −1.7259E+00 |
| ZP39: | 8.6447E−01 |
| ZP40: | −8.7006E−02 |
| ZP41: | −7.5066E−04 |
| NRADIUS: | 1.0000E+01 |

TABLE 6J

| P2S2 | |
|---|---|
| X2: | 5.8481E−03 |
| Y2: | 1.4979E−02 |
| X2Y: | −2.2908E−03 |
| Y3: | 9.9992E−04 |
| X4: | 1.7355E−04 |
| X2Y2: | 6.6700E−05 |
| Y4: | −6.3692E−05 |
| X4Y: | −3.3311E−05 |
| X2Y3: | 1.0893E−05 |
| Y5: | −1.8513E−05 |
| X6: | −3.0405E−07 |
| X4Y2: | 2.0500E−06 |
| X2Y4: | −1.6597E−06 |
| Y6: | 9.5906E−07 |

TABLE 6K

| P2S3 | |
|---|---|
| X2: | −6.7780E−03 |
| Y2: | 2.7419E−02 |
| X2Y: | −2.5576E−03 |
| Y3: | −6.2003E−05 |
| X4: | 1.3028E−04 |
| X2Y2: | 2.1446E−04 |
| Y4: | −1.2590E−04 |
| X4Y: | −3.9522E−06 |
| X2Y3: | −2.7222E−05 |
| Y5: | 3.1668E−06 |
| X6: | −4.5754E−06 |
| X4Y2: | −2.0350E−06 |
| X2Y4: | 2.0963E−07 |
| Y6: | 1.1836E−07 |

Tables 7A through 7K provide prescriptions for the optical elements of the example freeform folded optical system of camera 600 as described in reference to FIGS. 7A through 7C. Tables 7A through 7D show the local coordinates and angles of all surfaces based on the R1 global coordinate for the freeform folded optical system of camera 600.

TABLE 7A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 1.2180E+00 |
| angle of each surface | 0.0000E+00 | 0.0000E+00 |

TABLE 7B

| | P1 | | |
|---|---|---|---|
| | S1 | S2 | S3 |
| X | 0.0000E+00 | 0.0000E+00 | 0.0000E+00 |
| Y | −2.9889E+00 | 4.4409E−16 | −6.9575E+00 |
| Z | 1.9879E+00 | 5.1213E+00 | 4.7729E+00 |
| angle of each surface | 8.8143E+00 | −2.1824E+01 | 5.7860E+01 |

TABLE 7C

| | P2 | | |
|---|---|---|---|
| | S1 | S2 | S3 |
| X | 0.0000E+00 | 0.0000E+00 | 0.0000E+00 |
| Y | −6.3392E+00 | −1.2987E+01 | −1.6172E+01 |
| Z | 1.8786E+00 | 5.0713E+00 | 2.6522E+00 |
| angle of each surface | 6.4345E+01 | 5.7788E+00 | −2.6394E+01 |

TABLE 7D

| | aperture | Image plane |
|---|---|---|
| X | 0.0000E+00 | 0.0000E+00 |
| Y | 0.0000E+00 | −1.3080E+01 |
| Z | 0.0000E+00 | 7.5000E+00 |
| angle of each surface | 0.0000E+00 | 0.0000E+00 |

Table 7E shows the aspherical coefficients of surfaces R1 and R2 of L1 for the freeform folded optical system of camera 600.

TABLE 7E

| | R1 | R2 |
|---|---|---|
| Radius of curvature | 9.2029E+00 | 1.5192E+01 |
| 4th order | 1.0982E−04 | 2.4752E−04 |
| 6th order | 2.7779E−06 | 4.9210E−06 |
| 8th order | 1.4634E−07 | 1.6847E−07 |

Tables 7F through 7H show the aspherical coefficients of surfaces S1, S2, and S3, respectively, of P1 for the freeform folded optical system of camera 600. XY polynomial coefficients are shown for S1 and S2, and Standard Zernike coefficients are shown for S3.

TABLE 7F

| P1S1 | |
|---|---|
| X2: | −8.2779E−04 |
| Y2: | −5.9148E−03 |
| X2Y: | −2.4660E−04 |
| Y3: | 5.5736E−04 |
| X4: | −1.1282E−06 |
| X2Y2: | −8.4651E−06 |
| Y4: | −5.7940E−05 |
| X4Y: | 6.0643E−06 |
| X2Y3: | 4.2961E−06 |
| Y5: | 4.5389E−06 |
| X6: | −4.9393E−07 |
| X4Y2: | −9.2749E−07 |
| X2Y4: | −4.6152E−07 |
| Y6: | −2.0114E−07 |

TABLE 7G

| P1S2 | |
|---|---|
| X2: | −9.0426E−03 |
| Y2: | −1.4448E−02 |
| X2Y: | −2.4112E−05 |
| Y3: | 2.6340E−04 |
| X4: | −9.0849E−06 |
| X2Y2: | −3.4202E−05 |
| Y4: | −1.5518E−05 |
| X4Y: | 4.5692E−07 |
| X2Y3: | −4.4335E−07 |
| Y5: | −8.4713E−07 |
| X6: | −3.5078E−07 |
| X4Y2: | −5.7510E−07 |
| X2Y4: | −3.8514E−07 |
| Y6: | −1.5611E−07 |

TABLE 7H

| P1S3 | | | | | |
|---|---|---|---|---|---|
| Radius of curvature | −8.6358E+00 | | | | |
| ZP1: | 2.2487E+00 | ZP3: | 2.0577E+00 | ZP4: | 3.1844E+00 |
| ZP5: | 2.7106E+00 | ZP9: | −5.7599E−01 | ZP10: | −1.7279E+00 |
| ZP11: | 1.3733E−01 | ZP12: | 1.1627E+00 | ZP13: | −1.8046E−01 |
| ZP19: | −3.1012E−01 | ZP20: | −2.0870E+00 | ZP21: | −9.0824E−01 |
| ZP22: | 2.7265E+00 | ZP23: | 1.7344E+00 | ZP24: | 3.7931E−01 |

TABLE 7H-continued

| P1S3 | | | | | |
|---|---|---|---|---|---|
| ZP25: | −2.7709E−01 | ZP33: | −1.5751E−01 | ZP34: | −5.7027E−01 |
| ZP35: | 7.1266E−01 | ZP36: | 9.7281E−01 | ZP37: | −1.6562E−01 |
| ZP38: | −2.2530E−02 | ZP39: | 2.3460E−01 | ZP40: | 1.6191E−01 |
| ZP41: | −1.2848E−01 | NRADIUS: | 1.0000E+01 | | |

Tables 7I through 7K show the aspherical coefficients of surfaces S1, S2, and S3, respectively, of P2 for the freeform folded optical system of camera 600. Standard Zernike coefficients are shown for S1, and XY polynomial coefficients are shown for S2 and S3.

TABLE 7I

| P2S1 | | | | | |
|---|---|---|---|---|---|
| Radius of curvature | −7.1904E+00 | | | | |
| ZP1: | 3.6301E+00 | ZP3: | 4.0054E+00 | ZP4: | 2.1121E+00 |
| ZP5: | 4.3072E−01 | ZP9: | 1.0196E+00 | ZP10: | 2.3775E+00 |
| ZP11: | 5.3816E+00 | ZP12: | 5.9378E−01 | ZP13: | 4.7426E−01 |
| ZP19: | 9.4246E−01 | ZP20: | −1.8285E+00 | ZP21: | −5.4785E+01 |
| ZP22: | −6.4703E+01 | ZP23: | 5.9021E+00 | ZP24: | 5.3321E−01 |
| ZP25: | 2.3571E−01 | ZP33: | 6.5779E−01 | ZP34: | −7.1924E−01 |
| ZP35: | −8.9669E+00 | ZP36: | 1.8550E+01 | ZP37: | 9.4747E+00 |
| ZP38: | −1.1673E+01 | ZP39: | 2.2152E+00 | ZP40: | −2.6436E−01 |
| ZP41: | −6.3642E−02 | NRADIUS: | 1.2500E+01 | | |

TABLE 7J

| P2S2 | | | | | |
|---|---|---|---|---|---|
| X2: | 1.4914E−02 | Y2: | 1.3470E−02 | X2Y: | −3.8041E−03 |
| Y3: | 1.1921E−03 | X4: | 2.0673E−04 | X2Y2: | −7.3145E−05 |
| Y4: | 5.6914E−05 | X4Y: | −3.1082E−05 | X2Y3: | 6.5040E−05 |
| Y5: | −7.3318E−06 | X6: | −1.4514E−06 | X4Y2: | 1.1472E−06 |
| X2Y4: | −4.5996E−06 | Y6: | −3.2421E−07 | | |

TABLE 7K

| P2S3 | | | | | |
|---|---|---|---|---|---|
| X2: | −9.8263E−03 | Y2: | 2.5527E−02 | X2Y: | −3.3991E−03 |
| Y3: | 3.0296E−04 | X4: | 1.0784E−04 | X2Y2: | 1.1260E−04 |
| Y4: | −5.1418E−05 | X4Y: | 3.3765E−05 | X2Y3: | 2.6094E−05 |
| Y5: | 2.3030E−06 | X6: | −6.0219E−06 | X4Y2: | −3.1429E−06 |
| X2Y4: | −4.8442E−06 | Y6: | −2.0877E−07 | | |

Tables 8A through 8K provide prescriptions for the optical elements of the example freeform folded optical system of camera 700 as described in reference to FIGS. 8A through 8C. Tables 8A through 8D show the local coordinates and angles of all surfaces based on the R1 global coordinate for the freeform folded optical system of camera 700.

TABLE 8A

| | L1 | |
|---|---|---|
| | R1 | R2 |
| X | 0.0000E+00 | 0.0000E+00 |
| Y | 0.0000E+00 | 0.0000E+00 |
| Z | 0.0000E+00 | 7.3293E−01 |
| angle of each surface | 0.0000E+00 | 0.0000E+00 |

TABLE 8B

| | P1 | | |
|---|---|---|---|
| | S1 | S2 | S3 |
| X | 0.0000E+00 | 0.0000E+00 | 0.0000E+00 |
| Y | −2.2048E+00 | 0.0000E+00 | −5.9749E+00 |
| Z | 9.0635E−01 | 3.2256E+00 | 1.4497E+00 |
| angle of each surface | 8.5942E+00 | −2.1775E+01 | 5.7593E+01 |

TABLE 8C

| | P2 | | |
|---|---|---|---|
| | S1 | S2 | S3 |
| X | 0.0000E+00 | 0.0000E+00 | 0.0000E+00 |
| Y | −5.3875E+00 | −9.7960E+00 | −1.2352E+01 |
| Z | 1.5501E+00 | 3.6006E+00 | 1.6748E+00 |
| angle of each surface | 6.5056E+01 | 6.0282E+00 | −2.6500E+01 |

TABLE 8D

| | aperture | Image plane |
|---|---|---|
| X | 0.0000E+00 | 0.0000E+00 |
| Y | 0.0000E+00 | −1.1139E+01 |
| Z | 3.5000E−01 | 6.0000E+00 |
| angle of each surface | 0.0000E+00 | 0.0000E+00 |

Table 8E shows the aspherical coefficients of surfaces R1 and R2 of L1 for the freeform folded optical system of camera 700.

TABLE 8E

| | R1 | R2 |
|---|---|---|
| Radius of curvature | 1.0303E+01 | 3.9988E+02 |
| 4th order | −1.7141E−04 | −3.7221E−05 |
| 6th order | −1.4999E−05 | −1.4028E−05 |
| 8th order | 2.6285E−06 | 4.2961E−06 |
| 10th order | 1.3792E−07 | −9.8908E−08 |
| 12th order | −5.5907E−08 | −3.7433E−08 |
| 14th order | 4.4768E−09 | 4.0716E−09 |

Tables 8F through 8H show the aspherical coefficients of surfaces S1, S2, and S3, respectively, of P1 for the freeform folded optical system of camera 700. XY polynomial coefficients are shown for S1 and S2, and Standard Zernike coefficients are shown for S3.

TABLE 8F

| P1S1 | | | | | |
|---|---|---|---|---|---|
| X2: | −7.9880E−03 | Y2: | −3.4768E−03 | X2Y: | 6.0415E−04 |
| Y3: | 2.7953E−04 | X4: | 1.4429E−04 | X2Y2: | −8.9651E−05 |
| Y4: | −4.9715E−05 | X4Y: | 7.2540E−06 | X2Y3: | 8.6021E−06 |
| Y5: | 3.6989E−06 | X6: | 7.7453E−08 | X4Y2: | −8.4114E−07 |
| X2Y4: | −1.0365E−06 | Y6: | −4.3165E−07 | X6Y: | −1.3002E−06 |
| X4Y3: | 1.2342E−06 | X2Y5: | 1.4087E−07 | Y7: | −1.3709E−09 |
| X8: | 8.7000E−08 | X6Y2: | 2.7905E−08 | X4Y4: | −2.3965E−07 |
| X2Y6: | −2.0211E−08 | Y8: | −8.2973E−10 | | |

TABLE 8G

| P1S2 | | | | | |
|---|---|---|---|---|---|
| X2: | −5.7357E−03 | Y2: | −9.2301E−03 | X2Y: | 3.6677E−04 |
| Y3: | 1.9103E−04 | X4: | 6.5377E−05 | X2Y2: | −8.7112E−05 |
| Y4: | −5.2402E−05 | X4Y: | 4.2696E−06 | X2Y3: | 7.2807E−07 |
| Y5: | −2.2677E−06 | X6: | −9.1284E−07 | X4Y2: | −5.0035E−07 |
| X2Y4: | −1.4888E−06 | Y6: | −7.3623E−07 | X6Y: | −6.3168E−07 |
| X4Y3: | −6.3965E−08 | X2Y5: | 1.2354E−09 | Y7: | −2.3532E−07 |
| X8: | 1.7557E−08 | X6Y2: | −1.2032E−07 | X4Y4: | −1.8183E−07 |
| X2Y6: | −1.5204E−07 | Y8: | −7.6984E−08 | | |

TABLE 8H

| P1S3 | | | | | |
|---|---|---|---|---|---|
| Radius of curvature | −5.4072E+00 | | | | |
| ZP1: | 4.3990E−01 | ZP3: | 1.2804E+00 | ZP4: | −3.8088E−01 |
| ZP5: | 5.0347E−01 | ZP9: | −1.1152E−01 | ZP10: | 5.6146E−01 |
| ZP11: | 4.0343E−01 | ZP12: | −3.3755E−01 | ZP13: | 2.8137E−01 |
| ZP19: | −2.8827E−01 | ZP20: | 2.6649E−01 | ZP21: | −1.9589E−01 |
| ZP22: | −1.1702E−01 | ZP23: | 8.9485E−02 | ZP24: | −1.4055E−01 |
| ZP25: | 1.2273E−01 | ZP33: | −5.5987E−02 | ZP34: | 1.6748E−02 |
| ZP35: | 6.8211E−03 | ZP36: | 1.5670E−01 | ZP37: | 7.5871E−02 |
| ZP38: | 1.7911E−03 | ZP39: | −1.8299E−02 | ZP40: | −2.2971E−02 |
| ZP41: | 2.1558E−02 | ZP51: | −3.6876E−03 | ZP52: | 8.2867E−04 |
| ZP53: | 1.9005E−02 | ZP54: | 5.7853E−03 | ZP55: | −2.7646E−02 |
| ZP56: | 1.6117E−02 | ZP57: | −8.9737E−03 | ZP58: | 8.7488E−03 |
| ZP59: | −2.4040E−03 | ZP60: | −5.9937E−04 | ZP61: | 1.1786E−03 |
| NRADIUS: | 5.0000E+00 | | | | |

Tables 8I through 8K show the aspherical coefficients of surfaces S1, S2, and S3, respectively, of P2 for the freeform folded optical system of camera 700. Standard Zernike coefficients are shown for S1, and XY polynomial coefficients are shown for S2 and S3.

TABLE 8I

| P2S1 | | | | | |
|---|---|---|---|---|---|
| Radius of curvature | −5.1556E+00 | | | | |
| ZP1: | 1.8375E+00 | ZP3: | 1.2560E+00 | ZP4: | 1.6337E+00 |
| ZP5: | 5.3144E−01 | ZP9: | 7.3174E−01 | ZP10: | −7.1290E−01 |
| ZP11: | −1.7417E+00 | ZP12: | 5.7043E−01 | ZP13: | 5.5825E−01 |
| ZP19: | 1.9900E−01 | ZP20: | −3.9167E−01 | ZP21: | −1.2886E+00 |
| ZP22: | −1.6970E+00 | ZP23: | −1.2217E+00 | ZP24: | 3.1918E−01 |
| ZP25: | 2.0290E−01 | ZP33: | 1.3053E−01 | ZP34: | −1.3405E−01 |
| ZP35: | −2.2998E−02 | ZP36: | 6.1069E+00 | ZP37: | 2.7587E+00 |
| ZP38: | 2.5648E−01 | ZP39: | −4.6007E−01 | ZP40: | 1.2644E−01 |
| ZP41: | −9.6945E−03 | ZP51: | 3.9591E−03 | ZP52: | 2.3508E−02 |
| ZP53: | 8.0958E−02 | ZP54: | 5.8805E−01 | ZP55: | −2.0554E+00 |
| ZP56: | −2.3005E−03 | ZP57: | −1.1504E−01 | ZP58: | 1.5088E−01 |
| ZP59: | −5.1378E−02 | ZP60: | 2.3046E−02 | ZP61: | −1.0302E−02 |
| NRADIUS: | 6.2500E+00 | | | | |

TABLE 8J

| P2S2 | | | | | |
|---|---|---|---|---|---|
| X2: | −1.1340E−02 | Y2: | 1.6512E−02 | X2Y: | −2.7502E−04 |
| Y3: | −1.8888E−04 | X4: | 2.1645E−04 | X2Y2: | −2.0331E−04 |
| Y4: | −1.4999E−04 | X4Y: | −4.7643E−05 | X2Y3: | 2.0657E−05 |
| Y5: | 9.0283E−06 | X6: | 4.5142E−06 | X4Y2: | 1.3405E−05 |
| X2Y4: | −3.5349E−06 | Y6: | −2.8475E−07 | X6Y: | −5.1346E−07 |
| X4Y3: | −7.8525E−06 | X2Y5: | 1.4279E−06 | Y7: | 2.7125E−07 |
| X8: | 1.0757E−07 | X6Y2: | −3.7044E−07 | X4Y4: | 1.4527E−06 |
| X2Y6: | −1.8478E−07 | Y8: | −2.8463E−08 | | |

TABLE 8K

| P2S3 | | | | | |
|---|---|---|---|---|---|
| X2: | −1.3993E−02 | Y2: | 3.3766E−02 | X2Y: | −5.8411E−04 |
| Y3: | −1.5314E−03 | X4: | 3.6632E−04 | X2Y2: | −3.5607E−04 |
| Y4: | −1.7846E−04 | X4Y: | −1.3935E−04 | X2Y3: | 7.0493E−05 |
| Y5: | 5.3756E−05 | X6: | −6.7060E−06 | X4Y2: | 4.0670E−05 |
| X2Y4: | −1.2422E−05 | Y6: | −1.3515E−05 | X6Y: | 3.1502E−06 |
| X4Y3: | −1.1946E−05 | X2Y5: | 2.4983E−06 | Y7: | 2.9738E−06 |
| X8: | 2.0636E−07 | X6Y2: | −6.8609E−07 | X4Y4: | 1.6853E−06 |
| X2Y6: | −3.4509E−07 | Y8: | −2.8111E−07 | | |

Example Computing Device

Figure 17:
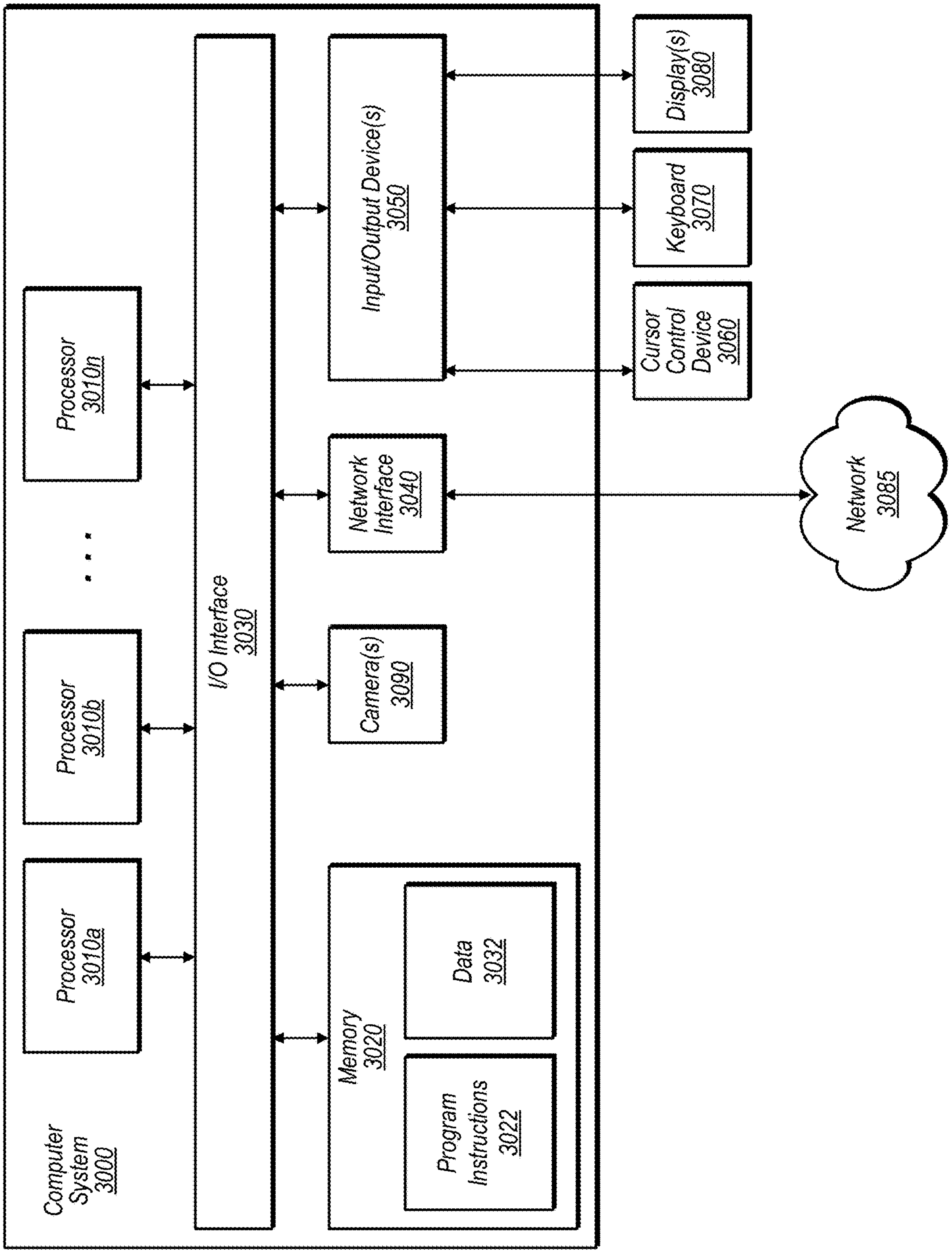
FIG. 17 illustrates an example computer system.

FIG. 17 illustrates an example computing device, referred to as computer system 3000, that may include or host embodiments of a camera with a freeform folded optical system as illustrated in FIGS. 1 through 16. In addition, computer system 3000 may implement methods for controlling operations of the camera and/or for performing image processing of images captured with the camera. In different embodiments, computer system 3000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 3000 includes one or more processors 3010 coupled to a system memory 3020 via an input/output (I/O) interface 3030. Computer system 3000 further includes a network interface 3040 coupled to I/O interface 3030, and one or more input/output devices 3050, such as cursor control device 3060, keyboard 3070, and display(s) 3080. Computer system 3000 may also include one or more cameras 3090, for example at least one camera that includes a freeform folded optical system as described above with respect to FIGS. 1 through 16.

In various embodiments, computer system 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions 3022 and/or data 3032 accessible by processor 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions 3022 may be configured to implement various interfaces, methods and/or data for controlling operations of camera 3090 and for capturing and processing images with integrated camera 3090 or other methods or data, for example interfaces and methods for capturing, displaying, processing, and storing images captured with camera 3090. In some embodiments, program instructions and/or data may be received, sent or stored upon different types of computer-accessible media or on similar media separate from system memory 3020 or computer system 3000.

In one embodiment, I/O interface 3030 may be configured to coordinate I/O traffic between processor 3010, system memory 3020, and any peripheral devices in the device, including network interface 3040 or other peripheral interfaces, such as input/output devices 3050. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices attached to a network 3085 (e.g., carrier or agent devices) or between nodes of computer system 3000. Network 3085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3050 may, in some embodiments, include one or more display terminals, keyboards, keypads, touchpads, scanning devices, voice or optical recognition devices, or any other devices suitable for entering or accessing data by computer system 3000. Multiple input/output devices 3050 may be present in computer system 3000 or may be distributed on various nodes of computer system 3000. In some embodiments, similar input/output devices may be separate from computer system 3000 and may interact with one or more nodes of computer system 3000 through a wired or wireless connection, such as over network interface 3040.

As shown in FIG. 17, memory 3020 may include program instructions 3022, which may be processor-executable to implement any element or action to support integrated camera 3090, including but not limited to image processing software and interface software for controlling camera(s) 3090. In some embodiments, images captured by camera(s) 3090 may be stored to memory 3020. In addition, metadata for images captured by camera(s) 3090 may be stored to memory 3020.

Those skilled in the art will appreciate that computer system 3000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 3000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3000 may be transmitted to computer system 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical system, comprising:

in order from an object side of the optical system to an image side of the optical system:

a first freeform prism that includes:

a first surface, a second surface, and a third surface, wherein an optical axis of the optical system traverses the first surface, the second surface, and the third surface, wherein at least one of the first surface, the second surface, or the third surface of the first freeform prism is a freeform surface; and a second freeform prism that includes:

a first surface, a second surface, and a third surface, wherein the optical axis of the optical system traverses the first surface, the second surface, and the third surface, wherein at least one of the first surface, the second surface, or the third surface of the second freeform prism is another freeform surface;

wherein the first freeform prism is configured to fold the optical axis of the optical system twice; and wherein effective focal length f of the optical system is within a range of 9 to 31 millimeters.

2. The optical system as recited in claim 1, wherein, to fold the optical axis of the optical system twice:

the first surface of the first freeform prism receives light from an object field on the object side of the optical system and transmits the light to the second surface of the first freeform prism on a first portion of the optical axis;

the second surface of the first freeform prism reflects the light received on the first portion of the optical axis on to a second portion of the optical axis; and the first surface of the first freeform prism reflects the light received on the second portion of the optical axis via total internal reflection on to a third portion of the optical axis;

wherein the third surface of the first freeform prism transmits the light on the third portion of the optical axis to the first surface of the second freeform prism.

3. The optical system as recited in claim 2, wherein the second freeform prism is configured to fold the optical axis of the optical system twice, wherein, to fold the optical axis of the optical system twice:

the first surface of the second freeform prism receives light on the third portion of the optical axis and transmits the light to the second surface of the second freeform prism;

the second surface of the second freeform prism reflects the light received on the third portion of the optical axis via total internal reflection on to a fourth portion of the optical axis; and the third surface of the second freeform prism reflects the light received on the fourth portion of the optical axis on to a fifth portion of the optical axis;

wherein the second surface of the second freeform prism transmits the light on the fifth portion of the optical axis to form an image at an image plane on the image side of the optical system.

4. The optical system as recited in claim 2, wherein the second freeform prism is configured to fold the optical axis of the optical system once, wherein, to fold the optical axis of the optical system once:

the first surface of the second freeform prism receives light on the third portion of the optical axis and transmits the light to the second surface of the second freeform prism;

the second surface of the second freeform prism reflects the light received on the third portion of the optical axis on to a fourth portion of the optical axis; and the third surface of the second freeform prism transmits the light on the fourth portion of the optical axis to form an image at an image plane on the image side of the optical system.

5. The optical system as recited in claim 1, further comprising an objective lens having positive refractive power and located on the object side of the first freeform prism, wherein light from an object field is refracted by the objective lens before entering the first surface of the first freeform prism.

6. The optical system as recited in claim 5, wherein the objective lens is a rotationally symmetric lens with at least one aspherical surface.

7. The optical system as recited in claim 5, wherein the objective lens is composed of an optical glass material.

8. The optical system as recited in claim 5, wherein the objective lens is a doublet lens.

9. The optical system as recited in claim 5, wherein the optical system satisfies a condition:

$$0.5 < B/A < 1.0$$

where A is optical power of the optical system, and B is optical power of the objective lens.

10. The optical system as recited in claim 5, wherein the objective lens is composed of an optical material with Abbe number Vai that satisfies a condition:

$$V_{d1} > 50.$$

11. The optical system as recited in claim 1, wherein the second surface of the first freeform prism is coated with an optically reflective coating to reflect light received through the first surface of the first freeform prism.

12. The optical system as recited in claim 1, wherein the first freeform prism is composed of an optical plastic material with Abbe number $V_{d2}$ that satisfies a condition:

$$V_{d2} > 50;$$

wherein the second freeform prism is composed of an optical plastic material with Abbe number $V_{d3}$ that satisfies a condition:

$$V_{d3} < 25.$$

13. The optical system as recited in claim 1, wherein the optical system satisfies a condition:

$$0.05 < AD < 0.3$$

where A is optical power of the optical system, and D is semi-diagonal image height.

14. The optical system as recited in claim 1, wherein F-number of the optical system is within a range of 2.0 to 4.0.

15. The optical system as recited in claim 1, wherein semi-diagonal image height of the optical system is within a range of 2.5 to 2.9 millimeters.

16. The optical system as recited in claim 1, wherein half field of view of the optical system is within a range of 4.5 degrees to 16 degrees.

17. A camera, comprising, in order from an object side of the camera to an image side of the camera:

an optical system, comprising, in order from an object side of the optical system to an image side of the optical system:

a first freeform prism that includes:

a first surface, a second surface, and a third surface, wherein an optical axis of the optical system traverses the first surface, the second surface, and the third surface, wherein at least one of the first surface, the second surface, or the third surface of the first freeform prism is a freeform surface; and a second freeform prism that includes:

a first surface, a second surface, and a third surface, wherein the optical axis of the optical system traverses the first surface, the second surface, and the third surface, wherein at least one of the first surface, the second surface, or the third surface of the second freeform prism is another freeform surface, wherein the first freeform prism is configured to fold the optical axis of the optical system twice; and wherein effective focal length f of the optical system is within a range of 9 to 31 millimeters; and an image sensor configured to capture light projected onto a surface of the image sensor from the second freeform prism.

18. The camera as recited in claim 17, wherein the third surface of the second freeform prism is coated with a reflective material that is configured to reflect light received from the second surface of the second freeform prism.

19. A device, comprising:

one or more processors;

memory configured to store program instructions accessible by the one or more processors, which when executed by the one or more processors control operations of a camera; and the camera, comprising, in order from an object side of the camera to an image side of the camera:

an optical system, comprising, in order from an object side of the optical system to an image side of the optical system:

a first freeform prism that includes:

a first surface, a second surface, and a third surface, wherein an optical axis of the optical system traverses the first surface, the second surface, and the third surface, wherein at least one of the first surface, the second surface, or the third surface of the first freeform prism is a freeform surface; and a second freeform prism that includes:

a first surface, a second surface, and a third surface, wherein the optical axis of the optical system traverses the first surface, the second surface, and the third surface, wherein at least one of the first surface, the second surface, or the third surface of the second freeform prism is another freeform surface, wherein the first freeform prism is configured to fold the optical axis of the optical system twice; and wherein effective focal length f of the optical system is within a range of 9 to 31 millimeters; and an image sensor configured to capture light projected onto a surface of the image sensor from the second freeform prism.

20. The device as recited in claim 19, wherein the first freeform prism is composed of an optical plastic material with Abbe number $V_{d2}$ that satisfies a condition:

$$V_{d2} > 50;$$

and wherein the second freeform prism is composed of an optical plastic material with Abbe number $V_{d3}$ that satisfies a condition:

$$V_{d3} < 25.$$

* * * * *